US007899902B2

(12) United States Patent
Hyotani et al.

(10) Patent No.: US 7,899,902 B2
(45) Date of Patent: Mar. 1, 2011

(54) DISTRIBUTED SYSTEM CONTROL METHOD AND INFORMATION PROCESSING APPARATUS

(75) Inventors: Naoko Hyotani, Kawasaki (JP); Ken Sakakibara, Tokyo (JP); Yoshihisa Tadokoro, Tokyo (JP); Takashi Miyasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1212 days.

(21) Appl. No.: 10/964,867

(22) Filed: Oct. 15, 2004

(65) Prior Publication Data

US 2005/0117719 A1   Jun. 2, 2005

(30) Foreign Application Priority Data

Oct. 15, 2003 (JP) ............................. 2003-355382
Oct. 5, 2004  (JP) ............................. 2004-293073

(51) Int. Cl.
*G06F 15/173* (2006.01)

(52) U.S. Cl. ..................... 709/224; 709/226; 358/1.13; 358/1.14; 358/1.15; 358/1.16; 358/1.18; 399/80; 710/15; 710/705; 710/733

(58) Field of Classification Search ................. 709/224, 709/226; 705/1; 358/1.14, 1.15, 1.16, 1.18, 358/1.9, 3.28, 1.13, 468, 435, 436; 399/80; 710/15, 705, 733
See application file for complete search history.

(56) References Cited

U.S. PATENT DOCUMENTS 5,960,173 A * 9/1999 Tang et al. .................. 709/201

| 6,289,371 | B1 * | 9/2001 | Kumpf et al. ............... 709/203 |
| 6,366,262 | B1 * | 4/2002 | Amell et al. ................. 345/1.2 |
| 6,501,485 | B1 * | 12/2002 | Dash et al. ................... 715/700 |
| 7,269,162 | B1 * | 9/2007 | Turner ......................... 370/352 |
| 2002/0049709 | A1 * | 4/2002 | Miyasaki et al. ............... 707/1 |
| 2002/0161590 | A1 | 10/2002 | Sakakibara et al. ............ 705/1 |
| 2003/0030664 | A1 * | 2/2003 | Parry ........................... 345/744 |
| 2004/0156071 | A1 * | 8/2004 | Lay et al. .................... 358/1.15 |

FOREIGN PATENT DOCUMENTS

| JP | 8-87685 | 4/1996 |
| JP | 10-254851 | 9/1998 |
| JP | 2000-181967 | 6/2000 |

* cited by examiner

*Primary Examiner*—Thuong T Nguyen
(74) *Attorney, Agent, or Firm*—Fitzpatrick, Cella, Harper & Scinto

(57) ABSTRACT

The present invention provides a distributed system control method information processing apparatus that enables a user to ascertain easily and in real time the environment around such user, that is, the status of other users and of peripheral devices, during use of the distributed system, in particular enabling the user to obtain easily information on peripheral devices the user is permitted to use. In a distributed system in which a plurality of user terminals and peripheral devices are dispersed, information indicating the current status of the users of the user terminals and information indicating the current status of the peripheral devices is stored, updated according to changes in status, and the current status of users of other user terminals and the current status of the peripheral devices selectively displayed on the same display screen at each of the plurality of user terminals. Information indicating the relation between peripheral devices and users is also stored, and peripheral devices usable by such user selected based on such information displayed on the display screen are displayed.

26 Claims, 40 Drawing Sheets

|  | USER α | USER β | USER γ | ... |
|---|---|---|---|---|
| PERIPHERAL DEVICE 27 | ○ | ○ | × | ... |
| PERIPHERAL DEVICE 28 | ○ | × | ○ | ... |

| 2601 | USER α | USER β | USER γ | ... |
|---|---|---|---|---|
| 2602 — UPPER LIMIT ON PRINTED PAGES AT PERIPHERAL DEVICE 27 | 100 | 50 | 50 | ... |
| 2603 — NUMBER OF PAGES ALREADY PRINTED AT PERIPHERAL DEVICE 27 | 97 | 22 | 10 | ... |
| UPPER LIMIT ON PRINTED PAGES AT PERIPHERAL DEVICE 28 | 400 | 400 | 200 | ... |
| NUMBER OF PAGES ALREADY PRINTED AT PERIPHERAL DEVICE 28 | 157 | 400 | 75 | ... |

FIG. 24
PRIOR ART

| 21a | E-MAIL / CLIENT SOFTWARE |
|---|---|
| 22a | GROUP SCHEDULE MANAGER |
| 23a | WORLD WIDE WEB BROWSER |
| 24a | VIDEOCONFERENCING SOFTWARE |
| 25a | COLLABORATION SOFTWARE |

FIG. 32

| PARENT GROUP | CHILD GROUP | USER | PERIPHERAL DEVICE |
|---|---|---|---|
| PLANNING DEPARTMENT | PLANNING SECTION 1 | SUZUKI ICHIRO | |
| | | YAMADA JIRO | |
| | | NAKANIWA SABURO | |
| | | URADA HANAKO | PLANNING SECTION 1 COPIER |
| | | | PLANNING SECTION 1 COLOR PRINTER |
| | PLANNING SECTION 2 | MEGURO TOSHIO | |
| | | OOZAKI AKIRA | |
| | | DAIMON YOSHIO | |
| | | AKASAKA MEIKO | 2F COPIER (AND FAX) |
| | | | LARGE-SIZE COLOR PRINTER |

F I G. 37
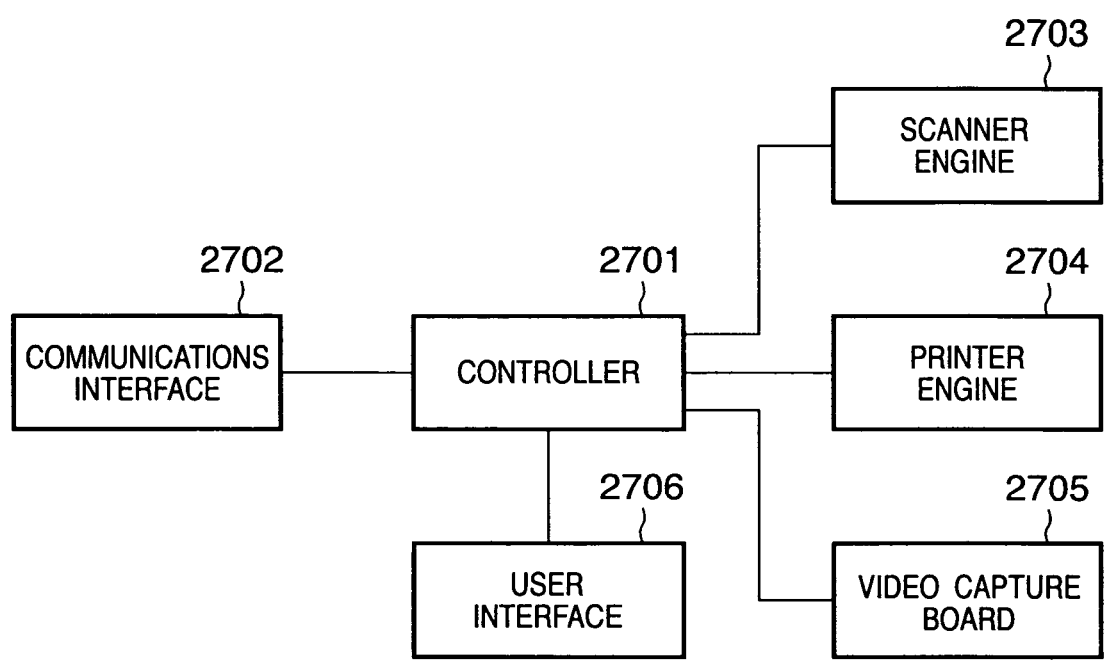

DISTRIBUTED SYSTEM CONTROL METHOD AND INFORMATION PROCESSING APPARATUS

FIELD OF THE INVENTION

The present invention relates to a distributed system control method capable of ascertaining an environment surrounding a user from a user terminal and an information processing apparatus for implementing such control method, in a distributed system in which a plurality of user terminals and peripheral devices or server devices are dispersed.

BACKGROUND OF THE INVENTION

In the conventionally employed work model, generally, organizations, such as companies, associations and public institutions, secure office space, in other words a workplace, for their employed workers (hereinafter "employees") who are put to work on clerical, marketing or technical matters not requiring large-scale equipment. The office space may be either the organization's own buildings or may be secured by rental lease, and the employees arrive and gather at the office space by a work starting time using public transportation and/or private vehicles and perform collective labor within a predetermined work time. In that office space are provided a variety of equipment, such as telephones, copiers, fax machines, computers and computer networks, in an effort to make work more efficient.

The practice of collective work is a relatively new one, adopted with the industrial revolution in order to run factories efficiently. Recently, however, as the social ills created by collective work, such as "commuting hell", as well as the air pollution attendant upon the increase in the number of automobiles, become more apparent, the creation of the internet and other such communications infrastructure and advances in a variety of communications technologies make it clear that collective work is not necessarily the only work model for either organizations or their employees. As a result, distributed work, which allows employees belonging to the same organization to work at home or at a place of their choosing but which controls them so as to accomplish the goals of the organization as a whole, is gaining attention as an alternative to the collective work model.

However, in order to implement distributed work in the context of an organization such as a company, it is necessary to tie together a plurality of home offices (and here a "home office" may be a room of the employee's home that is used as a work space) that are geographically dispersed so that employees can communicate with each other using in-home communications terminals and communications application systems. Public telephone networks, ISDN, internet-dedicated lines and the like are used as the communications lines, and electronic mail (e-mail) systems, World Wide Web (WWW) systems, videoconference systems and the like are used as the communications applications systems.

Moreover, employees sometimes use not a home office but a satellite office or tele-cottage and the like provided by the organization to which they belong or by local governments, or, in the case of marketing or maintenance, sometimes use a private automobile or the seat of a public transportation vehicle as a temporary work place (i.e., a mobile office).

An example of the structure of this type of distributed work is given below, using FIGS. 23 and 24. FIG. 23 is a block diagram showing the structure of a home office in the conventional distributed work model. FIG. 24 is a table showing typical communications applications systems used in the conventional distributed work model.

As shown in FIG. 23, in a distributed work home office 110a are provided a personal computer 102a loaded with communications application software 103a for communicating between a main office 109a and another home office 110a or a mobile office 111a, a telephone 105a, a facsimile machine 106a and an ISDN terminal adapter (hereinafter "TA") 104a. The TA 104a has a data port and two analog ports. The data port is connected to serial port of the personal computer 102a. One of the analog ports of the TA 104a is connected to the telephone 105a and the other analog port is connected to the facsimile machine 106a.

Moreover, the TA 104a is connected to a communications network 108a composed of an ISDN by a Digital Service Unit (DSU) 107a, so that the home office 101a uses the communications network 108a to communicate with the main office 109a and the other home office 110a or the mobile office 111a. It should be noted that instead of the ISDN a modem may be used to connect to an ordinary phone network so that the home office 101a uses the communications network 108a to communicate with the main office 109a and the other home office 110a or the mobile office 111a.

As the communications application software 103a installed in the personal computer 102a, as shown in FIG. 24 there is e-mail/client software 21a, group schedule manager 22a, World Wide Web browser software 23a, videoconferencing software 24a and collaboration software 25a.

The e-mail/client software 21a is used to exchange electronic mail with workers in the main office 109a and the other home office 110a or the mobile office 111a, and is software that enables the creation, transmission and reception, and reading of e-mail. The group schedule manager 22a is software that enables registration and checking of the worker's own work schedule as well as the checking of other work schedules as well. The World Wide Web browser 23a is software mainly for viewing the home page created by the organization to which the worker belongs as well as group member bulletin boards placed on the home page.

The videoconferencing software 24a is for enabling meetings and conferences to take place without actually going to another location, and enables voice and image data exchange with other workers via the communications network 108a. The collaboration software 25a is software for allowing several workers to open a shared whiteboard or the same application software each on their own personal computers so as to enable them to collaborate thereon. The collaboration software 25a is sometimes included in the videoconferencing software 24a.

Thus, as described above, conventionally, where a worker belonging to an organization works at a home office, that worker proceeds with a task while maintaining contact with other workers using the telephone 105a, facsimile machine 106a, personal computer 102a and the various communications application software installed in each of these apparatuses.

Moreover, recently, as networks have become more sophisticated, information at the terminals of workers in a distributed work environment can now be shared. In a network environment of this type there is a growing demand for the capability to check the status of other parties within the communications network, in an effort to make work more efficient by enabling each user to know the status of other users (i.e., sharing status information among users) using the terminal.

Given that the status information in question consists of work status information in an office, a work status management system has been proposed that enables a user to check the work status of other users by using the network to manage the work status information of users of each client terminal with a server and displaying said work status at each client terminal.

A specific example of distributed work using such a technology is described using FIGS. 25 and 26. FIG. 25 is a diagram showing an example of the conventional distributed work office. FIG. 26 is a diagram showing schematically the form of collective work carried out before the distributed work in FIG. 25.

As shown in FIG. 25, workers A, B and C each work at home offices 110a, worker D works at a main office and worker E works at a mobile office, with workers A, B, C, D and E having the ability to communicate with each other through the communications network 108a.

The form of work prior to the start of such type of distributed work is, for example, the collective work arrangement shown in FIG. 26. With such collective work, workers A-E work at desks provided for each of them. In the case of such collective work, worker A, for example, can easily ascertain the condition of workers B-E visually or aurally, and therefore worker A can sense when worker B appears to be not busy and can talk with worker B at an appropriate time.

In contrast to such collective work experience, in a distributed work arrangement, when for example worker A talks to worker B, typically that conversation is carried out using the telephone 105a or the videoconferencing software 24a (shown in FIGS. 23 and 24). However, when worker A calls worker B using the telephone 105a or the videoconferencing software 24a, because worker A cannot check the status of worker B prior to calling, if, for example, worker B is in the middle of a call or on a break and cannot respond to the call, worker A has wasted the effort in calling worker B, degrading the efficiency of work.

In these circumstances, worker A can send a question to worker B by e-mail using the electronic mail/client software 21a. However, with this method, if the question is such as to require an urgent answer it is unclear when a reply from worker B will arrive, and therefore creates a planning difficulty for worker A's work.

In order to avoid such a situation, worker A can check worker B's schedule using the group schedule manager 22a. However, what is registered by the group schedule manager 22a is often limited to action plans and work schedules broken down into 1-hour time units, and usually break times are not registered. Moreover, what is registered by the group schedule manager 22a is at best only a schedule, and does not reflect the actual state of the worker. In other words, the group schedule manager 22a will never be a sure means of ascertaining the actual state of another party.

In order to solve the drawbacks described above, a system has been tried that uses the videoconferencing software 24a to display images of a plurality of workers simultaneously so that each worker can see the work status of all the other workers. As commercial implementations of this system there are enhanced CU-SeeMe and Reflector (Enhanced CU-SeeMe server software) developed and marketed by White Pine Software Inc. of the United States.

A description is given of such a system with reference to FIG. 27. FIG. 27 is a diagram showing a sample screen of a personal computer in a home office according to a system that enables each worker to see the work status of all other workers using videoconferencing software.

With such a system, which uses videoconferencing software to enable each user to see the work status of all the other workers, by displaying images of the other workers not just during conferences but continuously during work time as shown in FIG. 27, it is possible to check if another worker is in the home office or not, for example, or is on the telephone.

In addition, recently, as improvements in personal computer computation processing capacities have made it possible to software-process such digital image compression and expansion processes, the spread of low-cost personal computer video capture devices (i.e., video cameras) and the spread of USB (Universal Serial Bus) interfaces that can easily connect video capture devices and personal computers, a so-called "video instant messenging system" has been commercialized that adds video images to the messenging system described above to provide information sharing among users of not only text messages but also video images, enabling business contacts among users dispersed in separate locations to proceed smoothly.

However, although a variety of small improvements have been made with respect to status acquisition among workers in distributed work models like that described above, or to messenger systems that provide messaging used in communication among workers not limited to distributed work models, nevertheless in ascertaining the status of office equipment used by workers a variety of unresolved drawbacks remain.

For example, with applications in which peripheral device information is obtained by the client computer (hereinafter called "peripheral device information display software"), generally, when acquiring peripheral device information, such information of the necessary application cannot be obtained without going through a large number of operations, such as activating the application, specifying such basic information needed to identify the peripheral device in question as the IP address and domain name, by which process the required information is finally displayed.

Moreover, where the condition of a working office is not known, as is the case with new employees or with a sudden reassignment of department or office, work cannot commence smoothly if information on peripheral devices that can be used in that office is not known, such as, for example, of the peripheral devices installed in the office, how many printers and copiers one is permitted to use, where these devices are located, and what their state of operation is.

Furthermore, when using a possible capability or fax capability at a portion of a copier, such as when scanning a document at one copier and designating another copier at which to print out the scanned document, often one does not know the status of the destination peripheral device that outputs the document, and therefore, if the destination peripheral device is not supplied with power or an error has occurred and the job cannot be executed, one might repeatedly transmit to a destination peripheral device that cannot accomplish the requested task, resulting in wasted time and effort.

Moreover, the information that the peripheral device information display software can obtain and provide the user is limited to items that can be detected by such peripheral devices' own internal sensors. If, for example, a given user, because a paper jam error or the like is displayed by the peripheral device information display software, heads toward the location of the peripheral device in order to solve the problem, it is possible that another user might already be in the process of fixing the problem. However, the peripheral device information display software cannot obtain and display information such as whether or not someone is standing in front of the peripheral device in question, and therefore, although one can of course wait for another User to effect repairs and then print the document, by the peripheral device information display software alone it is not possible to know whether or not someone is attempting to solve the problem that is the cause of the error, be it a paper jam or something else. As a result, one might end up going to the location of the peripheral device in question and returning to one's seat for nothing, because some other user has already begun to effect repairs.

SUMMARY OF THE INVENTION

The present invention has as its object to provide, in a distributed system comprised of user terminals and peripheral devices connected by a communications line with a server device, a distributed system control method information processing apparatus that enables a user to ascertain easily and in real time the environment around such user, that is, the status of other users and of peripheral devices, during use of the distributed system. In particular, it is an object of the present invention to provide a distributed system control method and information processing apparatus that enables the user to obtain easily information on peripheral devices the user is permitted to use.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIG. 15 is a diagram showing a sample office view screen displayed on the screen of a user terminal station of the distributed system shown in FIG. 1;

FIG. 19 is a diagram showing one example of a table storing information concerning use restrictions of peripheral devices that the server process S stores in a status information table;

Figure 20:
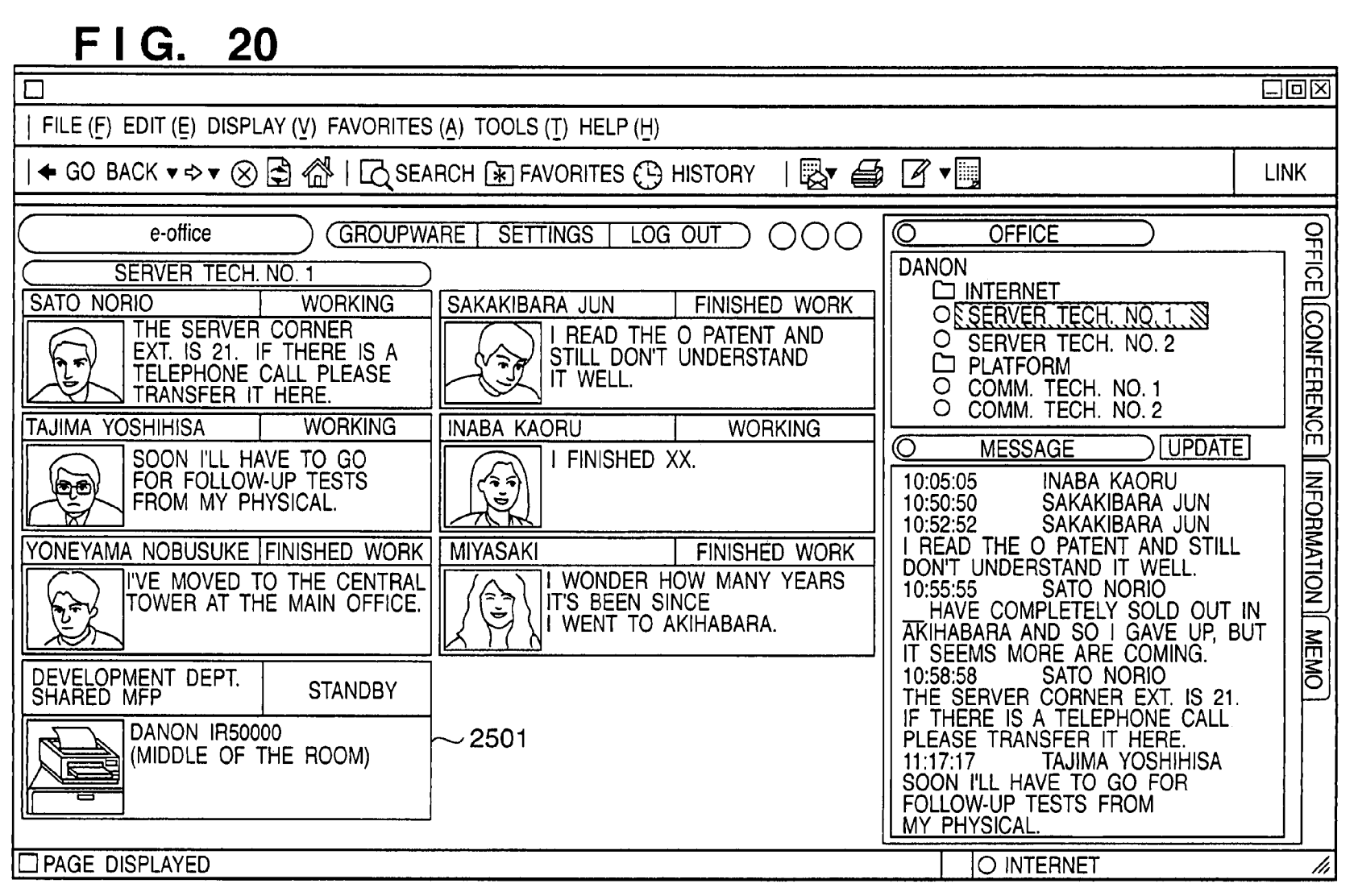

FIG. 20 is a diagram showing a sample office view screen displayed on the screen of a user terminal station of the distributed system shown in FIG. 1, using the peripheral device use restriction information shown in FIG. 19;

FIG. 21 is a diagram showing another example of a table storing information concerning use restrictions of peripheral devices that the server process S stores in a status information table;

FIG. 24 is a diagram showing a table showing typical communications applications systems used in the conventional distributed work model;

FIG. 32 is a diagram showing an example of group information data registered based on two layers;

FIG. 37 is a diagram showing another example of the hardware configuration of the peripheral device MFP;

DETAILED DESCRIPTION OF THE PREFERRED EMBODIMENTS

Preferred embodiments of the present invention will now be described in detail in accordance with the accompanying drawings. It should be noted that although the distributed systems of the present embodiments are described in terms a centralized management configuration, in which the status of users and peripheral devices is managed at a host server device and displayed at user terminals, the present invention concerns a user ascertaining the status of other users and of peripheral devices, and therefore is not limited to centralized management by a host server device. Rather, an arrangement in which user and peripheral device status is managed through a configuration in which the user terminals or selected user terminals and peripheral devices are dispersed is also within the scope of the present invention.

-Embodiment of a Distributed Office System-

<Example of a Distributed System Configuration in the Present Embodiment>

Figure 1:
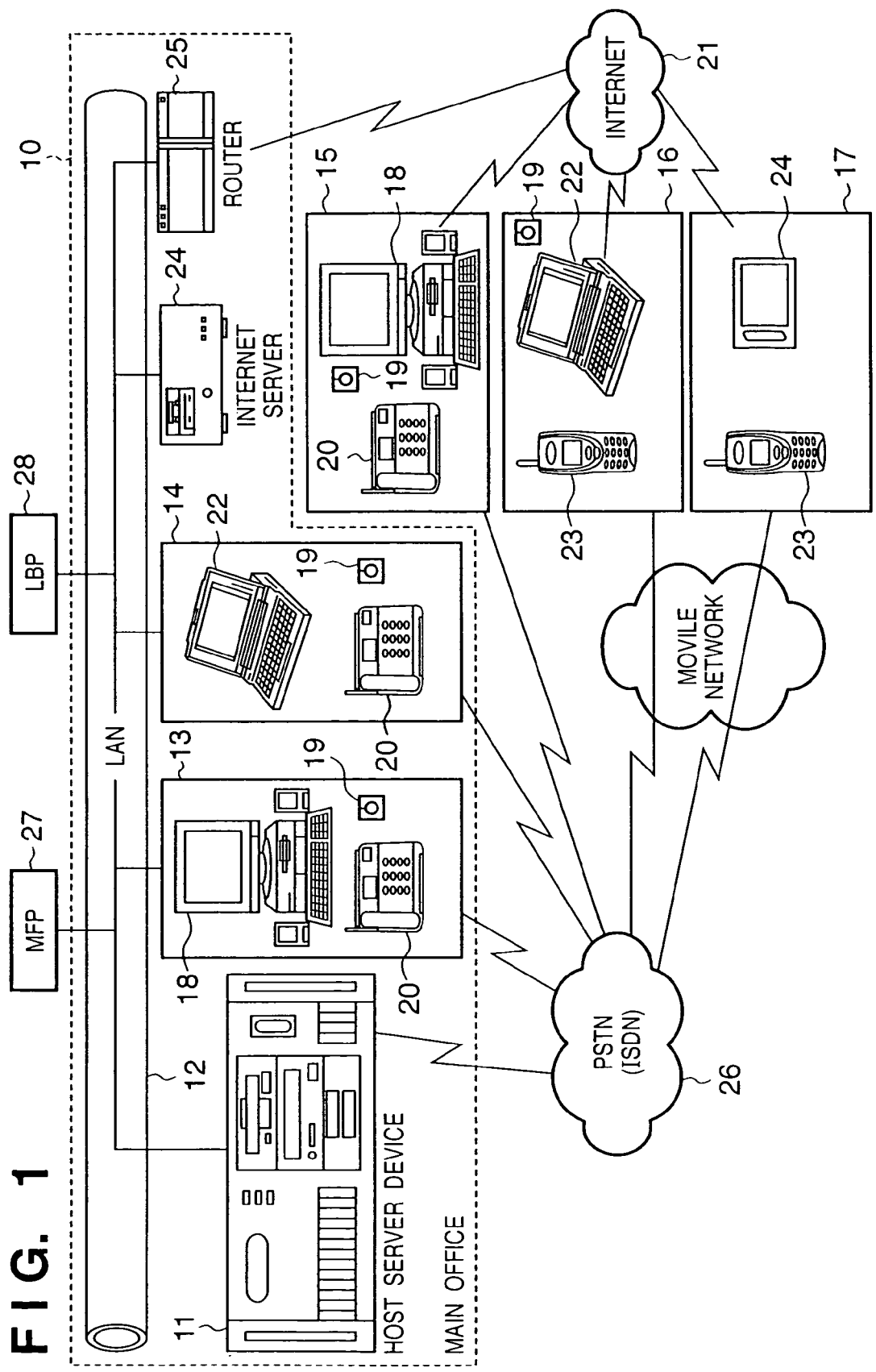
FIG. 1 is a block diagram showing a configuration of a distributed system according to one embodiment of the present invention.

FIG. 1 is a block diagram showing a configuration of a distributed system according to one embodiment of the present invention. It should be noted that the present embodiment illustrates a distributed system but is not limited thereto.

The distributed system, as shown in FIG. 1, is comprised of a main office 10 which may be a main place of business, a home office 15 and mobile offices 16 and 17.

In the main office are installed a host server device 11, a plurality of user terminal stations 13 and 14, a Multi-Function Peripheral device 27 (hereinafter abbreviated as "MFP"), a laser beam printer 28 ("LBP", one type of single-function peripheral device), an internet server 24 and a router 25 connected to the internet 21, all interconnected through a Local Area Network ("LAN").

The host server device 11 is connected to a Public Switched Telephone Network ("PSTN") line 26 including an ISDN line. A server process S for sharing status information among users is installed in the host server device 11. The server process S is designed to operate continuously. The server process S is connectible to a client process X (0<X<M+1) for sharing status information on users of user terminal stations 13, 14, 15, 16, 17 to be described later that are included in the home office and mobile offices and a peripheral device client process P (0<P<N+1) for sharing status information on peripheral devices (MFP 27, LBP 28), and stores status information tables in which status information on the users and the peripheral devices is stored. User status information, such as user name, presence or absence from the desk, status of work, address, location, contact information, can/cannot be contacted, the status of input to input devices, names of active applications and video/audio user status, as well as peripheral device status information, such as name of device, model, location, capabilities, operating status, job information, job processing status, error information and warning information, are included in the status information. The user terminal station 13 is comprised of a desk-top personal computer 18 connected to a LAN 12, user terminal software 19 installed in the computer 18, and a telephone 20 connected to the PSTN line 26. The client process X described above is included in the user terminal software 19 installed on the user terminal stations 13, 14.

The home office 15 is comprised of the desk-top personal computer 18 connectable to the host server device 11 over the internet 21, user terminal software 19 installed on the computer 18, and the telephone 20 connected to the PSTN line 26 as the user terminal station. In addition, the mobile office 16 is comprised of a notebook personal computer 22 connectable to the host server device 11 over the internet 21, user terminal software 19 installed on the computer 22, and a mobile telephone 23 connected to a mobile communications network or the PSTN line 26 as the user terminal station. Moreover, the mobile office 17 is comprised of a hand-held information terminal (with a built-in Web browser) 24 that is connectible to the host server device 11 over the internet 21 and a mobile telephone 23 connected to the mobile communications network or the PSTN line 26 as the user terminal station.

<Example of Host Server Device Configuration>

Figure 2:
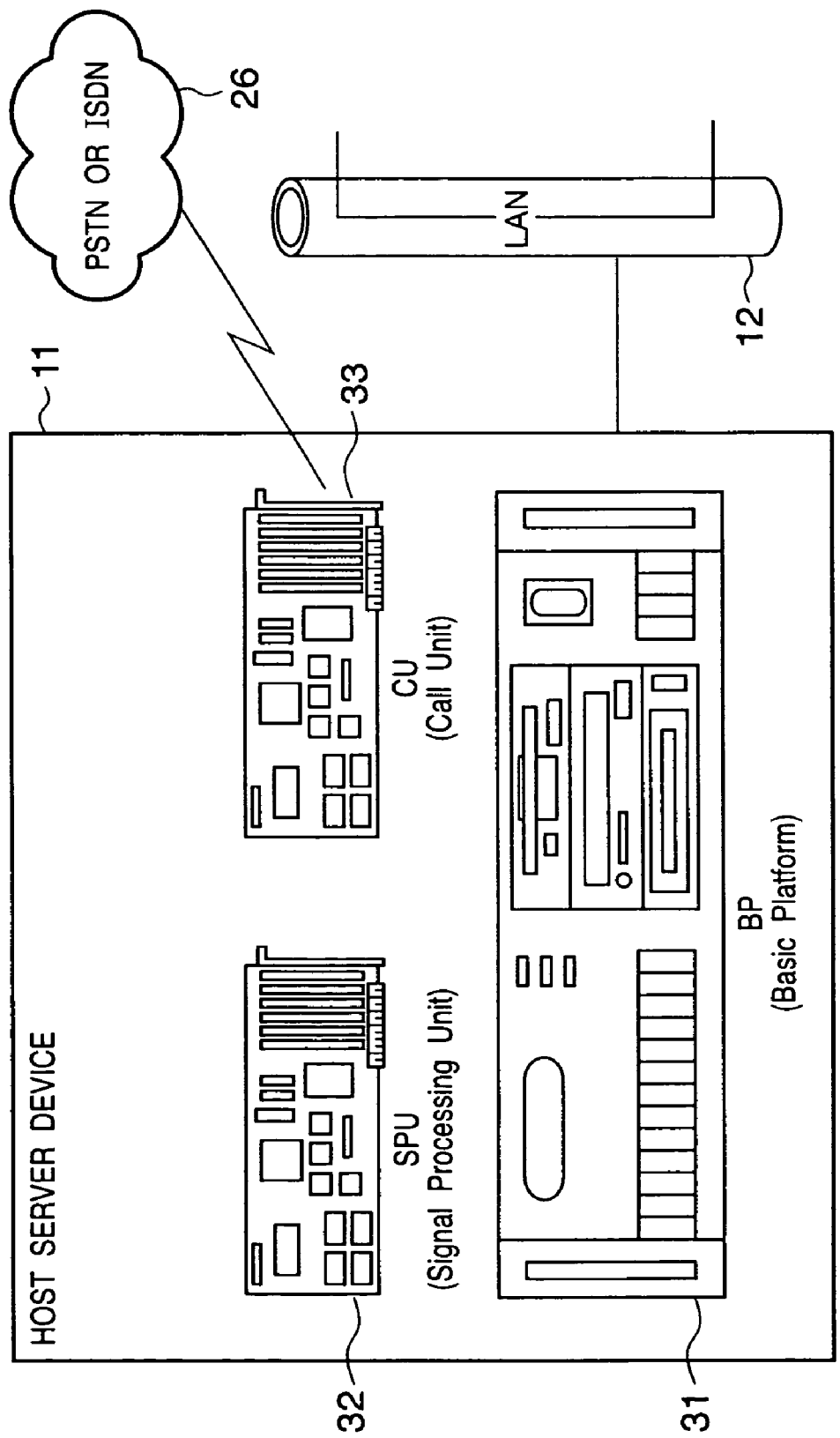
FIG. 2 is a diagram showing a hardware configuration of the host server device shown in FIG. 1.
Figure 3:
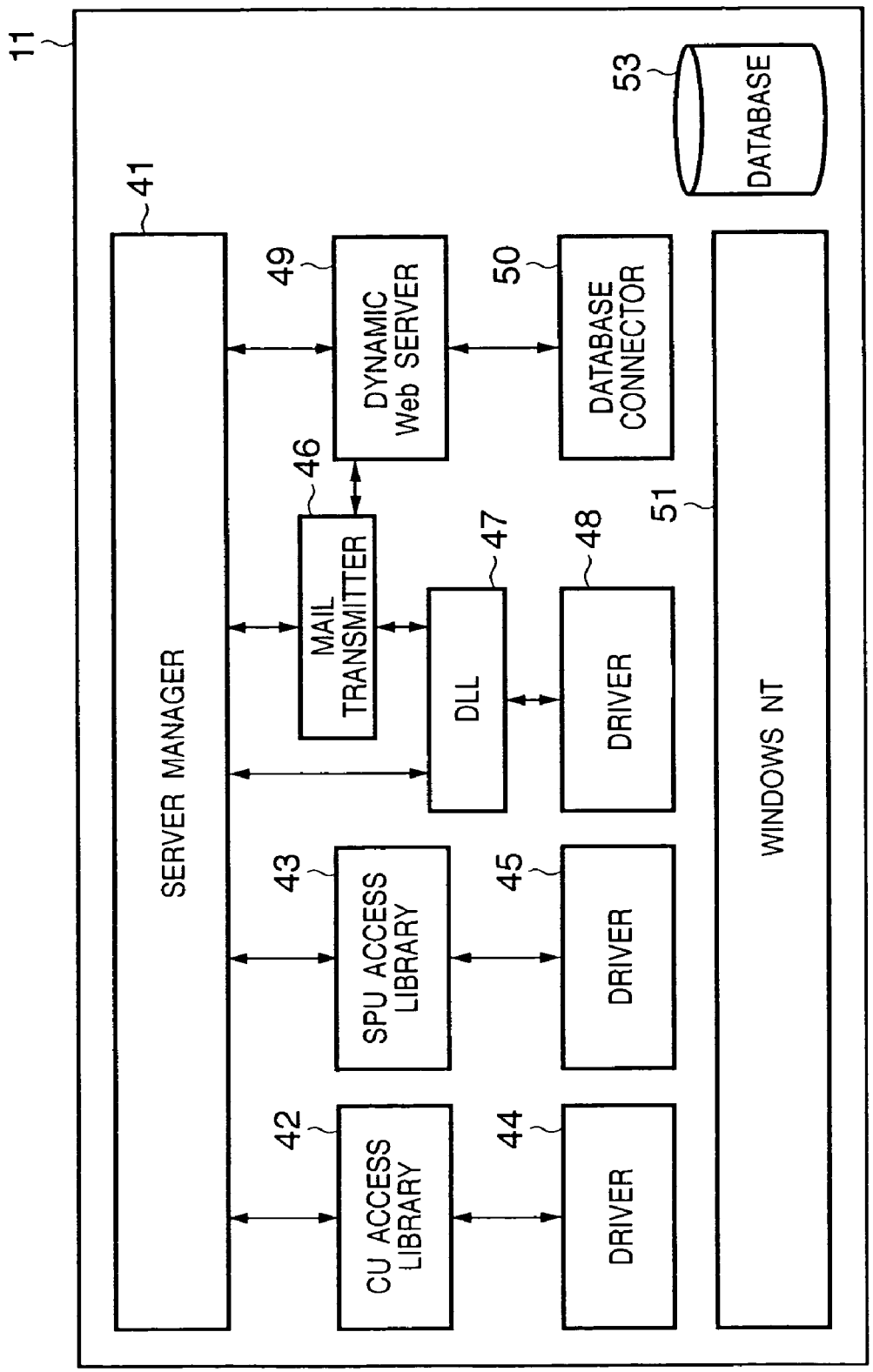
FIG. 3 is a block diagram showing a software configuration of the host server device shown in FIG. 1.

A description is now given of the configuration of the host server device 11, using FIGS. 2 and 3. FIG. 2 is a diagram showing a hardware configuration of the host server device shown in FIG. 1. FIG. 3 is a block diagram showing a software configuration of the host server device shown in FIG. 1.

The host server device 11, as shown in FIG. 2, is comprised of a BP (Basic Platform) 31 that is a PC server device, an SPU (Signal Processing Unit) 32 that acts as a parallel DSP (Digital Signal Processor), and a CU (Call Unit) 33 that acts as a Computer Telephony Board. The BP 31 is connected to a LAN board, not shown, through the LAN 12, and the CU 33 is connected to the PSTN line 26.

The software installed on the host server device 11 includes software programs developed using C++ programming language as well as pre-existing software programs, with, for example, Windows (registered trademark of Microsoft Corp. of the United States) adopted as the OS (operating System).

Specifically, as shown in FIG. 3, a variety of software is run on Windows NT51, with functional blocks such as a server manager 41, a CU access library 42, an SPU access library 43, a CU access library 42 driver 44, an SPU access library 43 driver 45, an e-mail transmitter 46, a DLL (Dynamic Link Library) 47, its driver 48, a dynamic web server 49, a database connector 50 and a database 50 composed of such software.

<Example of User Terminal Device Configuration>

Figure 4:
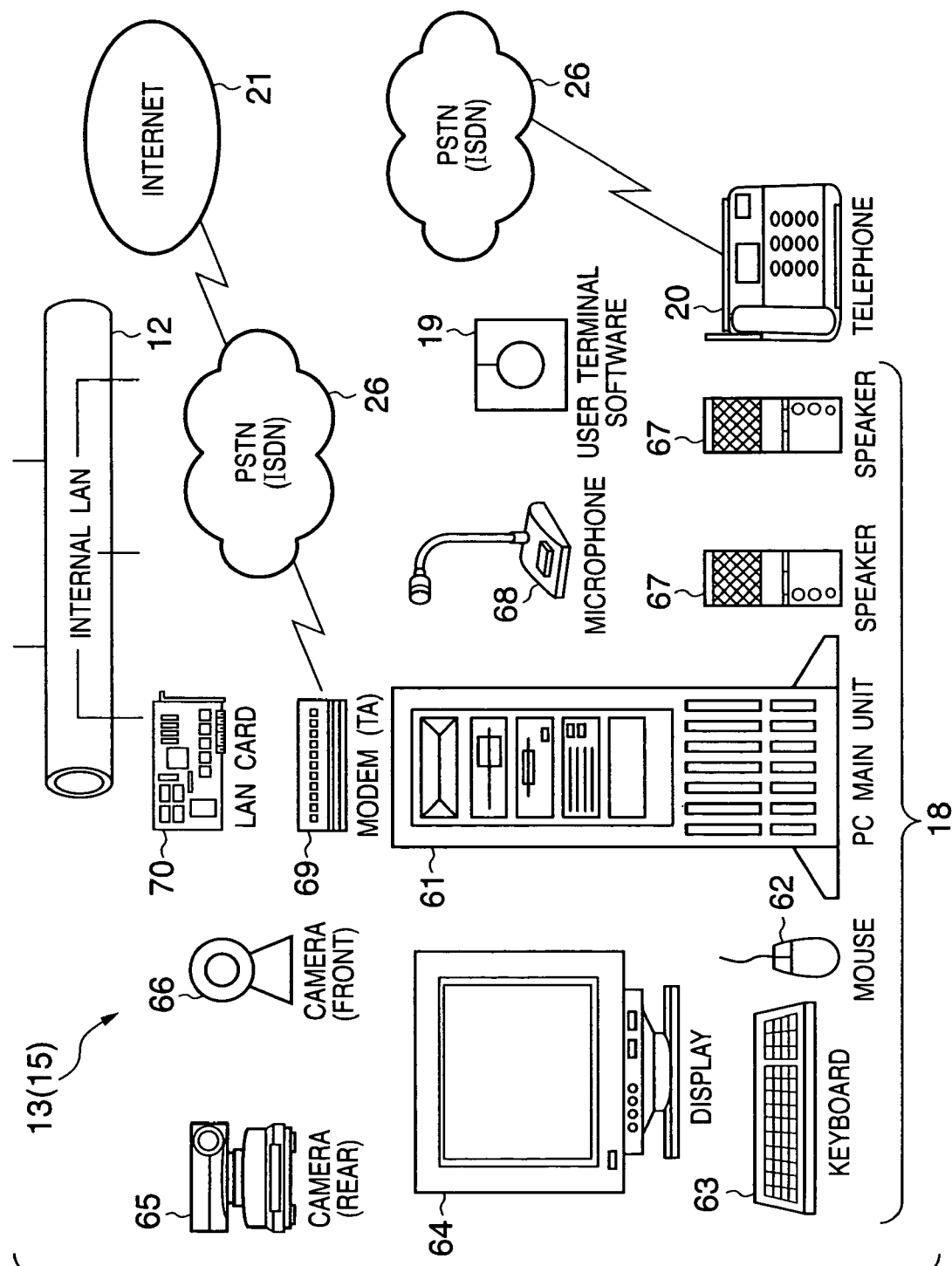
FIG. 4 is a diagram showing a hardware configuration of the user terminal station shown in FIG. 1.
Figure 5:
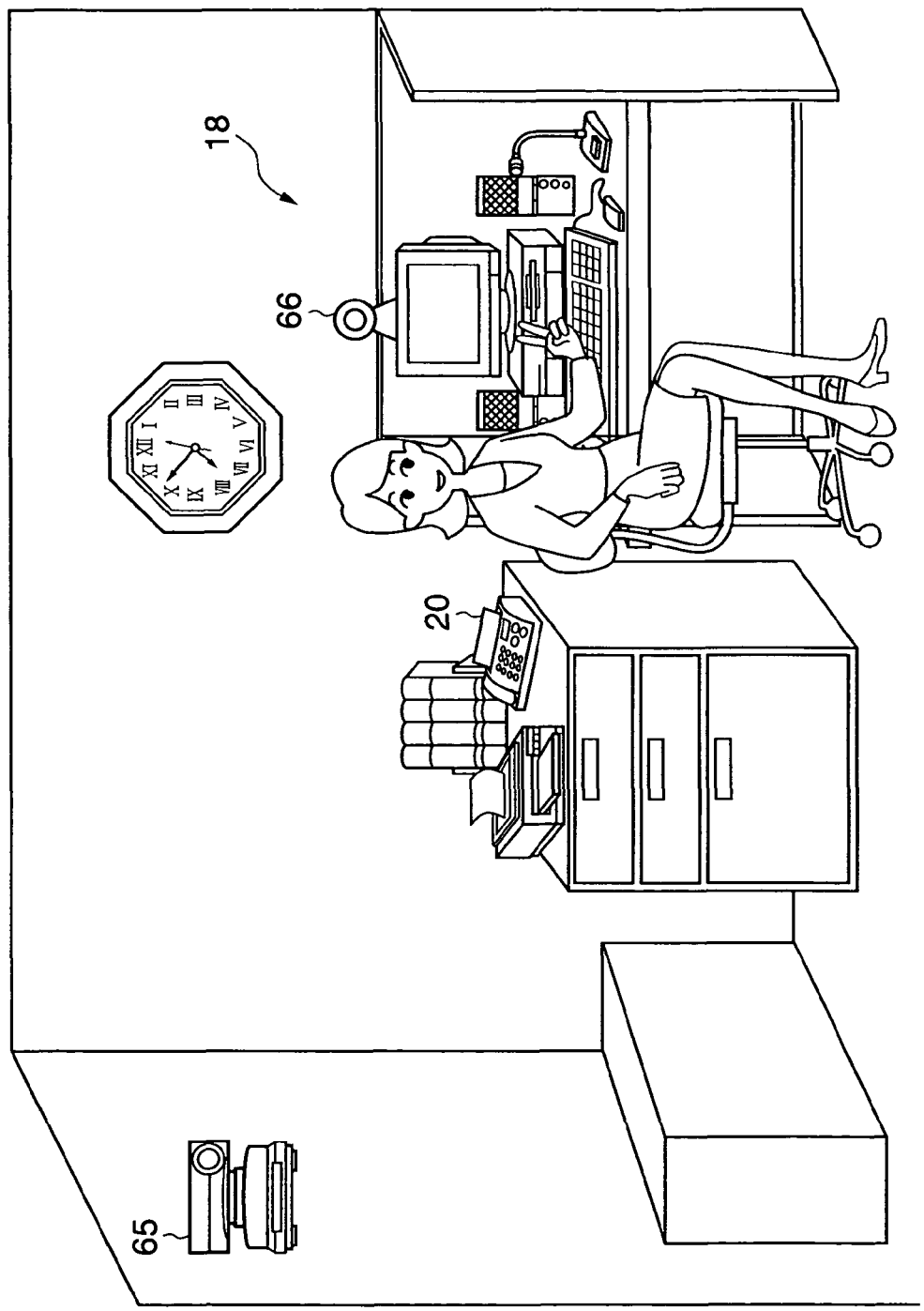
FIG. 5 is a diagram showing an example of equipment disposition in a home office comprised of a user terminal arrangement shown in FIG. 1.

A description is now given of the configurations of the user terminal stations 13 and 14 and the home office 15, using FIGS. 4 and 5.

FIG. 4 is a diagram showing a hardware configuration of the user terminal stations 13 and 14 and the home office 15 shown in FIG. 1. FIG. 5 is a diagram showing an example of equipment disposition in a home office 15 that is one of the user terminals shown in FIG. 1. It should be noted that the user terminal station 13 and 14 and the home office 15 have the same basic structure, and therefore a description is given only of the configuration of the user terminal station 13.

The user terminal station 13, as shown in FIG. 4, is comprised of a personal computer 18, user terminal software 19 and a telephone 20. The personal computer 18 is comprised of a PC main unit 61, with corresponding peripheral devices connected to various input/output ports of the PC main unit 61. In the present embodiment, a mouse 62, a keyboard 63, a display 64, a speaker 67, a microphone 68, a modem 69, a rear camera 65 and a front camera 66 for imaging the user are connected to the PC main unit 61. Moreover, in the user terminal station 13, a LAN card 70 for connecting to the LAN 12 is installed on the PC main unit 61. It should be noted that, in the home office 15, the LAN card 70 is not installed.

The equipment of the home office 15 may, for example, be disposed as shown in FIG. 5. The personal computer 18 is placed on a desk, the front camera 66 is placed in a position where a user operating the personal computer 18 can be seen from the front and the rear camera 65 is placed in a position where the user of the personal computer 18 can be seen from the rear. The user terminal stations 13 and 14 as well as the other equipment in the main office 11 are disposed in the same arrangement shown in FIG. 5.

Figure 6:
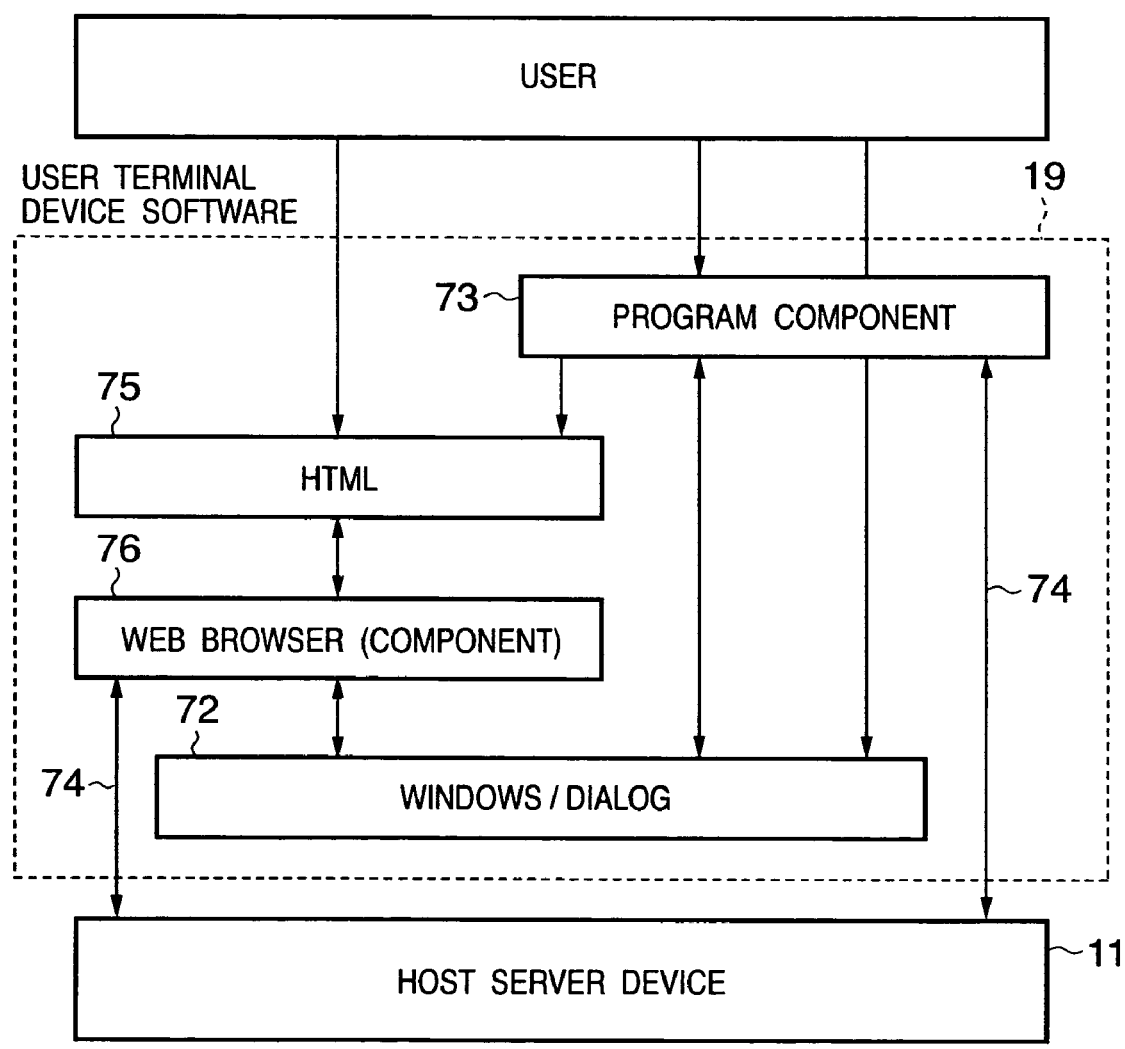
FIG. 6 is a block diagram showing the configuration of user terminal software installed in the user terminal station shown in FIG. 1.

Next, a description is given of the user terminal software installed on the user terminal stations 13 and 14, the home office 15 and the mobile office 16, with reference to FIG. 6. FIG. 6 is a block diagram showing the configuration of user terminal software 19 installed in the user terminal stations 13 and 14, the home office 15 and the mobile office 16 shown in FIG. 1.

The user terminal software 19 includes software programs developed using C++ programming language as well as pre-existing software programs, with Windows (registered trademark of Microsoft Corp. of the United States) adopted as the OS. Specifically, as shown in FIG. 6, functions such as Window/Dialog 72, program component 73, HTML 75 and Web Browser (component) 76 are composed of various software run on the Windows OS. The program component 73 and the Web Browser (component) 76 are connected to the host server device 11 by a signal line 74.

<Example of MFP (Multi Function Peripheral) Configuration>

Figure 7:
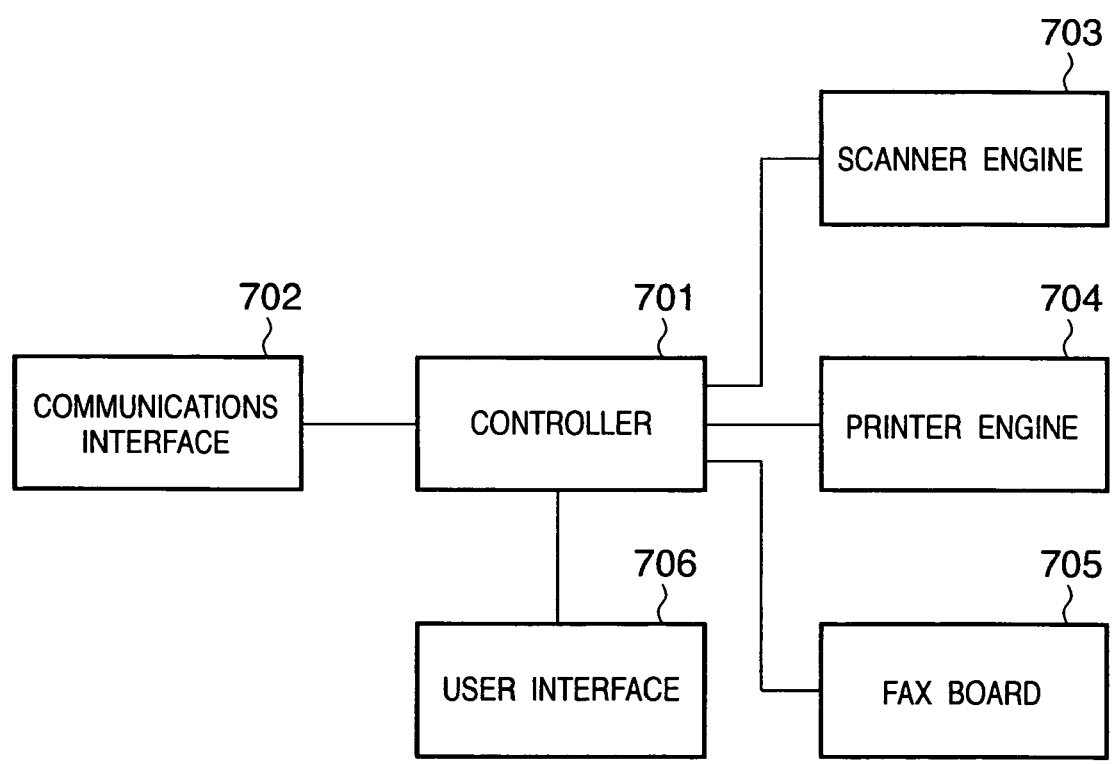
FIG. 7 is a diagram showing a hardware configuration of the peripheral device MFP shown in FIG. 1.
Figure 8:
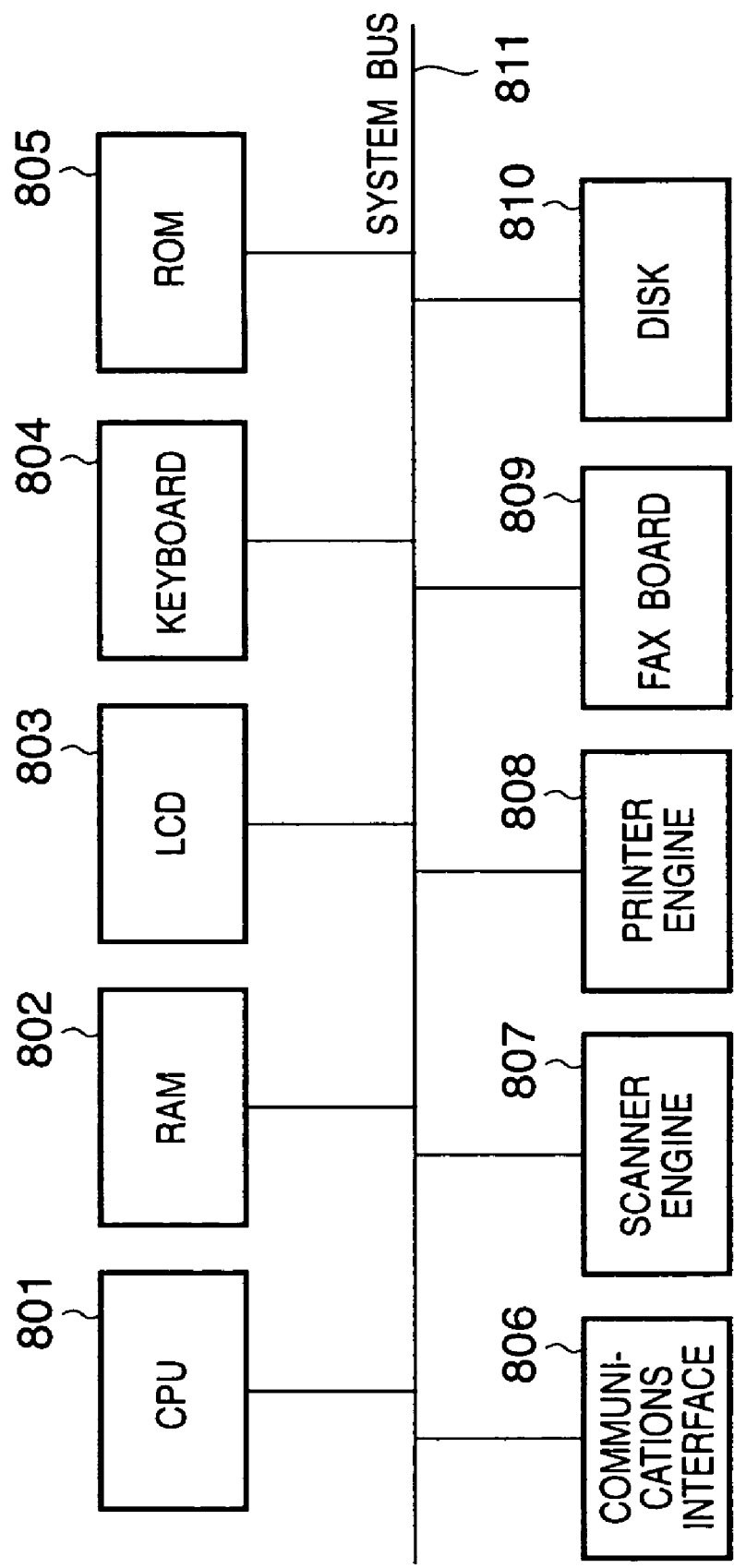
FIG. 8 is a block diagram illustrating a detailed configuration of hardware resources for the controller shown in FIG. 7.

Next, a description is given of the configuration of the MFP 27 using FIGS. 7 and 8. FIG. 7 is a diagram showing a hardware configuration of the MFP 27 shown in FIG. 1. FIG. 8 is a block diagram illustrating a detailed configuration of hardware resources for the controller 701 shown in FIG. 7.

In FIG. 7, 701 designates a controller for controlling the peripheral devices. The controller 701, which is described in detail later, is equipped with hardware resources like those shown in FIG. 8. Reference numeral 702 designates a communications interface for external communications for the peripheral devices, and may, for example, be an Ethernet interface, and IEEE 1284 interface or some other communications interface.

Reference numeral 703 designates a scanner engine, which is controlled by the controller 701. Reference numeral 704 designates a printer engine, which is controlled by the controller 701. The printer engine 704 may, for example, be a laser beam printer, an ink jet printer, or some other type of printer.

Reference numeral 705 designates a facsimile board for providing a facsimile capability, such as communications control when sending and receiving images, and is controlled by the controller 701. Reference numeral 706 designates a user interface, composed of a LCD display and a keyboard. The user interface 706 displays information from the controller 701 and sends instructions from the user to the controller 701.

A peripheral device having a configuration like that described above makes it possible to select the printer engine 704 using the controller 701 and to issue a print job. Moreover, such a configuration makes it possible to select the printer engine 704 and the scanner engine 703 and to issue a copy job. Moreover, such a configuration makes it possible to select the printer engine 704, the scanner engine 703 and the facsimile board 705 and to issue a facsimile reception job and a facsimile transmission job.

As shown in FIG. 8, the controller 701 is comprised of a CPU 801, a RAM 802, an LCD 803, a keyboard 804, a ROM 805, a communications interface 806, a scanner engine 807, a printer engine 808, a facsimile board 809 and a disk 810, each connected to the others through a system bus 811. A program for controlling the controller 701 shown in FIG. 7 is stored on the ROM 805 or the disk 810, and read to the RAM 802 and executed by the CPU 801 as necessary.

In addition to the control program, attribute information indicating the capabilities and status of the peripheral devices and the jobs processed by the peripheral devices, as well as job data to be output, are stored on the ROM 805 and the disk 810. Further, the CPU 801 displays information via the LCD 803 and receives instructions from the user through the keyboard 804. The CPU 801 communicates externally through the communications interface 806.

In the present embodiment, unless specifically prohibited, of the peripheral devices in FIG. 7, the CPU 801 receives user input from the keyboard 804 through the system bus 811, and controls the RAM 802, the LCD 803, the keyboard 804, the ROM 805, the communications interface 806, the scanner 807 the printer engine 808, the facsimile board 809 and the disk 810 so as to execute a job.

<Example of LBP (Laser Beam Printer) Configuration>

Figure 9:
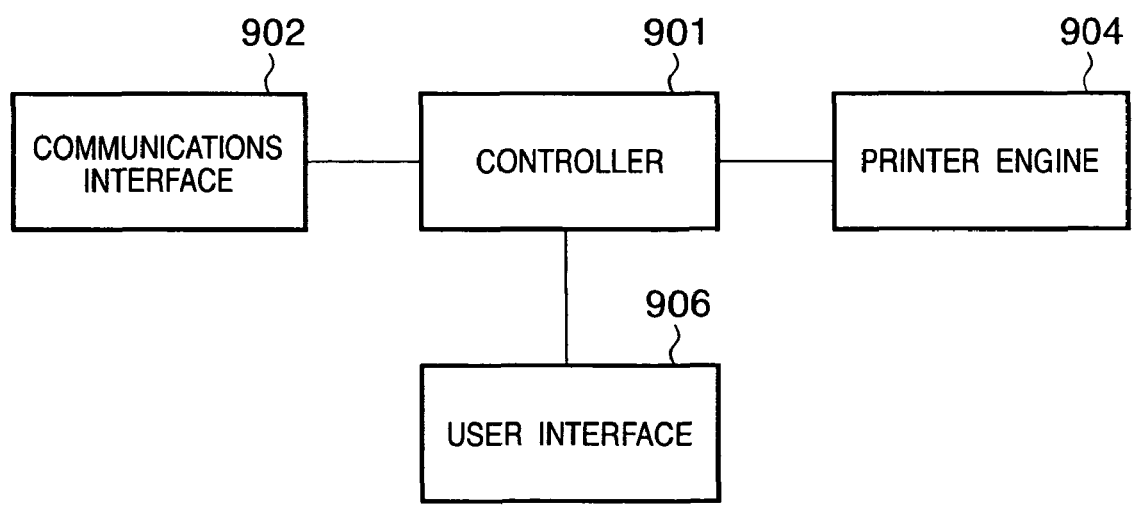
FIG. 9 is a diagram showing a hardware configuration of the peripheral device LBP shown in FIG. 1.
Figure 10:
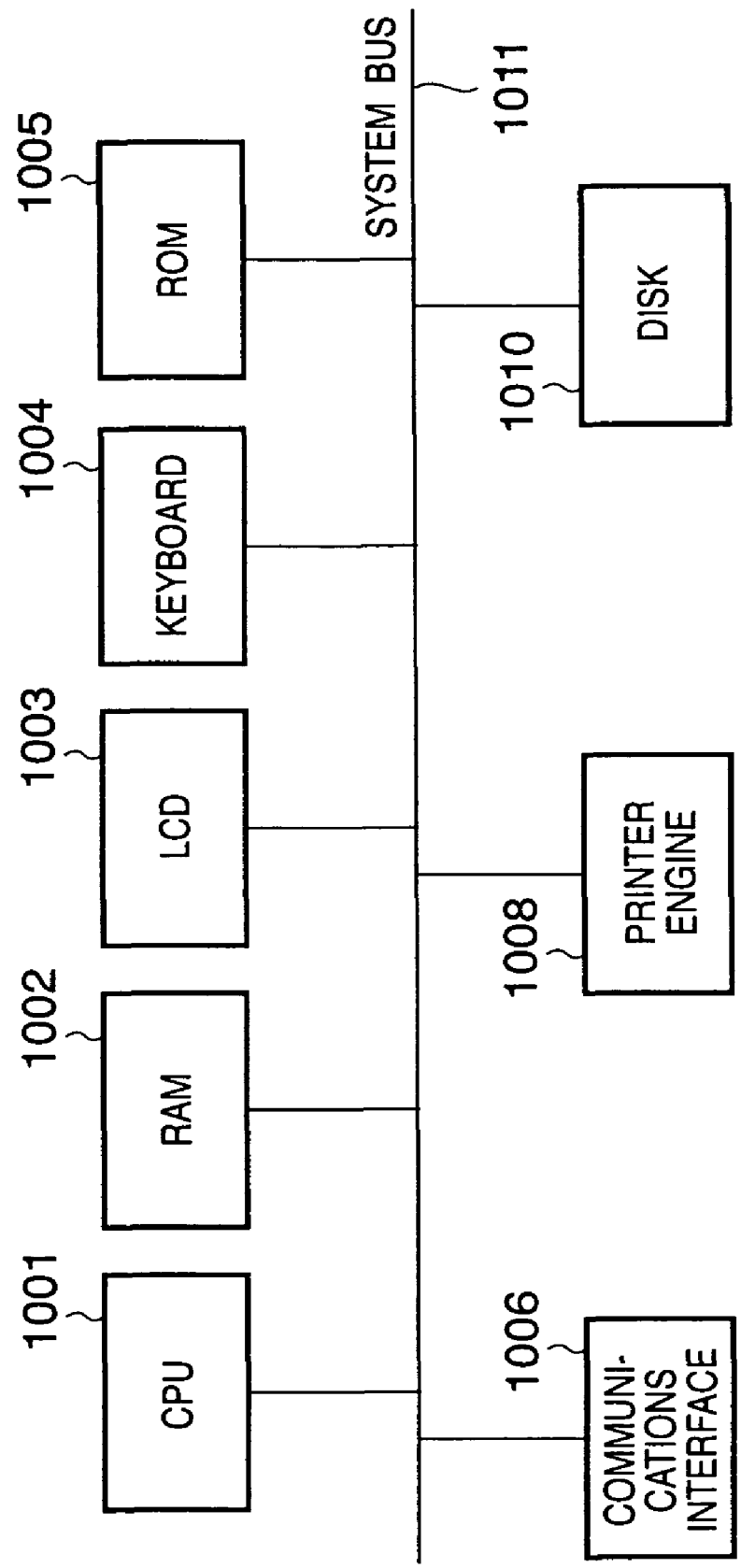
FIG. 10 is a block diagram illustrating a detailed configuration of hardware resources for the controller shown in FIG. 9.

Next, a description is given of the configuration of the LBP 28, using FIGS. 9 and 10. FIG. 9 is a diagram showing a hardware configuration of the LBP 28 shown in FIG. 1. FIG. 10 is a block diagram illustrating a detailed configuration of hardware resources for a controller 901 shown in FIG. 9.

In FIG. 9, 901 designates a controller for controlling the peripheral devices. The controller 901, which is described in detail later, is provided with hardware resources like those shown in FIG. 9. Reference numeral 902 designates a communications interface to enable the controller 901 to communicate externally with the peripheral devices. The communications interface 902 may, for example, be an Ethernet interface, an IEEE 1284 interface or some other type of interface. Reference numeral 904 designates a printer engine, which is controlled by the controller 901. The printer engine 904 may, for example, be a laser beam printer, an ink jet printer or some other type of printer.

A peripheral device having a configuration like that described above makes it possible to select the printer engine 904 through the controller 901 and to issue a print job.

As shown in FIG. 10, the controller 901 is comprised of a CPU 1001, a RAM 1002, an LCD 1003, a keyboard 1004, a ROM 1005, a communications interface 1006, a printer engine 1008 and a Disk 1010, each connected to the others by a system bus 1011.

A program for controlling the controller 901 shown in FIG. 9 is stored on the ROM 1005 or the disk 1010, and read to the RAM 1002 and executed by the CPU 1001 as necessary. In addition to the control program, attribute information indicating the capabilities and status of the peripheral devices and the jobs processed by the peripheral devices, as well as job data to be output, are stored on the ROM 1005 and the disk 1010.

Further, the CPU 1001 displays information via the LCD 1003 and receives instructions from the user through the keyboard 1004. The CPU 1001 communicates externally through the communications interface 1006.

In the present embodiment, unless specifically prohibited, of the peripheral devices in FIG. 9, the CPU 1001 receives user input from the keyboard 1004 through the system bus 1011, and controls the RAM 1002, the LCD 1003, the keyboard 1004, the ROM 1005, the communications interface 1006, the scanner 1007, the printer engine 1008, the facsimile board 1009 and the disk 1010 so as to execute a job.

<Example of Server Process S Installed on Host Server Device>

Figure 11:
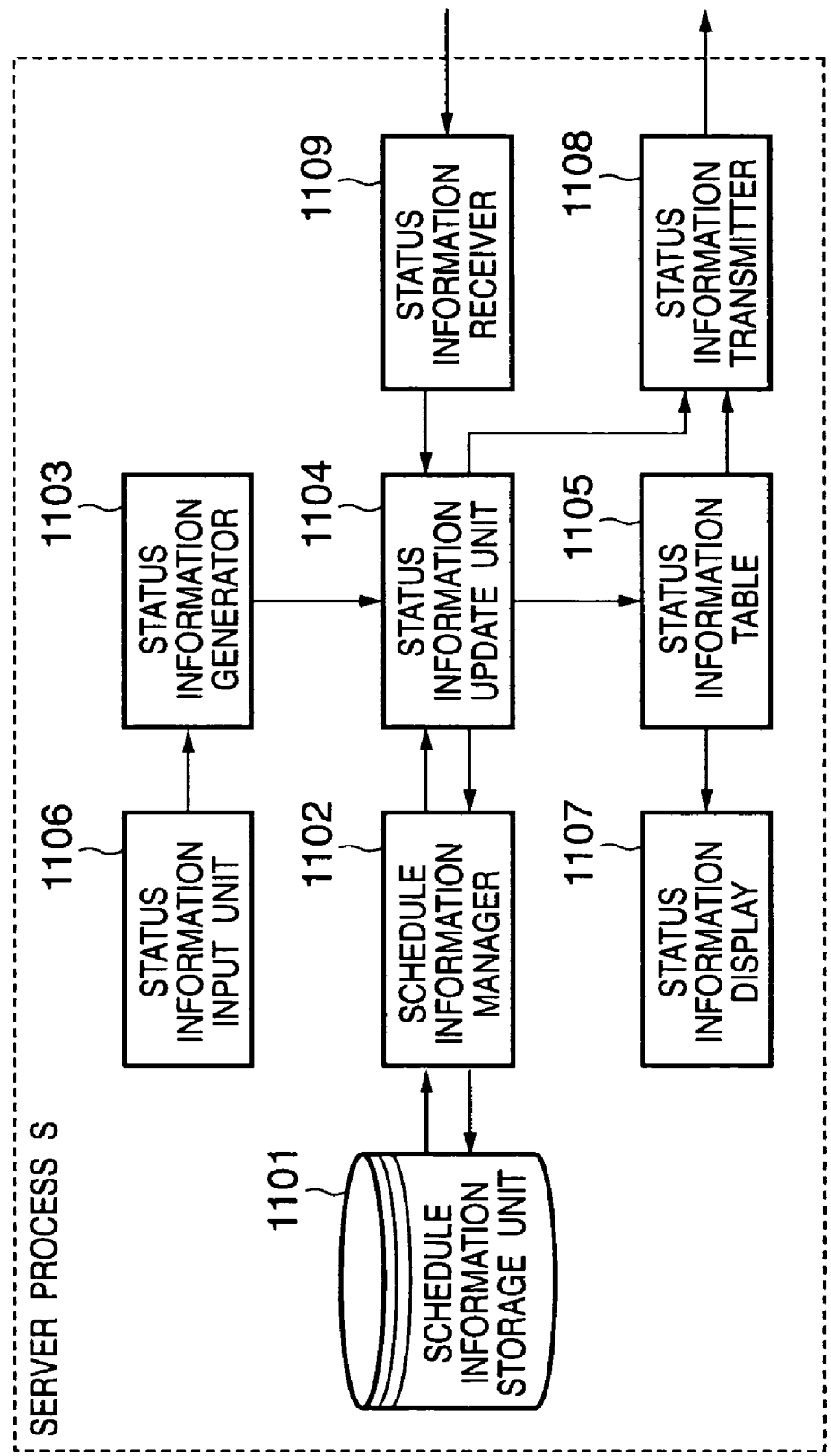
FIG. 11 is a block diagram showing a functional configuration of a server process S installed in the host server device shown in FIG. 1.

The server process S manages both status information of users of the user terminal stations 13, 14, the home office 15 and the mobile offices 16, 17 connected by a network such as the LAN 12, the PSTN line 26 or the Internet 21 as well as status information of peripheral devices (MFP 27, LBP 28), and transmits the latest information to the user terminal stations 13, 14, the home office 15 and the mobile offices 16, 17. The server process S, as shown in FIG. 11, includes a schedule information storage unit 1101, a schedule information manager 1102, a status information generator 1103, a status information update unit 1104, a status information table 1105, a status information input unit 1106, a status information display 1107, a status information transmitter 1108 and a status information receiver 1109.

Schedule information for each user is stored in the schedule information storage unit 1101 and managed by the schedule information manager 1102. The schedule information manager 1102 writes user schedule information to, and reads and deletes user schedule information from, the schedule information storage unit 1101 according to requests (status information update unit 1104) from the user. Moreover, the schedule information manager 1102 changes schedule information read from the schedule information storage unit 1101 into status information.

The status information input unit 1106 inputs commands for manipulating the user terminal station 13, 14 status information and schedule information as well as peripheral device (MFP 27, LBP 28) status information, and also inputs commands for manipulating the server process S. The input information is provided to the status information generator 1103. The status information generator 1103 generates status information signals composed of the commands for manipulating the user terminal station (13, 14) status information and schedule information as well as peripheral device (MFP 27, LBP 28) status information, and of the commands for manipulating the server process S. The status information signals thus generated are input to the status information update unit 1104.

The status information receiver 1109 receives status information signals sent from the home office 15 and mobile offices 16, 17 indicating the status of the user as well as status information signals indicting the status of the peripheral devices sent from the peripheral devices (MFP 27, LBP 28). The status information signals contain commands for manipulating the status information and schedule information for the home office 15 and the mobile offices 16, 17, commands for manipulating the status information and schedule information for the peripheral devices (MFP 27, LBP 28), and commands for manipulating the server process S. The status information signals thus generated are input to the status information update unit 1104.

The status information update unit 1104 proceeds with processing based on user status information signals input from the status information generator 1103 and the status information receiver 1109. For example, where a status information update command is contained in the status information signal as a status information manipulation command, the status information update unit 1104 updates the information stored in the status information table 1105 based on the status information contained in the input status information signals. Where a status information acquisition command is contained in the input status information signal as a status information manipulation command, the status information update unit 1104 issues a command to transmit to the user terminal stations designated the latest information in the status information table 1105 in accordance with the input status information acquisition command.

The status information table 1105 is a table in which is recorded personal information relating to the status information of users, such as user names, presence and absence information, work status, address, location, contact information, contactable/not contactable, status of input to input devices, names of applications running, and video and audio, as well as information relating to the status information of the peripheral devices, such as the names of the peripheral devices, models, locations, capabilities, operating status, job information, job processing status, error information and warning information. The status information recorded in the table is read out in accordance with instructions from the status information update unit 1104, sent to the status information display 1107 or the status information transmitter 1108, or updated as appropriate. It should be noted that, when the status information is sent to the status information transmitter 1108, a transmit command containing the parties to which the status information is to be distributed and the like is sent from the status information update unit 1104 to the status information transmitter 1108.

The status information display 1107 displays the status information from the status information table 1105. The status information transmitter 1108 transmits status information to the parties designated in accordance with the transmit command from the status information update unit 1104.

<Example of Client Process X Installed on User Terminal Devices, Including Home Office and Mobile Offices>

Figure 12:
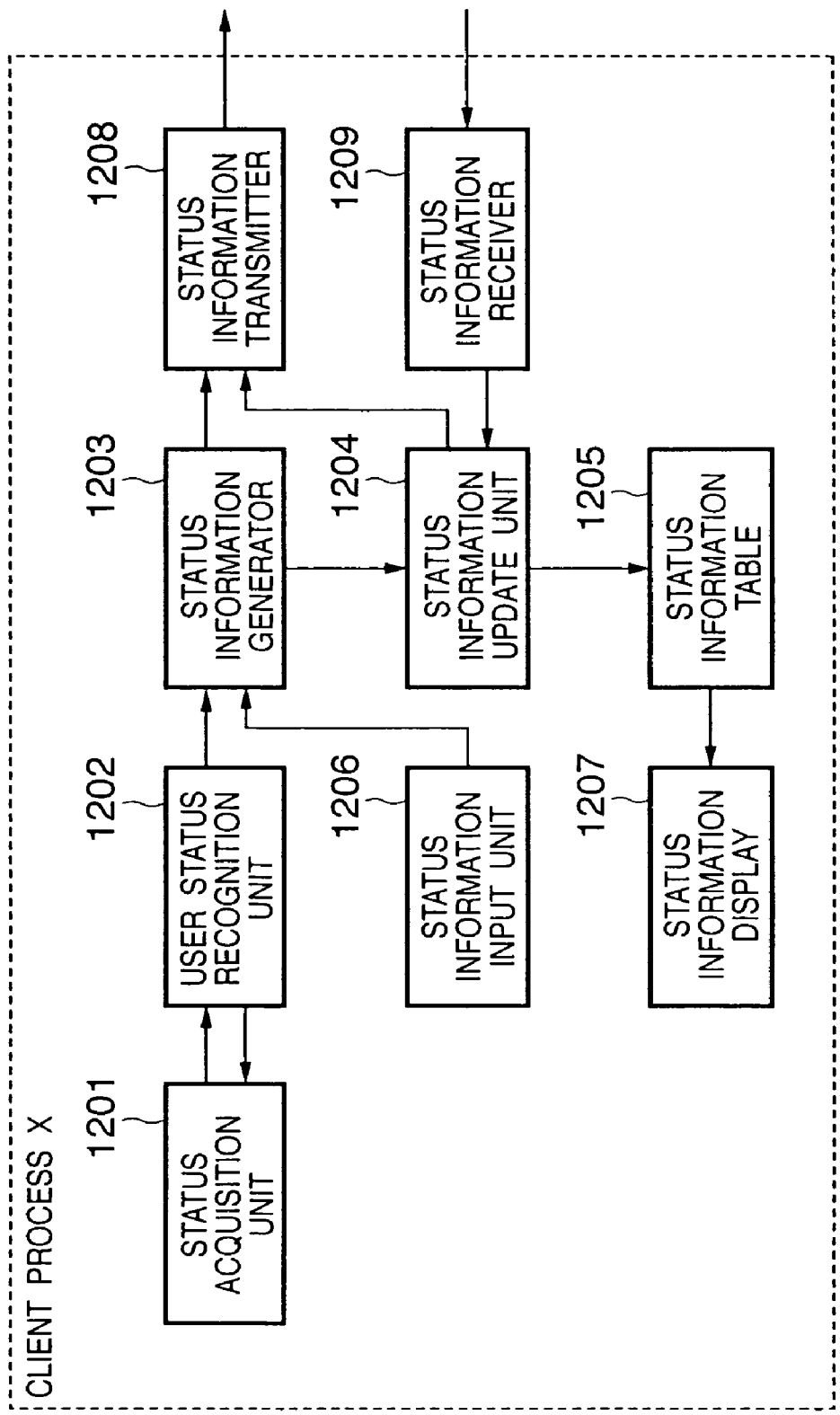
FIG. 12 is a block diagram showing a functional configuration of a client process X in the user terminal station shown in FIG. 1.
Figure 13:
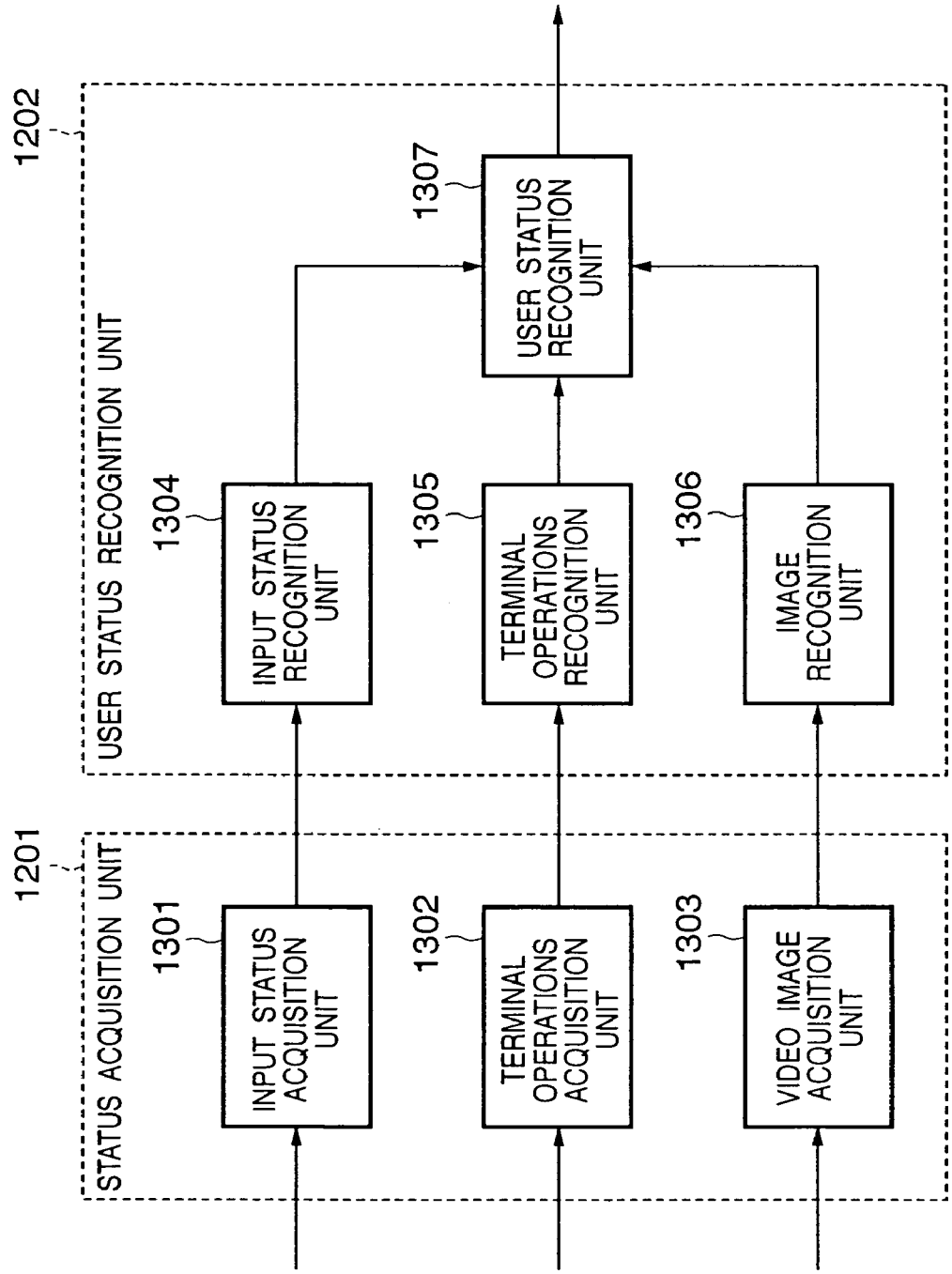
FIG. 13 is a block diagram showing a detailed configuration of the status acquisition unit and the user status recognition unit shown in FIG. 12.

Next, a description is given of the configuration of the client process X in the user terminal station 13, 14, home office 15 and mobile offices 16, 17, using FIGS. 12 and 13. FIG. 12 is a block diagram showing the functional configuration of a client process X in the user terminal stations 13, 14, the home office 15 and the mobile offices 16, 17 shown in FIG. 1. FIG. 13 is a block diagram showing the configuration of a status acquisition unit 1201 and the user status recognition unit 1202 shown in FIG. 12.

The client process X is comprised of an interface for displaying status information. The client process X displays the latest status information relating to other users and the user operating the client process X, as well as updates status information in response to instructions to update status information of such users. Moreover, the client process X works with the server process S to provide status information among users.

The client process X is processed mainly by the program component 73 shown in FIG. 6. The program component 73, as shown in FIG. 12, includes the status acquisition unit 1201, the user status recognition unit 1202, a status information generator 1203, a status information update unit 1204, a status information table 1205, a status information input unit 1206, a status information display 1207, a status information transmitter 1208 and a status information receiver 1209.

The status acquisition unit 1201 obtains the status of a user operating the client process X. Specifically, as shown in FIG. 13, the status acquisition unit 1201 is comprised of an input status acquisition unit 1301 for acquiring the status of input by such user to an input device such as a keyboard, a terminal operations acquisition unit 1302 for checking use applications running on a user terminal station of such user in order to obtain the operating status at the user terminal station of such user, and a video image acquisition unit 1303 for acquiring image data (still images or moving images) of the user as imaged by the cameras. Accordingly, the status acquisition unit obtains a variety of status information regarding the user, such as input status, terminal operating status and video images, which is then input to the user status recognition unit 1202.

The user status recognition unit 1202 activates the status acquisition unit 1201 periodically or as instructed to do so by the status information generator 1203 in order to obtain the status of the user. In addition, the user status recognition unit 1202 also checks whether the user is present or absent from the variety of information relating to the user that is input from the status acquisition unit 1201. Specifically, as shown in FIG. 13, the user status recognition unit 1202 is comprised of an input status recognition unit 1304, a terminal operations recognition unit 1305, an image recognition unit 1306 and a user status recognition unit 1307. Using the input status obtained by the input status acquisition unit 1301, the input status recognition unit 1304 checks such status as whether or not the user is present and how busy such user is. Using the user application and terminal operations status obtained by the terminal operations acquisition unit 1302, the terminal operations recognition unit 1305 checks such status as the user work status and how busy such user is. Using user images (still images or moving images) obtained by the video image acquisition unit 1303, the image recognition unit 1306 checks whether or not the user is in the vicinity of the user terminal station and checks such status as the user work status and how busy such user is.

The results of the checks performed by the input status recognition unit 1304, the terminal operations recognition unit 1305 and the image recognition unit 1306 are input to the user status recognition unit 1307. Using the results of the individual checks thus input, the user status recognition unit 1307 identifies the presence or absence status of the user, the user's work status and how busy the user is and thus checks the status of the user. The user status detected as described in the foregoing is input to the status information generator 1203.

The status information input unit 1206 inputs commands for manipulating the user terminal station status information and the contents of the schedule information storage unit 1101, as well as command for manipulating the server process S. The information thus input is provided to the status information generator 1203. Based on the information input from the status information input unit 1206 and the user status input from the user status recognition unit 1202, the status information generator 1203 generates status information signals composed of commands for manipulating the user status information and schedule information as well as commands for manipulating the server process S. The status information signals thus generated are then input to the status information update unit 1204.

The status information receiver 1209 receives status information signals indicating the user status that are transmitted from the server process S. The status information signals contain commands for updating the status information of the user terminal station 13, 14, the home office 15 and the mobile offices 16, 17 as well as the contents of the status information table 1205. The status information signals are input to the status information update unit 1204.

The status information update unit 1204 proceeds with processing based on user status information signals input from the status information generator 1203 and the status information receiver 1209. For example, where a status information update command is included in the input status information signals as a status information manipulation command, the status information update unit 1204 updates the status information table 1205 stored information based on the status information contained in the input status information signals.

The status information table 1205 is a table in which is recorded personal information relating to the status information of users, such as user names, presence and absence information, work status, address, location, contact information, contactable/not contactable, status of input to input devices, names of applications running, and video and audio. The status information table 1205 status information is read out in accordance with instructions from the status information update unit 1204 and sent to the status information display 1207, or synchronized with the status information table 1105 on the server process S and updated as appropriate so as always to match the contents of that status information table 1105.

The status information display 1207 displays status information read out from the status information table 1205. The status information transmitter 1208 transmits the status information signals generated by the status information generator 1203 to the server process S in accordance with a transmit command from the status information update unit 1204.

<Example of Peripheral Device Client Process P Installed on Peripheral Devices>

Figure 14:
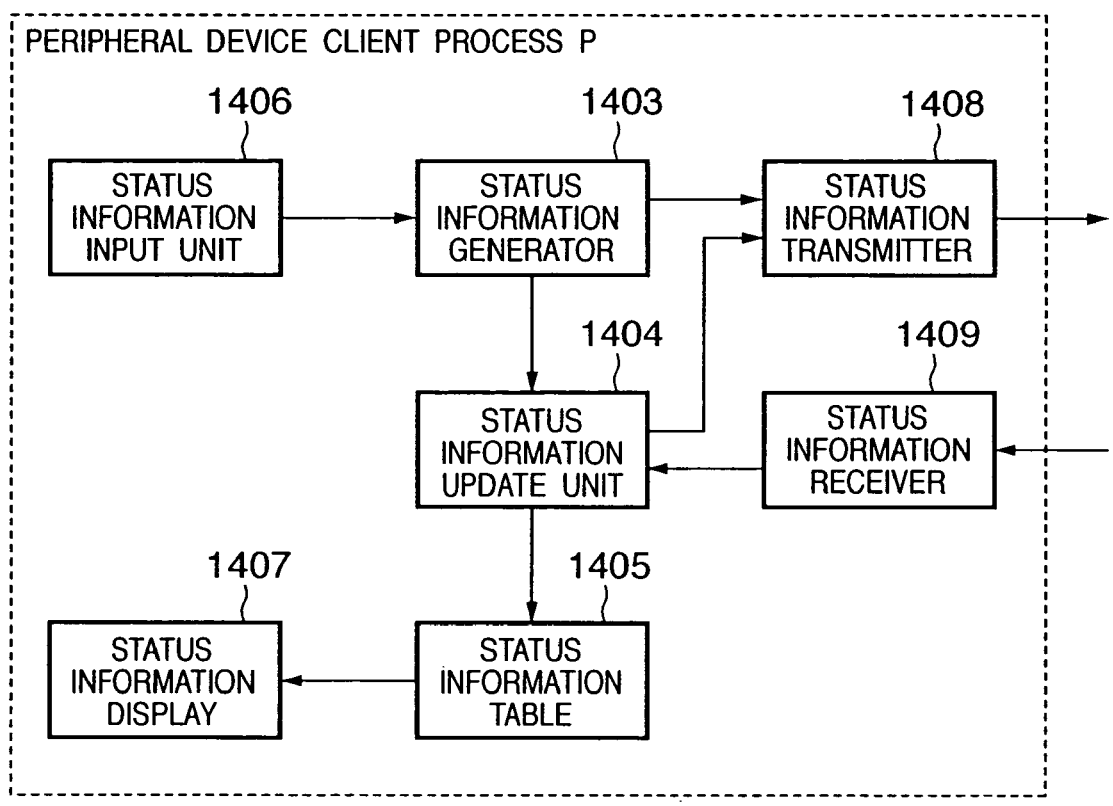
FIG. 14 is a block diagram showing a functional configuration of a peripheral device client process P in the peripheral devices shown in FIG. 1.

Next, a description is given of the configuration of a peripheral device client process P in the peripheral devices (MFP 27, LBP 28), using FIG. 14. FIG. 14 is a block diagram showing a functional configuration of the peripheral device client process P in the peripheral devices shown in FIG. 1.

The peripheral device client process P is comprised of an interface for displaying status information and for updating status information according to instructions to update user status information. Moreover, the peripheral device client process P works with the server process S to share peripheral device status information.

The peripheral device client process P, like the client process X, is processed mainly by the program component 73 as shown in FIG. 6. The program component 73, as shown in FIG. 14 includes a status information generator 1403, a status information update unit 1404, a status information table 1405, a status information input unit 1406, a status information display 1407, a status information transmitter 1408 and a status information receiver 1409.

The status information input unit 1406 inputs peripheral device status information as well as commands for manipulating the server process S. The information thus input is provided to the status information generator 1403. Based on the information and peripheral device status input from the status information input unit 1406, the status information generator 1403 generates status information signals composed of user status information as well as commands for manipulating the server process, with the status information signals thus generated input to the status information update unit 1404.

The status information receiver 1409 receives status information signals indicating user status transmitted from the server process S. The status information signals contain commands for updating the contents of the status information table 1405 as well as peripheral device (MFP 27, LBP 28) status information. The status information signals thus received are input to the status information update unit.

The status information update unit 1404 proceeds with processing based on the peripheral device status information signals input from the status information generator 1403 or the status information receiver 1409. For example, where a status information update command is contained in an input status information signal as a status information manipulation command, the information stored in the status information update unit 1404 updates the status information table 1405 based on the status information included in the input status information signal. Where a status information request command is contained in the input status information signal as the status information manipulation command, the status information update unit 1404 issues a command to transmit the status information generated by the status information generator 1403 in accordance with the input status information request command to the server process S.

The status information table 1105 is a table in which is recorded information relating to the status information of the peripheral devices, such as the names of the peripheral devices, models, locations, capabilities, operating status, job information, job processing status, error information and warning information. The status information recorded in the status information table 1405 is read out in accordance with instructions from the status information update unit 1404, and sent to the status information display 1407 or synchronized with the status information table 1105 on the server process S and updated as appropriate so as always to match the contents of that status information table 1105.

The status information transmitter 1408 transmits status information signals generated by the status information generator 1403 in accordance with a command to transmit from the status information update unit 1404.

<Example of Operation of the Distributed System of the Present Embodiment>

Figure 15:
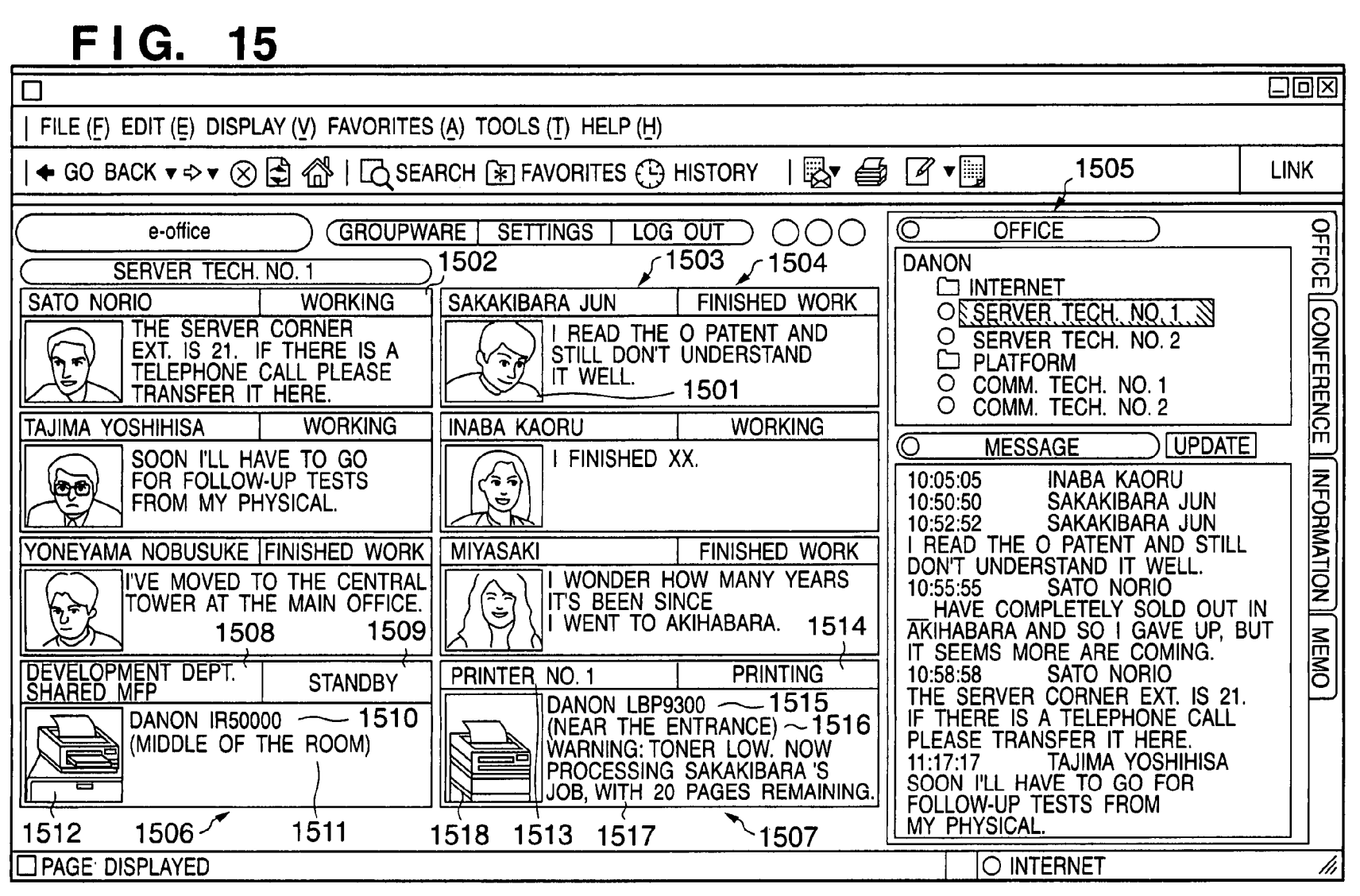
Figure 16:
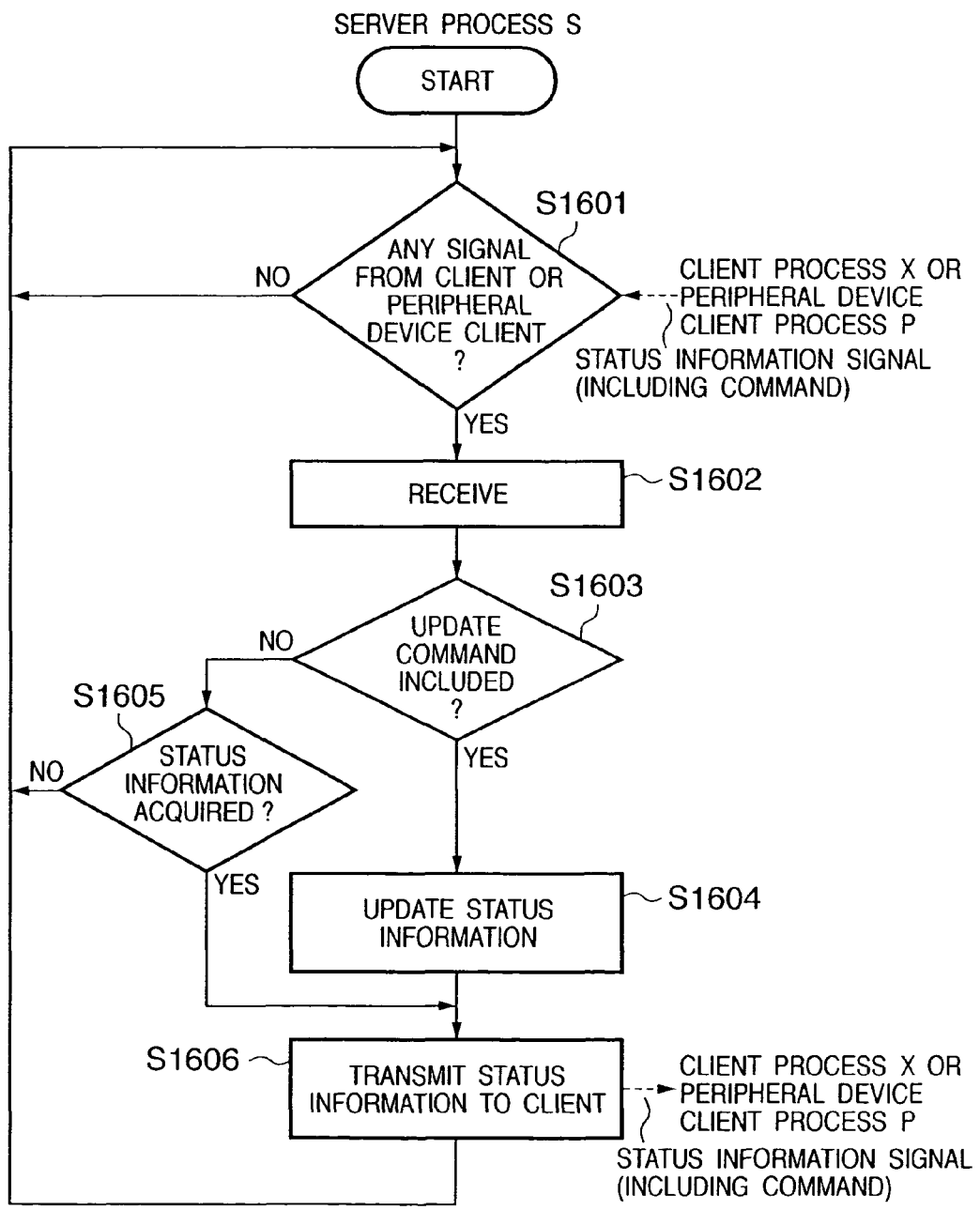
FIG. 16 is a flow chart showing an operating procedure of a server process S of the host server device shown in FIG. 1.
Figure 17:
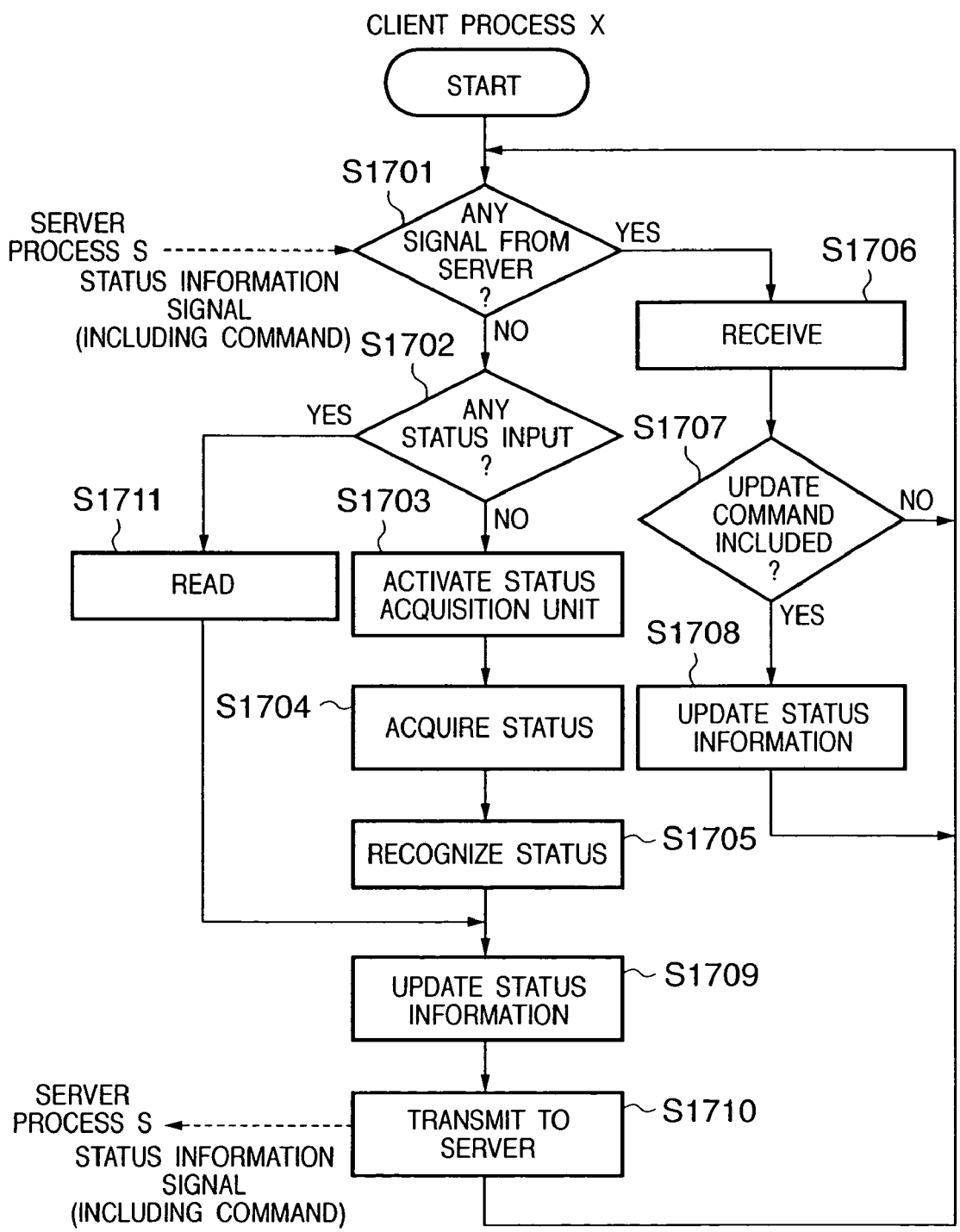
FIG. 17 is a flow chart showing an operating procedure of a peripheral device client process P of the peripheral devices shown in FIG. 1.
Figure 18:
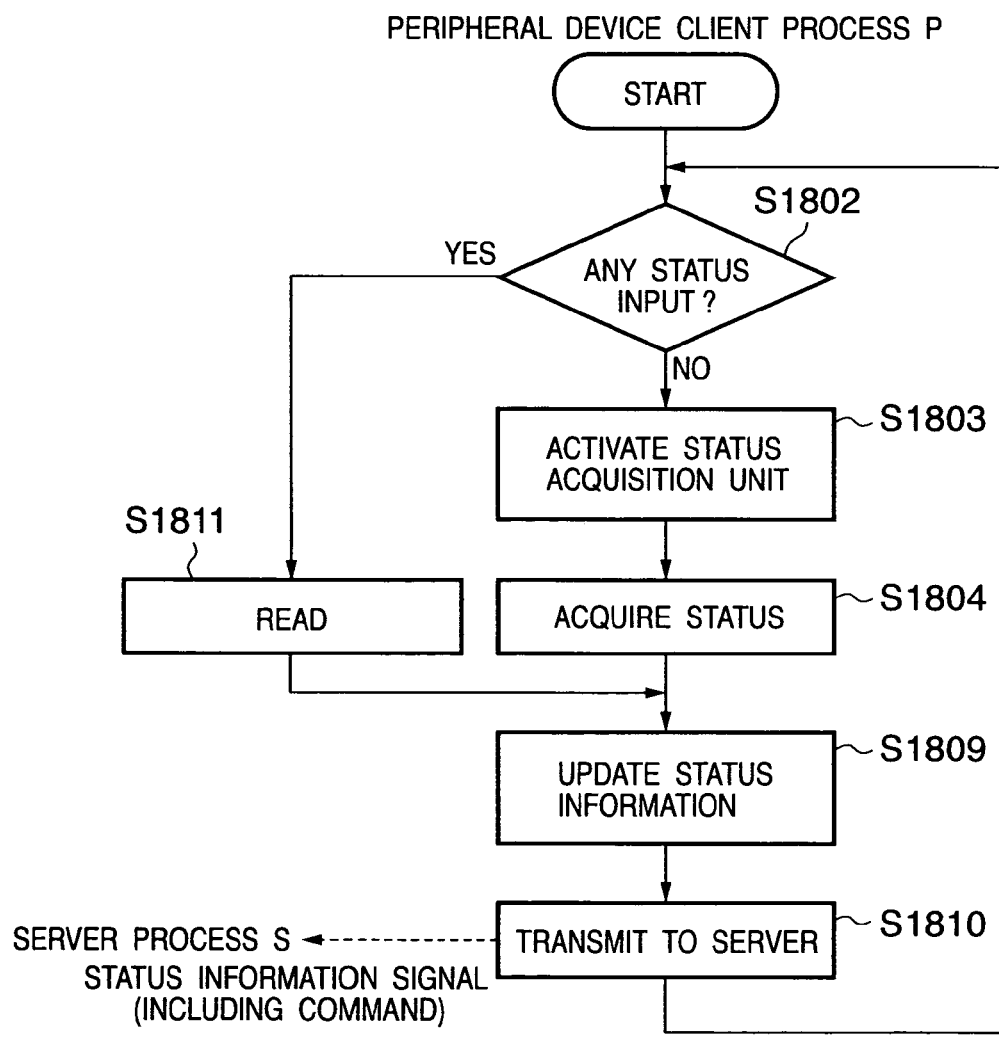
FIG. 18 is a flow chart showing an operating procedure of a peripheral device client process P of the peripheral devices shown in FIG. 1.

Next, a description is given of an example of operation of the distributed system of the present embodiment, with reference to FIGS. 15 to 18. FIG. 15 is a diagram showing a sample office view screen displayed on the screen of a user terminal station, including home office and mobile offices, of the distributed system shown in FIG. 1. FIG. 16 is a flow chart showing an operating procedure of a server process S of the host server device 11 shown in FIG. 1. FIG. 17 is a flow chart showing an operating procedure of a peripheral device client process P of the user terminal stations 13-17 shown in FIG. 1. FIG. 18 is a flow chart showing an operating procedure of a peripheral device client process P of the peripheral devices 27, 28 shown in FIG. 1.

(Sample of Office View Screen)

When a user is working, an office view screen showing the work status of other users is displayed on the display screen of the user terminal station.

In the present example, six private offices 1503 and two peripheral device areas 1506, 1507 are displayed in a private area 1504, while office organizational structure, user message history and the like are displayed in a shared area 1505. A user image 1501 photographed by cameras 65, 66 (see FIG. 5) and work status data 1502 indicating work status can be displayed in each of the private offices 1503. Where a user is absent because of a meeting or a break, an icon indicating absence can also be displayed instead of the image photographed by the cameras 65, 66.

Information such as peripheral device name 1508, operating status 1509, model name 1510, location 1511 and peripheral device still image 1512 can be displayed in the peripheral device area 1506. Detailed information on the operating status may be displayed in the space below the model name 1510. Moreover, a moving image photographed by a video camera installed so as to image the peripheral devices may be displayed instead of the still image 1512 of the peripheral devices.

Information such as peripheral device name 1513, operating status 1514, model name 1515, location 1516, operating status detailed information 1517 and peripheral device still image 1518 can be displayed in peripheral device area 1507. Information such as error information and warning information may be displayed in the operating status detailed information 1517. Moreover, a moving image photographed by a video camera installed so as to photograph the peripheral devices may be displayed instead of the still image 1518 of the peripheral devices.

It should be noted that the office view screen described above is not limited to that which is shown in FIG. 15, and it is to be understood that the number of private offices displayed and the layout of such display can be set as desired.

(Example of Processes of Sharing Status Information)

Next, a description is given of the process of sharing status information performed by the server process S1 the client process X and the peripheral device process P, using FIGS. 16 and 17. FIG. 16 is a flow chart showing an operating procedure of a server process S of the host server device shown in FIG. 1. FIG. 17 is a flow chart showing an operating procedure of a peripheral device client process P of the peripheral devices shown in FIG. 1.

(Example of Server Process S Operating Procedure)

As shown in FIG. 16, in step S1601, the server process S awaits the arrival of status information signals from the client process X or the peripheral device client process P. When the status information signals arrive, processing proceeds to a step S1602 and the status information receiver 1109 receives the status information signals. Processing then proceeds to a step S1603, where the status information update unit 1104 determines whether or not an update command is contained in the received status information signals. When an update command is not included, processing proceeds to a step S1605, where the status information update unit 1104 determines whether or not a status information command is contained in the received status information signals. When a status acquisition command is not included, processing returns to step S1601.

If in step S1603 it is determined that an update command is included in the received status information signals, then processing proceeds to a step S1604, where the status information update unit 1104 updates the information in the status information table 1105 based on the status information included in the received status information signals. Processing then proceeds to a step S1606, where the status information update unit 1104 reads the updated status information out from the status information table 1105 and transmits the information to the user terminal stations using the status information transmitter 1108.

If in step S1605 it is determined that a status information acquisition command is included in the received status information signals, then processing proceeds to step S1606 and the status information update unit 1104 reads the corresponding latest status information from the status information table 1105 in accordance with the status information acquisition command and transmits the information to the designated user terminal stations (the client process X or the peripheral device client process P) via the status information transmitter 1108.

(Example of Client Process X Operating Procedure)

Next, a description is given of the operation of the client process X using FIG. 17.

As shown in FIG. 17, the client process X first determines in a step S1701 whether or not a status information signal from the server process S has arrived. If a status information signal has arrived from the server process S, then processing proceeds to a step S1706. When a status information signal has not arrived, processing proceeds to a step S1702.

In step S1706, the status information receiver 1209 receives the status information signal from the server process. S. Then, in a step S1707, the status information update unit 1204 determines whether or not a status information update command is included in the status information signal received from the server process S as a status information manipulation command. When a status information update command is not included, processing proceeds to step S1702. When a status information update command is included, processing proceeds to a step S1708 and the status information update unit 1204 updates the status information table 1205 information based on the received status information signal. Processing then proceeds to step S1701.

In step S1702, it is determined whether or not there is status information input from the status information to the status information input unit 1206. If there is status information input from the user to the status information input unit 1206, then processing proceeds to a step S1711, where the status information generator 1203 reads the status information from the user and generates status information signals containing status information manipulation commands and status information from the user. Processing then proceeds to a step S1709, where the status information update unit 1204 updates the status information table 1205 information based on the status information signal thus generated. Then, processing proceeds to a step S1710, where the status information update unit 1204 reads the updated status information from the status information table 1205 and transmits the updated status information to the server process S using the status information transmitter 1208. Processing then returns to step S1701.

If in step S1702 it is determined that there is no status information input from the user to the status information input unit 1206, in order periodically to update the user status information processing proceeds to a step S1703, where the status information generator 1203 activates the status acquisition unit 1201. Processing proceeds to a step S1704, where the status acquisition unit acquires the status of, for example, input of a user to an input device such as a keyboard from the input status acquisition unit 1301, the user's application name and terminal operating status from the terminal operations acquisition unit 1302, or an image (still image or moving image) of the user from the video image acquisition unit 1303. The status data thus acquired are input to the user status recognition unit 1202. Then, processing proceeds to a step S1705, where the user status recognition unit 1202 recognizes the status of the user, such as whether present or absent, based on the various input status. For example, the user status recognition unit 1202, when provided with input to an input device such as a user keyboard from the input status acquisition unit 1301 for example, depending on the input status, recognizes such status as presence or absence of the user and how busy the user is. Moreover, if the user's application and terminal operating status as acquired by the terminal operations acquisition unit 1302 are input, the user status recognition unit 1202 recognizes such status as the user's work status and how busy the user is, depending on the user application and terminal operating status. Further, using the user's image (still image or moving image) as photographed by the video image acquisition unit 1303, depending on the user image the user status recognition unit 1202 recognizes such status as whether or not the user is present in the vicinity of the user terminal station, or the user's work status and how busy the user is. The user status information thus recognized is then sent to the status information generator 1203, which generates the user status information and the status information signals containing status information update commands described above.

Next, processing proceeds to step S1709, where the status information update unit 1204 updates the status information table 1205 based on the status information signals thus generated. The processing proceeds to step S1710, where the status information update unit 1204 reads the updated status information from the status information table 1205 and transmits the updated information to the server process S through the status information transmitter 1208. Processing then returns to step S1701.

As described above, the server process S status information table 1105 and the client process X status information table 1205 are serially updated so as always to have the same information, with the user status information displayed at the user terminals serially updated.

(Example of Peripheral Device Client Process P Processing Procedure)

Next, a description is given of the operation of the peripheral device client process P using FIG. 18. FIG. 18 is a flow chart showing an operating procedure of a peripheral device client process P of the peripheral devices shown in FIG. 1.

With the peripheral device client process P, as shown in FIG. 18, in a step S1802 it is determined whether or not there is input of status information from the user to the status information input unit 1406. If there is input of status information from the user to the status information input unit 1406, then processing proceeds to a step S1811, where the status information generator 1403 reads the status information input from the user and generates status information signals containing status information manipulation command and the status information from the user. Next, processing proceeds to a step S1809, where the status information update unit 1404 updates the information in the status information table 1405 based on the status information signals thus generated. Then, processing proceeds to a step S1810, where the status information update unit 1404 reads the updated status information from the status information table 1405 and transmits the updated information to the server process S using the status information transmitter 1408. Processing then returns to step S1801.

If it is determined in step S1802 that there is no input of status information from the user to the status information input unit 1406, then processing proceeds to a step S1803 in order to update the peripheral devices status information periodically, where the status information generator 1403 acquires peripheral device internal status information. The peripheral device status information is then sent to the status information generator 1403, which generates status information signals containing the user status information as well as status information update commands.

Next, processing proceeds to step S1809, where the status information update unit 1404 updates the information in the status information table 1405 based on the status information signals thus generated. Then, processing proceeds to step S1810, where the status information update unit 1404 reads the updated status information from the status information table 1405 and transmits the updated information to the server process S using the status information transmitter 1408. Processing then returns to step S1801.

With the present embodiment, in a distributed system in which each user can see the status of all other users, it is assumed that the distributed system is permanently stationed at the client computer and the display screen used for long periods of time in a state in which the status can be easily checked thereby, and therefore, since peripheral device information is also similarly displayed on the user status display screen of the distributed system, the state of the peripheral devices can be quickly checked using fewer operations to do so.

Moreover, by displaying peripheral device information on the distributed system, the state of peripheral devices in other offices and remote locations can be checked. Accordingly, where it is known that a job that could be executed at such other office or remote location cannot be executed, the convenience of operating in a distributed work state can be improved because the user can select another, effective part to complete the job.

<Example of User Peripheral Device Use Restriction>

Next, a description is given of a user peripheral device use restriction.

In the present embodiment, the server process S stores in the status information table 1105 information relating to user peripheral device use restrictions that the distributed system manager registers, such that, where the user requests peripheral device status information from the server process S, the status information update unit 1104 generates status information signals to be sent to the user or not depending on a determination made according to the peripheral device use restrictions. It should be noted that the present embodiment has the same configuration as the embodiment described above, and therefore a description thereof is omitted.

(Example of Information Relating to Peripheral Device Use Restriction)

Figure 19:
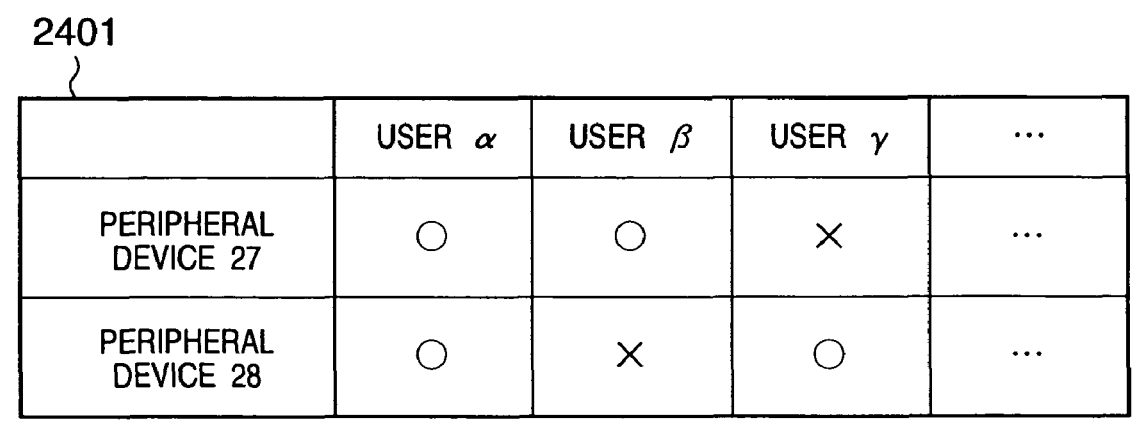

Using FIG. 19, a description is given of an example of information relating to users' peripheral device use restrictions that the server process S described above stores in the status information table 1105.

Reference numeral 2401 designates a peripheral device use restriction table storing use restrictions on the users' peripheral device MFP 27 and peripheral device LBP 28 in the present embodiment. For example, according to the peripheral device use restriction table 2401, user α is registered as being able to use peripheral device MFP 27 and peripheral device LBP 28, user β as able to use peripheral device MFP 27 and user γ is able to use peripheral device LBP 28. The information in question is registered by the manager of the distributed system. As for the method of registration, the users may register the information in the server process S using the status information input unit 1406 of the peripheral device client process P, but they are not required to do so.

Next, a description is given of an example of processing performed by the status information update unit 1104 using the status information table shown in FIG. 19 in a case in which the user has requested status information on the peripheral devices from the server process S.

Where a status information signal received by the status information receiver 1109 contains status information acquisition command, the status information update unit 1104 generates status information signals to be used to reply to the user who sent the status information signal, using the data in the status information table 1105. For example, if user α transmits a status information signal containing a status information acquisition command requesting status information on a peripheral device, by checking the peripheral device use restriction table 2401 in the status information table 1105 the status information update unit 1104 can determine that user α can use the peripheral device MFP 27 and the peripheral device LBP 28, and generates a status information signal containing status information on the peripheral device MFP 27 and the peripheral device LBP 28. At this time, the office view screen displayed on the user terminal station of the user α who receives this status information signal becomes that shown in FIG. 15, displaying status information 1506 for the peripheral device MFP 27 and status information 1507 for the peripheral device LBP 28. Moreover, where user β has requested peripheral device status information, by checking the peripheral device use restriction table 2401 in the status information table 1105 the status information update unit 1104 can determine that user β can use the peripheral device MFP 27 but cannot use the peripheral device LBP 28, and generates a status information signal containing status information only for the peripheral device MFP 27. At this time, the office view screen displayed on the user terminal station of the user β who receives this status information signal becomes that shown in FIG. 20, displaying only status information 2501 for the peripheral device MFP 27.

(Another Example of Information Relating to Peripheral Device Use Restrictions)

The peripheral device use restriction table that the server process S stores in the status information table 1105 may be like that shown in FIG. 21. An example of information relating to user peripheral device use restrictions is described using FIG. 21.

Reference numeral 2601 designates a peripheral device use restriction table that holds use restrictions on the peripheral device MFP 27 and the peripheral device LBP 28 for users in the present embodiment. In the peripheral device use restriction table 2601, reference numeral 2602 designates an upper limit on the number of pages each user prints from each peripheral device and 2603 indicates how many pages each user has currently printed from each peripheral device. For example, according to the peripheral device use restriction table 2601, the upper limit on the number of pages that user α may print from the peripheral device MFP 27 is 100 pages, and that 97 pages have already been printed. Moreover, the upper limit on the number of pages that user α may print from the peripheral device LBP 28 is 400 pages, and that 157 pages have already been printed. Moreover, the upper limit on the number of pages that user β may print from the peripheral device MFP 27 is 50 pages, that 22 pages have already been printed, that the upper limit on the number of pages that user β may print from the peripheral device LBP 28 is 400 pages, and that 400 pages have already been printed. Moreover, the upper limit on the number of pages that user γ may print from the peripheral device MFP 27 is 50 pages, that 10 pages have already been printed, that the upper limit on the number of pages that user γ may print from the peripheral device LBP 28 is 200 pages, and that 75 pages have already been printed. Here, the upper limit on the number of printed pages 2602 is registered by the distributed system manager. As for the method of registration, the users may register the information in the server process S using the status information input unit 1406 of the peripheral device client process P, or they may not. The number of printed pages 2603 may be calculated from status information indicating the number of printed pages transmitted to the server process S from the peripheral device client process P of each peripheral device, but it is not necessary to do so. Moreover, the upper limit on the number of printed pages may, for example, be valid for a predetermined period of time such as one month, so that when one month passes the number of pages already printed is rest to 0 pages. Moreover, although in the present embodiment the use restriction is implemented by the number of pages printed, alternatively the use restriction criteria may be the amount of time the peripheral device (MFP 27, LBP 28) has been monopolized, the amount of electric power consumed, the amount of ink consumed, the amount of toner consumed, and so forth.

Figure 22:
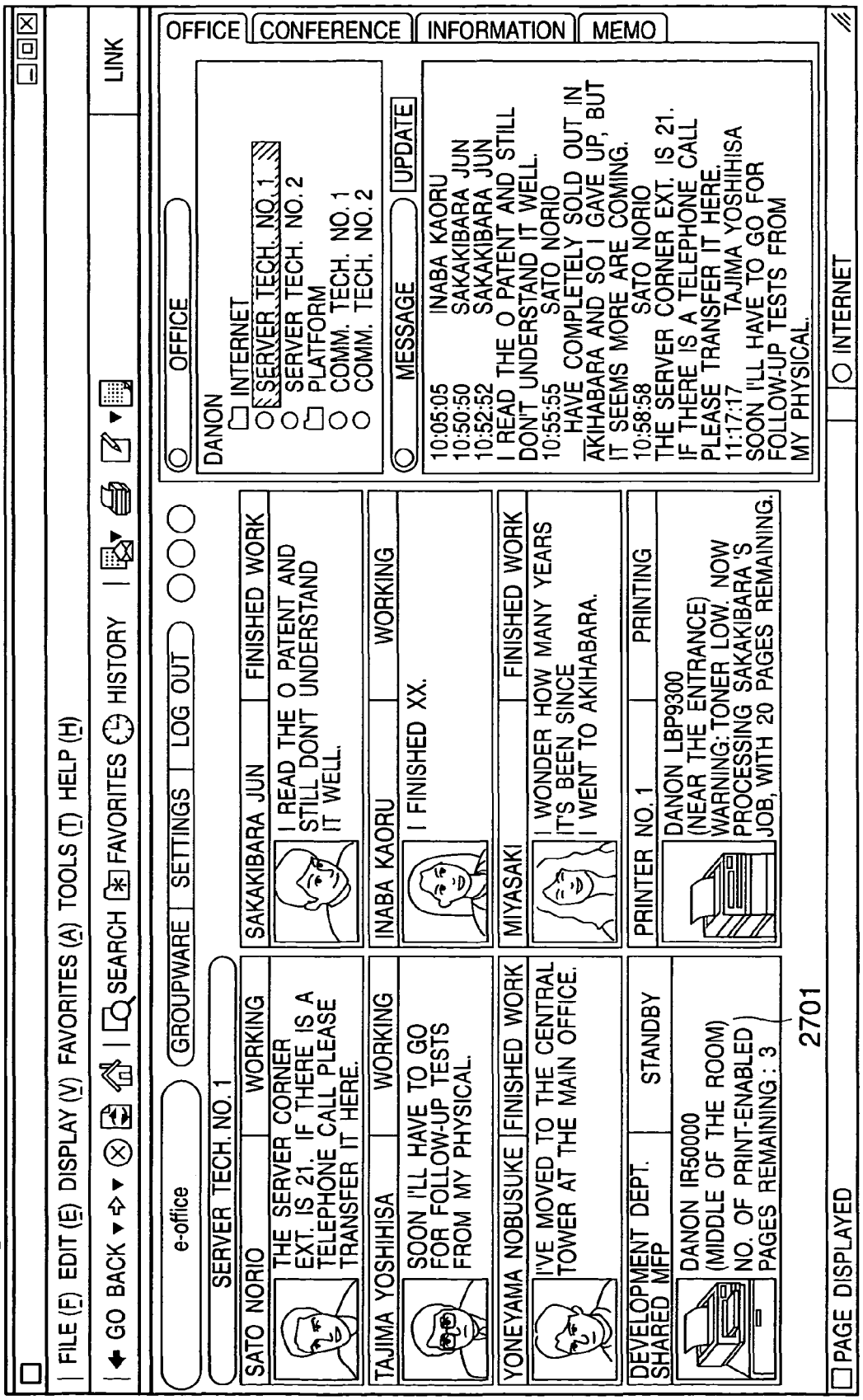
FIG. 22 is a diagram showing a sample office view screen displayed on the screen of a user terminal station of the distributed system shown in FIG. 1, using the peripheral device use restriction information shown in FIG. 21.
Figure 23:
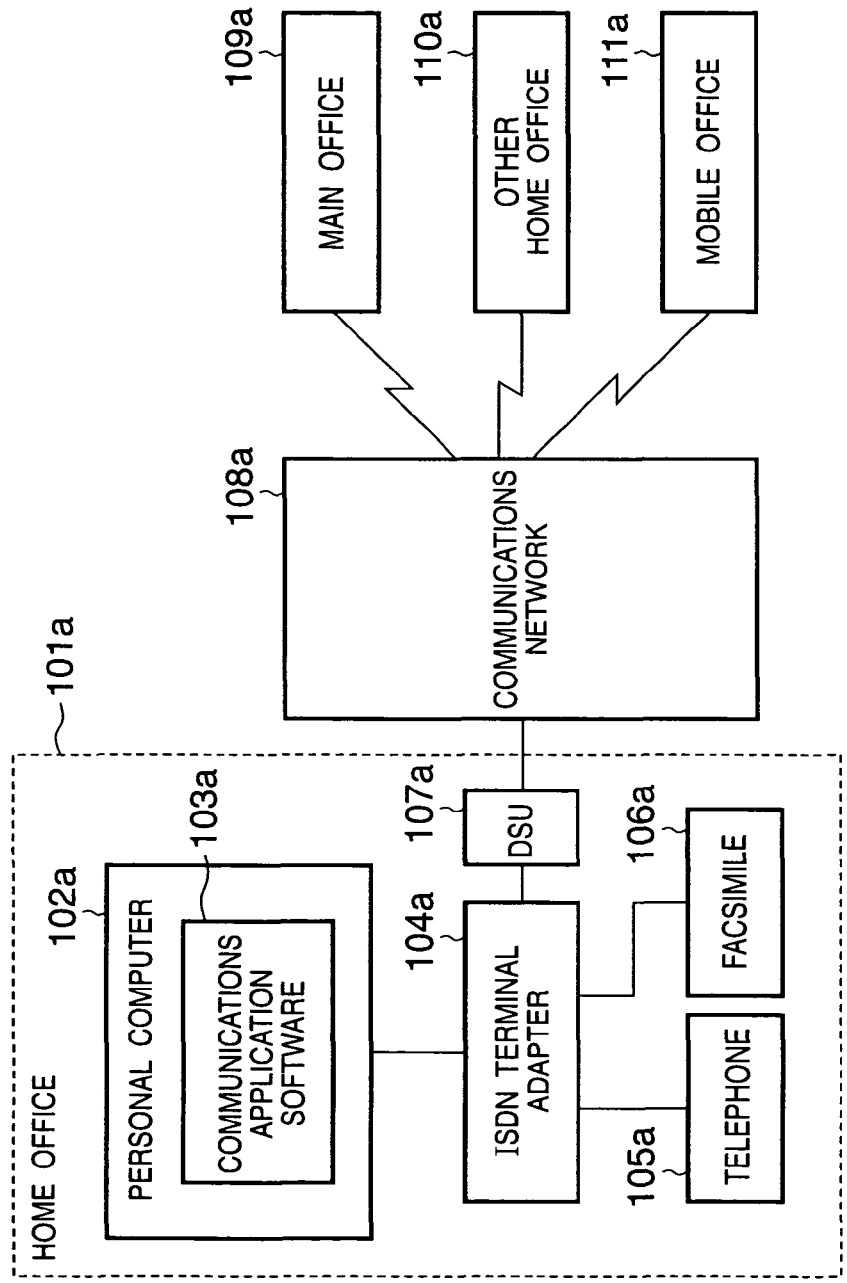
FIG. 23 is a block diagram showing the layout of a home office in the conventional distributed work model.
Figure 25:
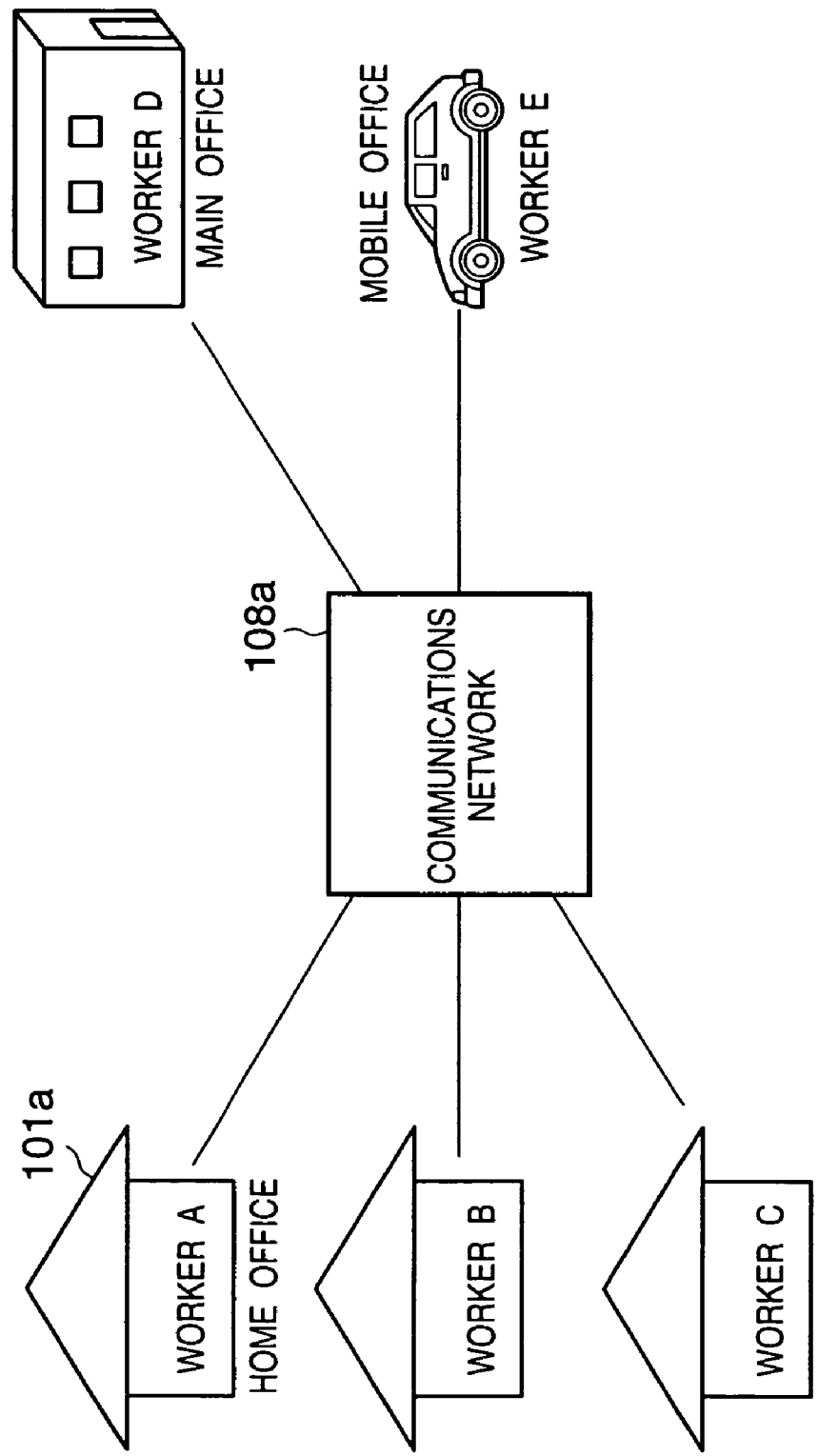
FIG. 25 is a diagram showing a configuration of an office in the conventional distributed work model.
Figure 26:
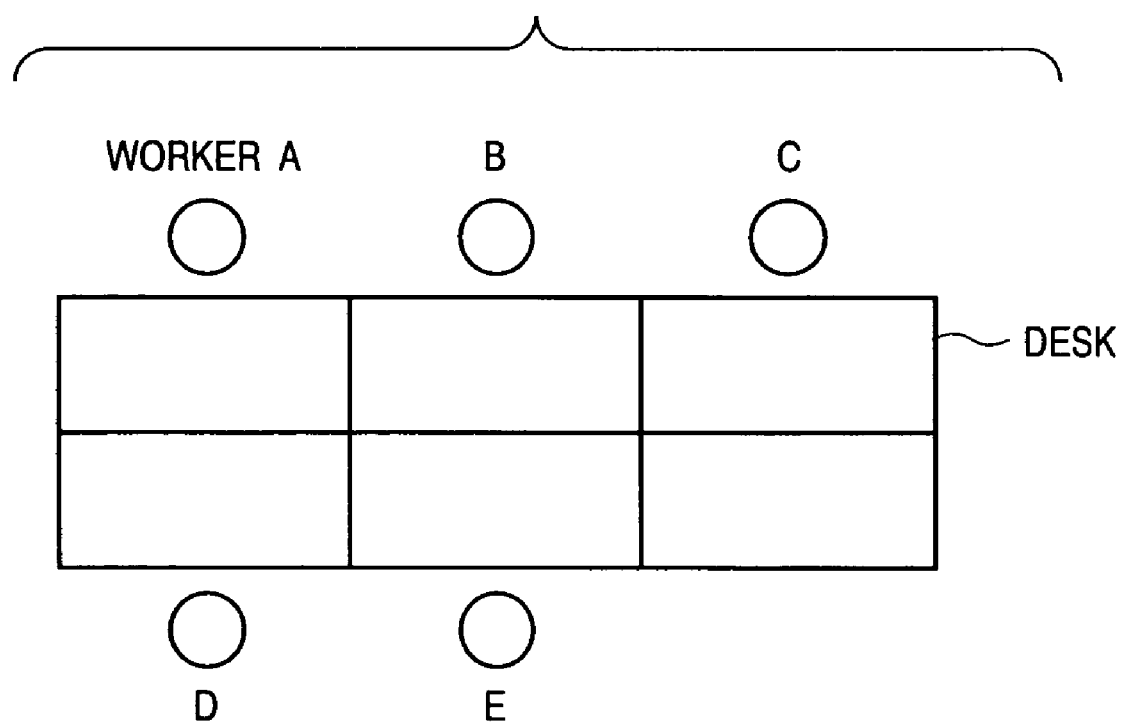
FIG. 26 is a diagram showing schematically the form of collective work carried out before the distributed work model shown in FIG. 25.
Figure 27:
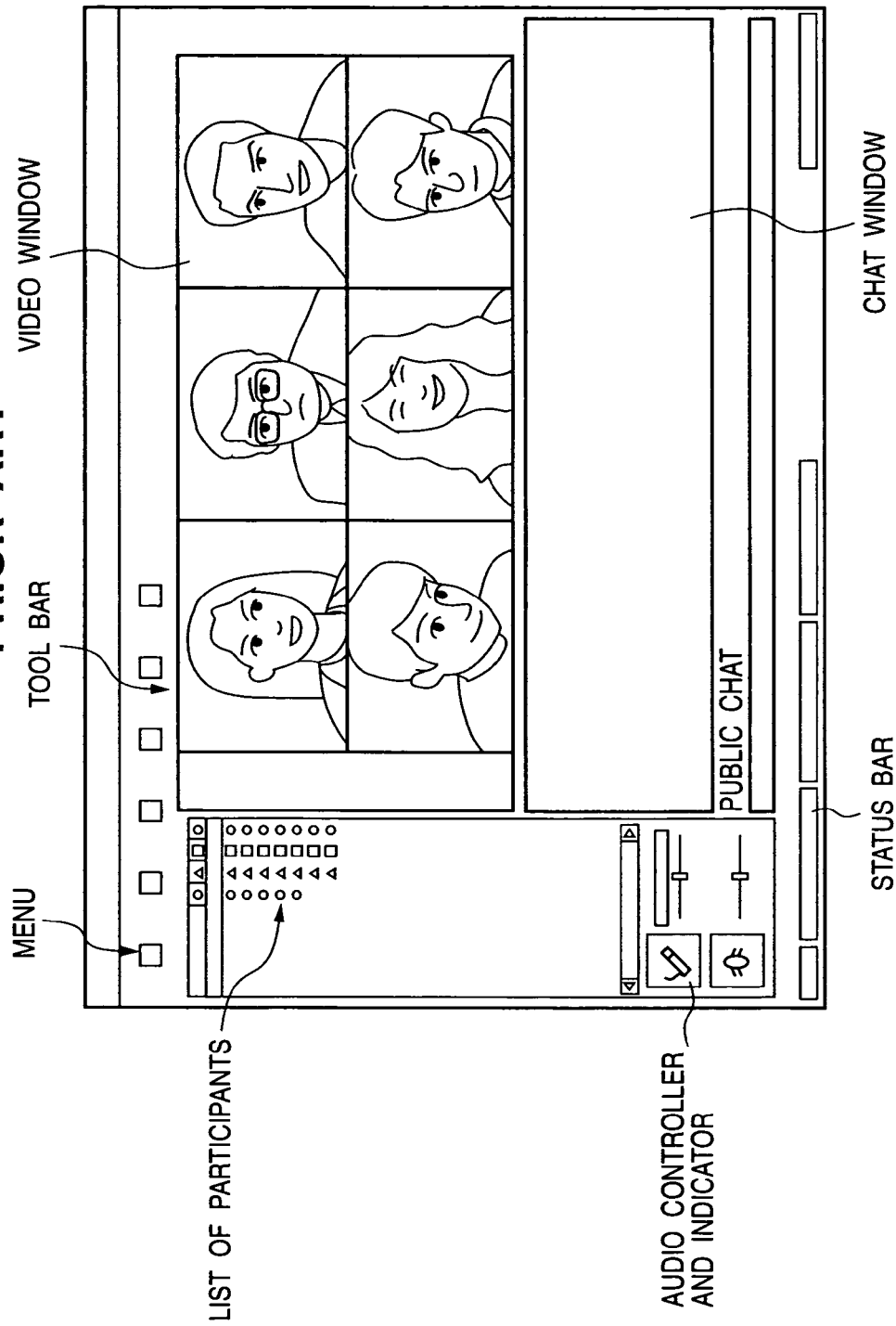
FIG. 27 is a diagram showing a sample screen of a personal computer in a home office according to a system that enables each worker to see the work status of all other workers using videoconferencing software.

Next, a description is given of processing performed by the status information update unit 1104 using the status information table shown in FIG. 21, in a case in which the user has requested status information from the server process S.

Where a status information signal received by the status information receiver 1109 contains a status information acquisition command, the status information update unit 1104 checks the status information table 1105 and generates a status information signal for replying to the user who transmitted the status information signal. For example, if user α transmits a status information signal containing a status information acquisition command and requests peripheral device status information, by checking the peripheral device use restriction table 2601 in the status information table the status information update unit 1104 can determine that the upper limit on the number of pages to be printed from the peripheral device MFP 27 is 100, that the number of pages already printed is 97, that the upper limit on the number of pages to be printed from the peripheral device LBP 28 is 400 and that the number of pages already printed is 157. The status information update unit 1104 can calculate that the number of remaining pages that user α can print from the peripheral device MFP 27 is 3, and the status information update unit 1104 generates a status information signal containing such information. A sample office view screen displayed on the user terminal station of user α who receives this status information signal becomes like that shown in FIG. 22, with information indicating that the number of pages remaining that can be printed is 3 displayed in the area 2701 that displays status information for the peripheral device MFP 27.

Thus, as described above, in the present embodiment, the server process S stores in the status information table 1105 information relating to user peripheral device use restrictions that the distributed system manager registers, such that, where the user requests peripheral device status information from the server process S, the status information update unit 1104 generates status information signals to be sent to the user or not depending on a determination made according to the peripheral device use restrictions, thereby enabling even a user with no background knowledge of the peripheral devices, simply by using that user's own ID as designated by the distributed system manager to log on to the distributed system, to easily acquire information on the peripheral devices being used in the office to which that user belongs and which that user is permitted to use.

In addition, it is also possible to provide even more detailed peripheral device (MFP 27, LBP 28) use restriction management and status display on user screens using the length of time a peripheral device is monopolized, the amount of electric power consumed, the amount of ink consumed, the amount of toner consumed, the amount of paper consumed, and so forth.

-Embodiment of Shared Office Distributed System-

The foregoing embodiments are described using the example of a distributed system in which the work office is dispersed. By contrast, the present embodiment is described using a distributed system in which the office, though shared, is, for example, spread over different floors of the same building.

<Example of Distributed System Configuration>

Figure 28:
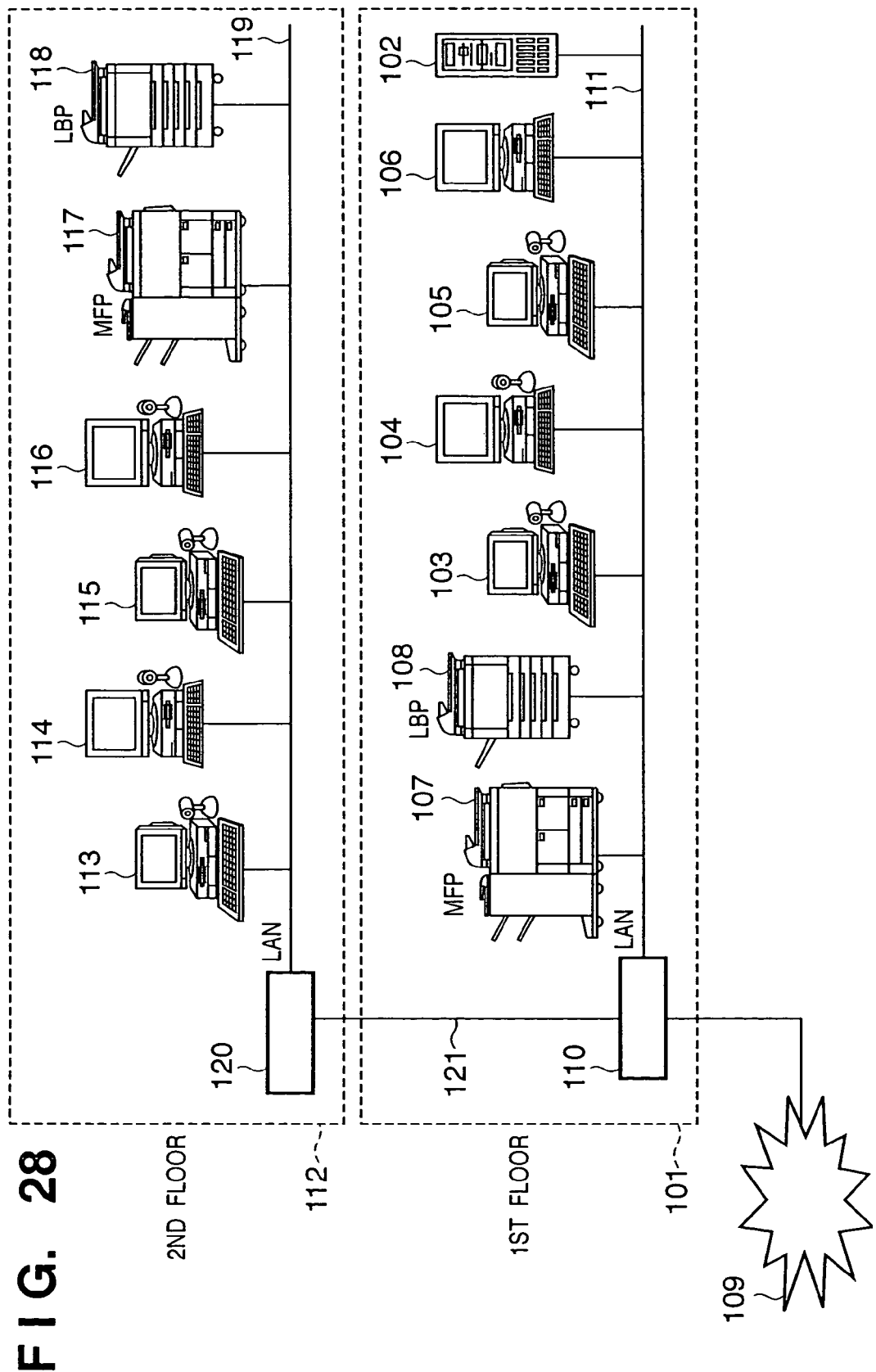
FIG. 28 is a block diagram showing another configuration of the distributed system according to the present invention.

FIG. 28 is a block diagram showing the configuration of a distributed system according to the present embodiment. In FIG. 28, there are two floors in an office, with user terminals and peripheral devices located on each floor.

On a first floor (1F) 101, a host server device 102, a plurality of user terminal stations 103, 104, 105, 106, a multi-function peripheral device (hereinafter MFP: Multi-Function Peripheral) 107, a LBP (Laser Beam Printer) 108 and a router 110 connected to the Internet are provided, with each device connected to the others by a LAN (Local Area Network) 111.

On a second floor (2F) 112, although there is no host server device, as with the first floor 101 there are a plurality of user terminal stations 113, 114, 115, 116, a MFP 117 and a LBP 118, each connected to the others by a LAN 119, the LAN 119 being further connected through a router 120 to a trunk LAN 121, which in turn is connected through a router 110 to the devices on the first floor 101 or to the Internet 109.

A server process S for sharing status information among users is installed on the host server device 102. The host server device 102 is designed to operate continuously. The server process S is connectible to a client process X (0<X<M+1) for sharing status information on users of user terminal stations 103, 104, 105, 106, 113, 114, 115, 116 to be described later and which include the user terminal station on the first and second floors 101 and 112, and a peripheral device client process P (0<P<N+1) for sharing status information on peripheral devices (MFP 107, 117, LBP 108, 118), and stores status information tables in which status information on the users and on the peripheral devices is stored. User status information, such as user name, presence or absence from the desk, status of work, address, location, contact information, can/cannot be contacted, the status of input to input devices, names of active applications and video/audio user status, as well as peripheral device status information, such as name of device, model, location, capabilities, operating status, job information, job processing status, error information and warning information, are included in the status information.

The user terminal station is comprised of a desk-top personal computer 121 connected to LAN 111, 119 and user terminal software 122 installed in the computer 121. The remaining user terminal-stations are the same, with the client process X described above contained in the user terminal software.

<Example of Host Server Device Configuration>

Figure 29:
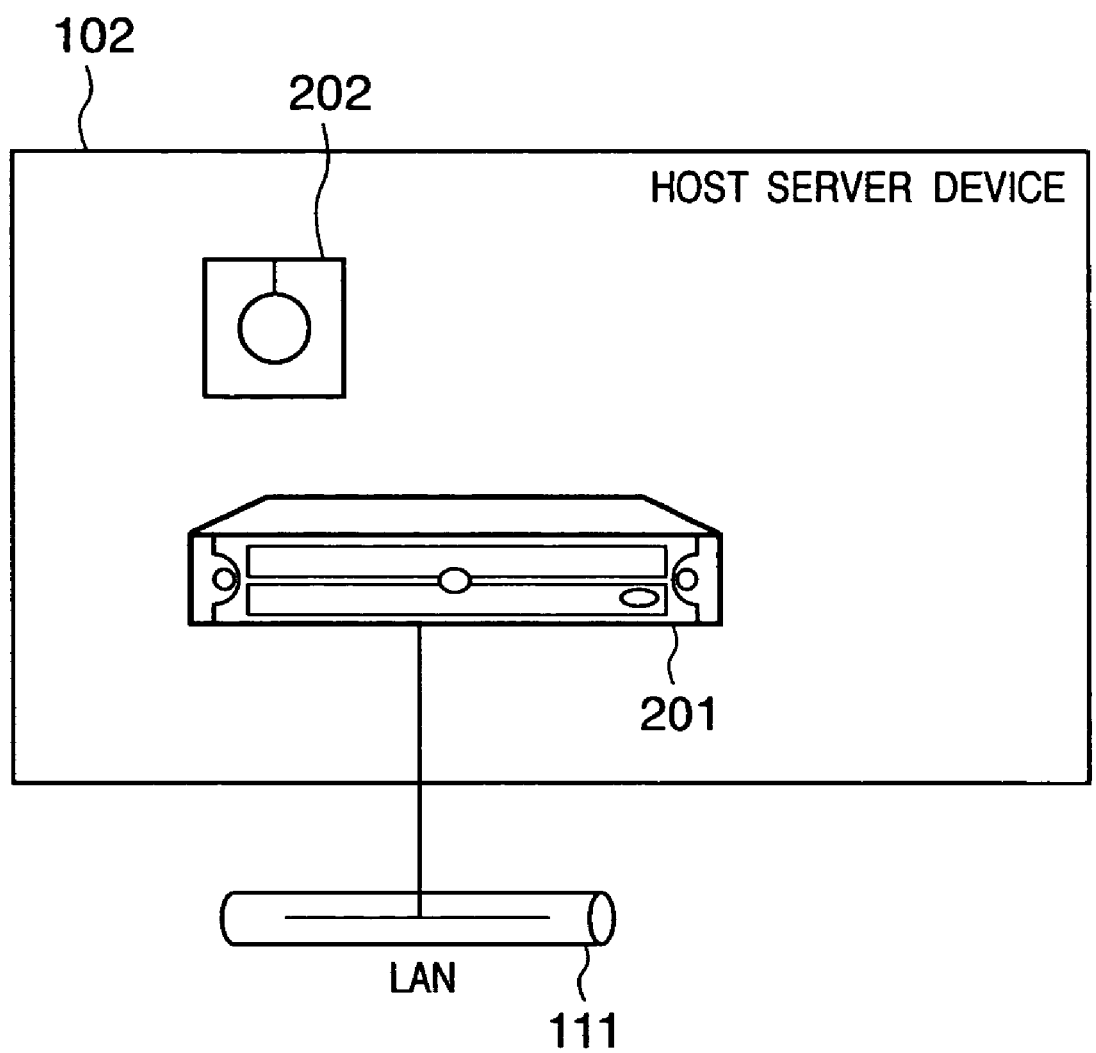
FIG. 29 is a diagram showing a hardware configuration of the host server device shown in FIG. 28.
Figure 30:
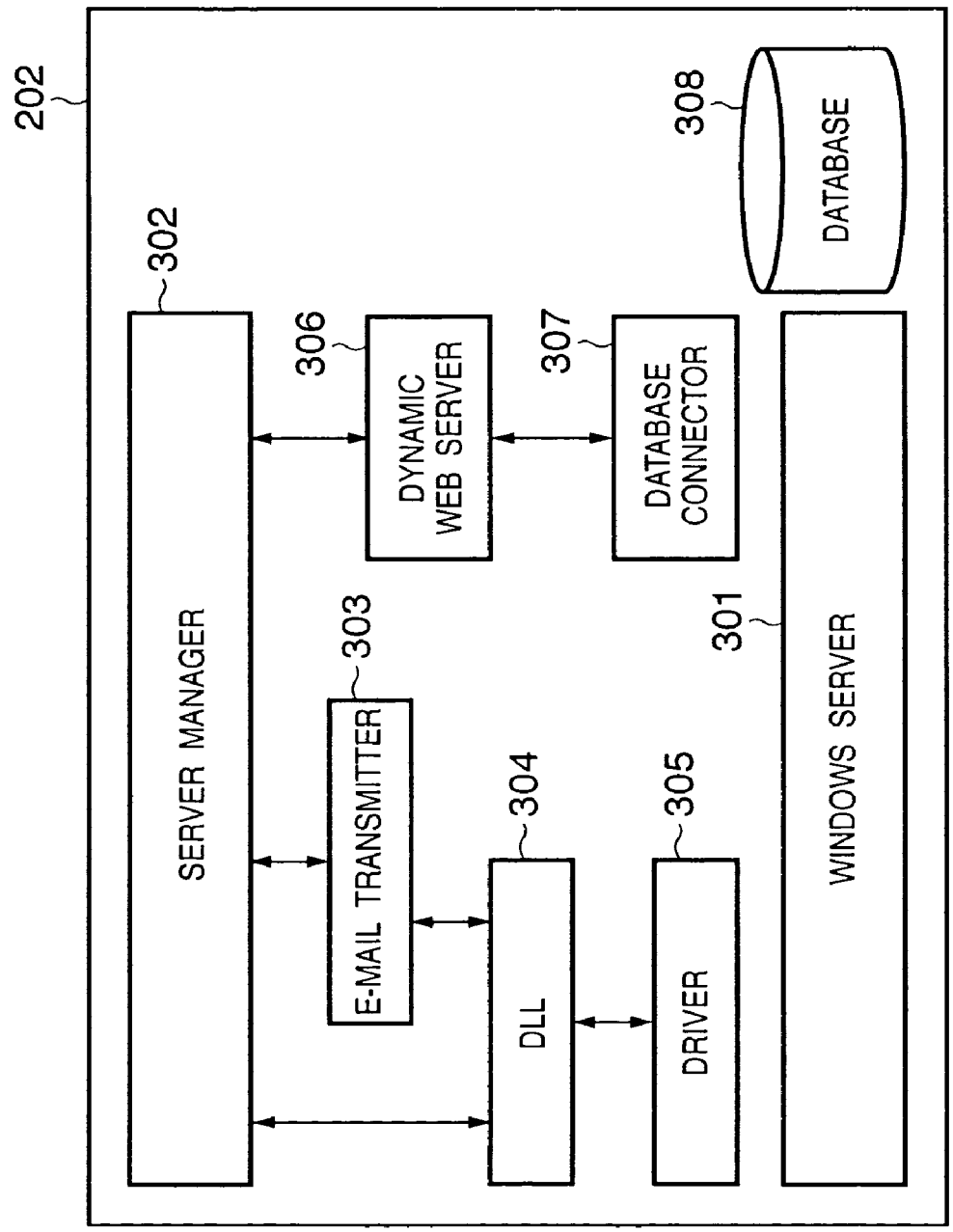
FIG. 30 is a block diagram showing a software configuration of the host server device shown in FIG. 28.

A description is given of the configuration of the host server device 102 using FIGS. 29 and 30. FIG. 29 is a diagram showing a hardware configuration of the host server device 102 shown in FIG. 28. FIG. 30 is a block diagram showing a software configuration of the host server device 102 shown in FIG. 28.

The host server device 102, as shown in FIG. 29 is essentially comprised of a PC server device 201 and host server device software 202, and is connected to the LAN 111.

The software installed on the host server device 102 includes software programs developed using C++ programming language as well as pre-existing software programs, with Windows (registered trademark of Microsoft Corp. of the United States) adopted as the OS (Operating System).

Specifically, as shown in FIG. 30, a variety of software is run on Windows Server 301, with functional blocks such as a server manager 302, an e-mail transmitter 303, a DLL (Dynamic Link Library) 304, its driver 305, a dynamic web server 306, a database connector 307 and a database 308 composed of such software.

<Example of User Terminal Device Configuration>

Figure 31:
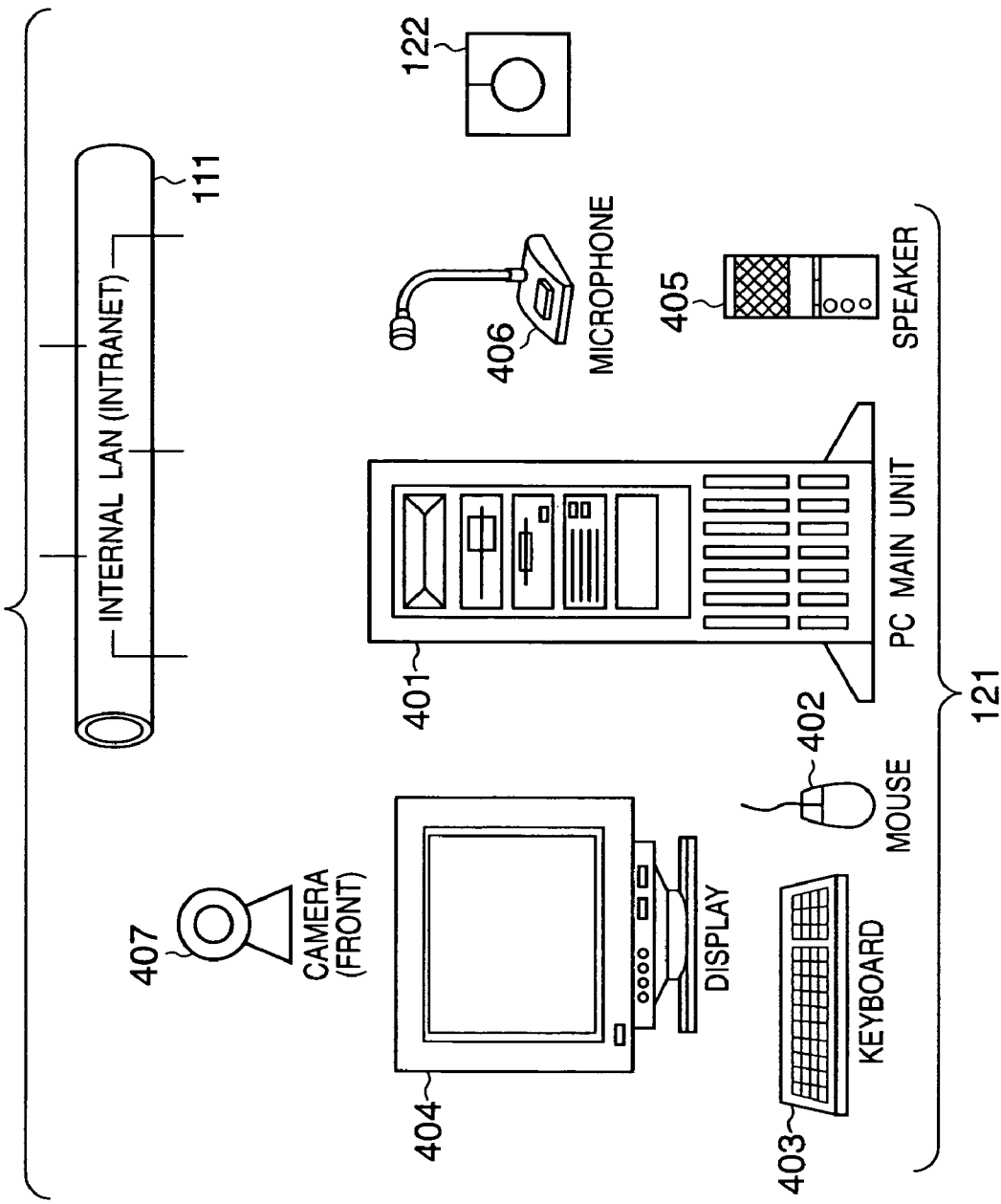
FIG. 31 is a diagram showing a hardware configuration of the user terminal station shown in FIG. 28.

A description is now given of the configurations of the user terminal stations 103-106 and 113-116, using FIG. 31. FIG.

31 is a diagram showing a hardware configuration of the user terminal stations 103-106 and 113-116 shown in FIG. 28.

The user terminal stations 103-106 and 113-116, as shown in FIG. 31, are comprised of a personal computer 121 and user terminal software 122. The personal computer 121 is comprised of a PC main unit 401, with corresponding peripheral device connected to input/output terminals provided on the PC main unit 401. In the present embodiment, a mouse 402, a keyboard 403, a display 404, a speaker 405, a microphone 406 and a video camera 407 for acquiring an image of the user are connected to the PC main unit 401.

The user terminal software installed on the user terminal stations 103-106 and 113-116 is the same as that shown in FIG. 6 described above, and therefore a description thereof is omitted here.

<Examples of MFP/LBP Configurations>

The configuration of the MFP is the same as that shown in FIGS. 7 and 8, and the configuration of the LBP is the same as that shown in FIGS. 9 and 10, and therefore a description thereof is omitted.

<Examples of the Server Process S, the Client Process X and the Peripheral Device Client Process P>

The configurations of the server process S, the client process X and the peripheral device client process P are the same as those shown in FIGS. 11, 12 and 14, and therefore a description thereof is omitted here.

<Example of the Distributed System Operation in the Present Embodiment

The system of the present embodiment and the distributed office system described above differ depending on whether the host server device and the user terminal stations are in a shared office or separate offices. Their operating procedures are identical. In other words, the operating procedure of the server process S, the operating procedure of the client process X and the operating procedure of the peripheral device client process P are the same as those shown in FIGS. 16-18, and therefore a description thereof is omitted.

-First Other Example of the Distributed system of the Present Embodiment-

Below, a description is given of a first other example of a distributed system of the present embodiment. It should be noted that the following description is limited to those portions that differ from the preceding embodiments described above. It is to be understood that all other configurations, operations and processes are the same as in previous embodiments, and therefore a description thereof is omitted.

FIG. 15, which shows one example of a screen of a user terminal station in the preceding embodiment, indicates that each of the six users (that is, users of the user terminal stations) can use two peripheral devices, and that each user displayed on the screen can check the work status of the other five users as well as the status of the two peripheral devices the user can use by checking the user terminal station display screen. In order to achieve this effect, the preceding embodiments stored data relating to a correlation between each user and two peripheral devices in the case of the example shown in FIG. 15 in the host server device database, such that the user terminal stations and the peripheral devices registered in such data could display the results of the exchange of status information and the like between the above-described server process S, client process X and peripheral device client process P.

However, in the present embodiment, the data relating to the correlation between users and peripheral devices is registered in the host server device 11 database as group information data registered according to two layers, parent group and child group.

(Example of Group Information Data in the Present Embodiment)

FIG. 32 is a diagram showing an example of group information data registered according to the two layers described above.

The group information data has two layers, a parent group layer and a child group layer. Although it is possible to register a plurality of child groups for a single parent group, in the example shown in FIG. 32 two child groups are registered. Moreover, although it is possible to register a plurality of users and a plurality of peripheral devices for a single child group, in the example shown in FIG. 32 four users and two peripheral devices are registered for a single child group.

<Example of the Distributed System Operation in the Present Embodiment>

Figure 33:
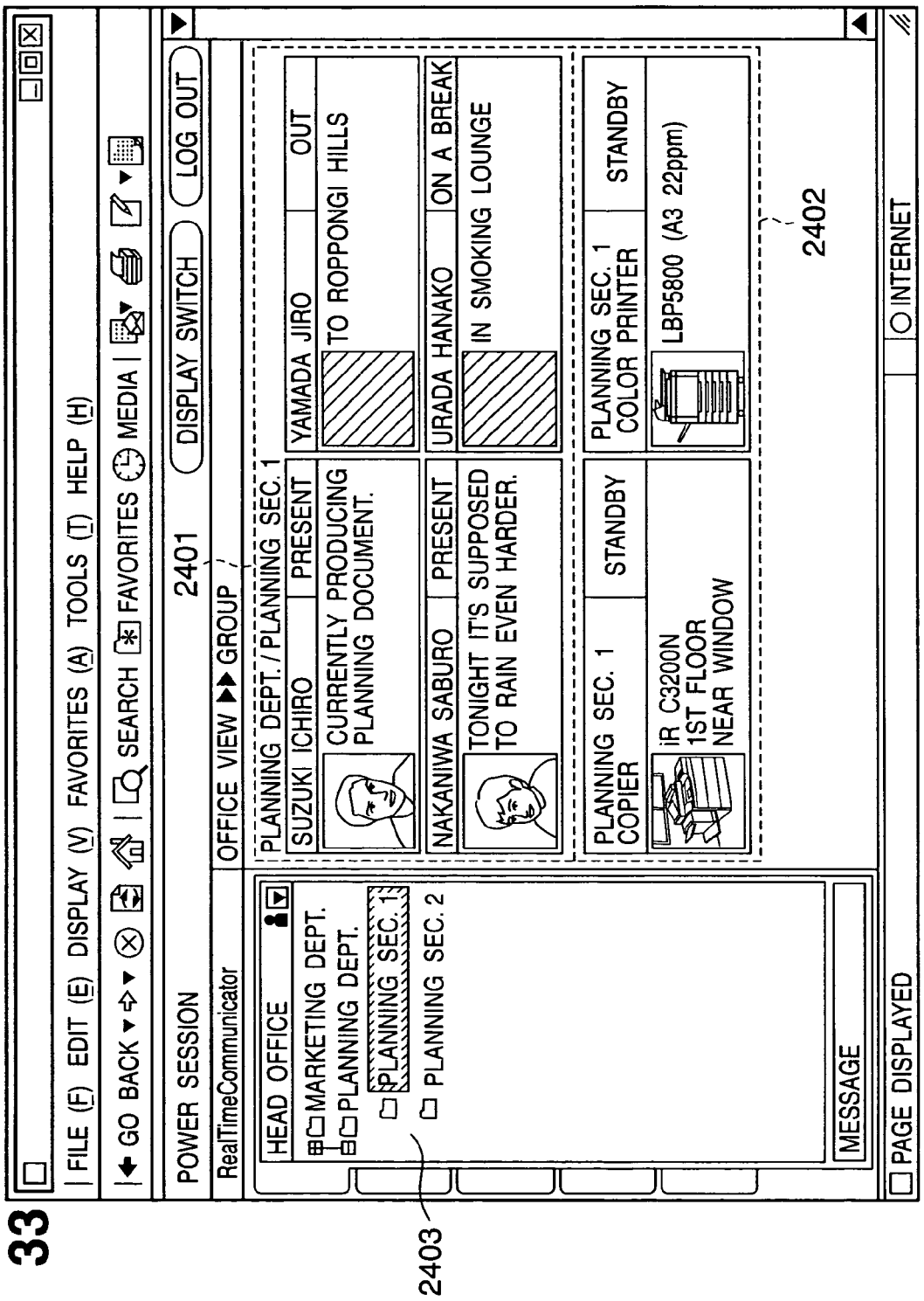
FIG. 33 is a diagram showing a sample screen of the user terminal station according to a layered structure.

FIG. 33 is a diagram showing a sample screen of the user terminal station according to the layered structure of the present embodiment.

A private office area 2401 including four private offices and two peripheral device areas 2402 containing two peripheral devices are displayed. Work status data indicating user work status and a user image photographed by cameras are displayed in the private offices and the name, operating status and model of the peripheral devices are displayed in the peripheral device area. These are the same as that of the previous embodiments.

FIG. 33 shows an example of a display on the user terminal station in which the group information data shown in FIG. 32 is registered in the host server device database, displayed on the user terminal station of a user registered in a "Planning Section 1" that is one of the child groups. The status of the four users and the two peripheral devices belonging to "Planning Section 1" is displayed here.

Figure 34:
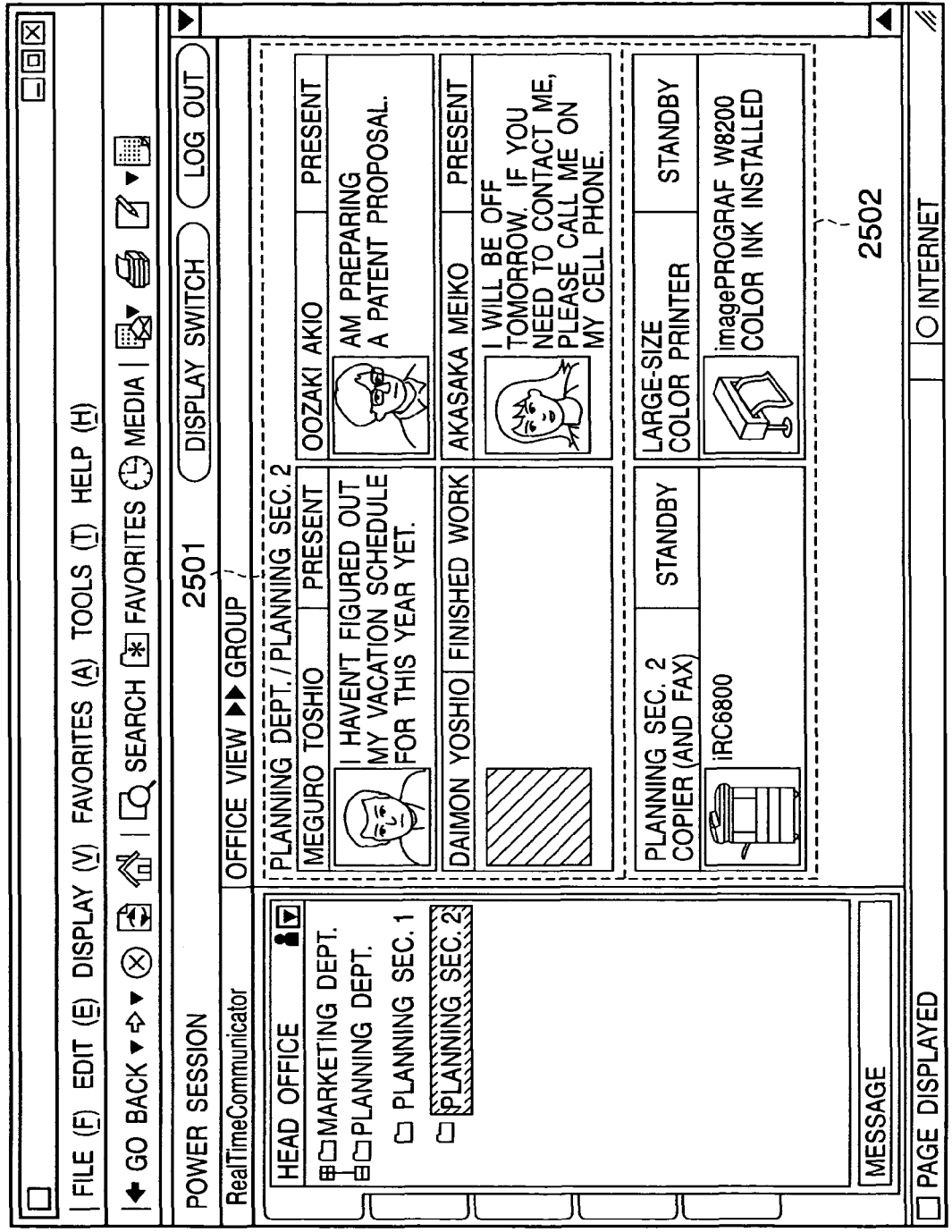
FIG. 34 is a diagram showing another sample screen of the user terminal station according to a layered structure.

By contrast, FIG. 34 similarly shows an example of a display at a user terminal station, but one which is displayed on the user terminal station of users registered in a "Planning Section 2" that is another of the child groups. The status of the four users and the two peripheral devices belonging to "Planning Section 2" is displayed here.

As shown in FIG. 33, an organizational information display area 2403 showing the organizational structure of the office (group) is provided on the display screen of the user terminal station. That "Planning Section 1" is highlighted means that, currently, the user terminal station is displaying the status of the users and the peripheral devices of "Planning Section 1".

Figure 35:
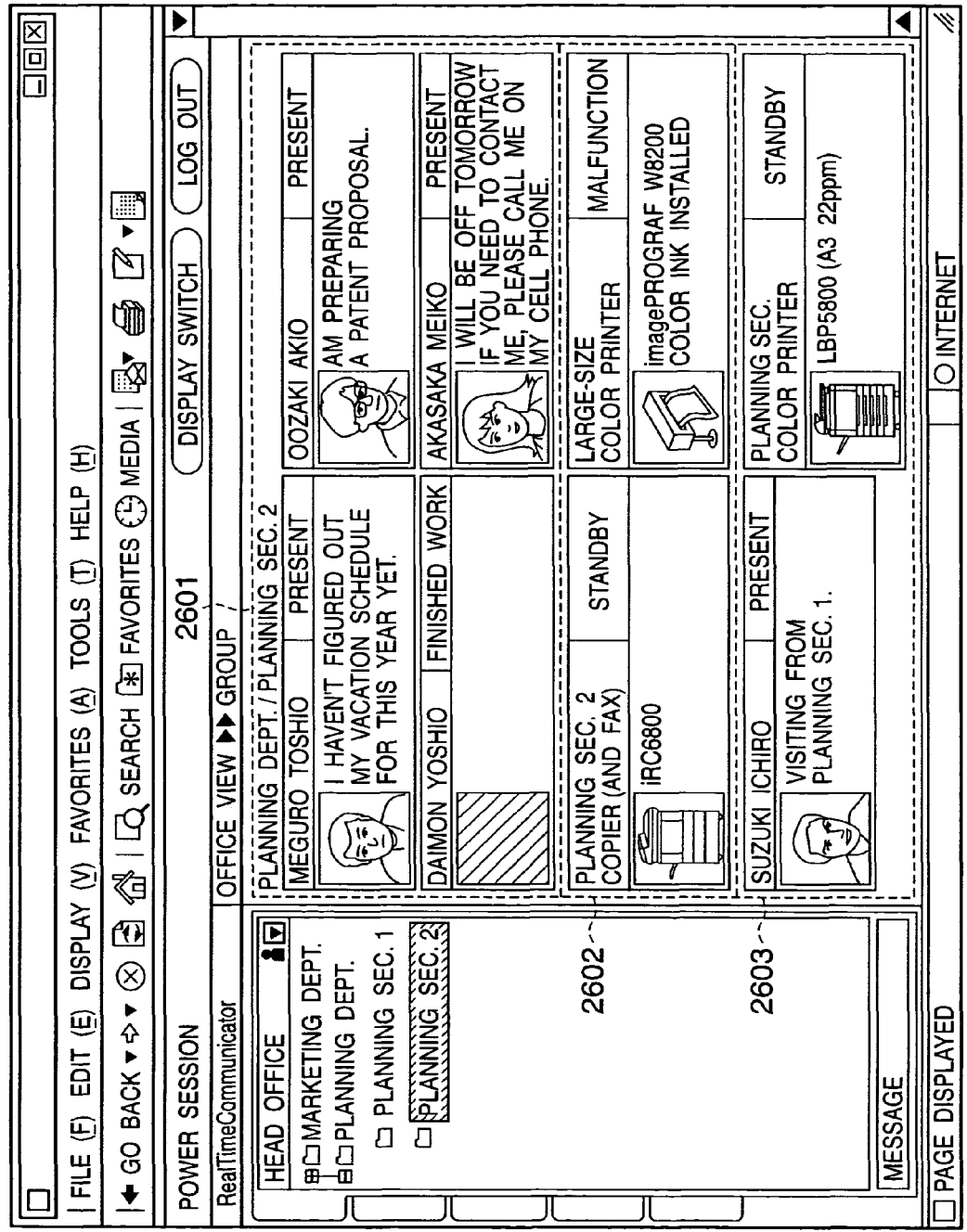
FIG. 35 is a diagram showing yet another sample screen of the user terminal station according to a layered structure.

With a click of the mouse, a user belonging to "Planning Section 1" can designate "Planning Section 2", which is displayed in the organizational information display area and which is a group different from the group to which the user belongs, at which point such user can get the display screen shown in FIG. 35. In the present embodiment, this operation is called an "office visit".

The screen of a user terminal station of a user who performs an office visit is displayed in FIG. 35.

In FIG. 35, a user status 2601 of users in the office visited (that is, users belonging to a group other than one's own) and a peripheral device status 2602 of peripheral devices used mainly by the child group visited are displayed. It should be noted that the status of the "visitor" is displayed in a visitor area 2603 (that is, both the visitor as well as the users in the child group visited are displayed).

A description is now given of a relation between the above-described displays and the disposition of the devices in the distributed system of the present embodiment, using an example in which the users and the peripheral devices that belong to a "Planning Department" of the parent group shown in FIG. 32 are in actuality dispersed over the first floor 101 and the second floor 112 shown in FIG. 28.

The child group "Planning Section 1" shown in FIG. 32 uses the first floor 101, with four user terminal stations 103-106 located thereon, the status of each of the users displayed in the private office area of the screen shown in FIG. 33, the MFP 107 and the LBP 108 located on the first floor 101 as well and the status of these two peripheral devices displayed in the peripheral devices area 2402 of the screen shown in FIG. 33.

By contrast, the child group "Planning Section 2" shown in FIG. 32 uses the second floor 112, with four user terminal stations 113-116 located thereon, the status of each of the users displayed in the private office area of the screen shown in FIG. 34, the MFP 117 and the LBP 118 located on the second floor 112 as well and the status of these two peripheral devices displayed in the peripheral devices area 2502 of the screen shown in FIG. 34.

As described above, by looking at the screen shown in FIG. 33 a user belonging to "Planning Section 1" normally can view the status of other users in the same "Planning Section 1" group as well as the status of the MFP 107 and the LBP 108 located on the first floor 101 and used mainly by the "Planning Section 1". However, if for some reason the user wishes to know the status of the peripheral devices MFP 117 and LBP 118 located on the second floor 112 and used mainly by "Planning Section 2" (for example, if it is clear from a check of the display screen that one or both of the peripheral devices MFP 107 and LBP 108 are broken, or if no peripheral device suited to one's purpose is located in the group to which one belongs, i.e., "Planning Section 1", but such a peripheral device is found the second floor 112), it is possible to do so by designating "Planning Section 2" displayed in the organizational information display area 2403 on the user's own user terminal station and shifting to the display screen shown in FIG. 34.

Accordingly, in the foregoing example, a user belonging to "Planning Section 1" can easily determine not only which devices the users in the group to which one belongs normally use as well as the current status of these devices but can also easily determine which peripheral devices the users in another group "Planning Section 2" normally use as well as the current status of those devices.

Moreover, because such a user can not only ascertain the status of the peripheral devices located on the second floor but also the status of the users belonging to the "Planning Second 2" group located on the second floor P, such a user can also utilize such user status information to determine such things as, for example, that the present is an appropriate time to use the peripheral devices normally used by another group (here, "Planning Section 2") to output one's own work. Thus, as an example thereof, such a user might refrain from visiting "Planning Section 2" because the majority of its users are present at their desks and appear to be busy.

Further, matters are arranged so that, in response to a malfunction of a peripheral device, peripheral devices that can be used and which are located in another office are automatically displayed. For example, if the host server device receives information indicating that a photocopier machine that is one of the peripheral devices of "Planning Section 1" is malfunctioning, the host server device automatically displays on the user terminal stations of "Planning Section 1" a corresponding "Planning Section 2" copier. For example, in FIG. 35, although an office view is displayed in which a Suzuki Ichiro of "Planning Section 1" is visiting "Planning Section 2", since the color printer of "Planning Section 2" is malfunctioning, the color printer of "Planning Section 1" is displayed as an alternative. Such a display is also similarly performed for FIGS. 33 and 34.

(Example of a Process for Implementing the Present Embodiment)

A description is now given of an example of a process procedure of the present embodiment. It should be noted that the procedures performed by the client process X and the peripheral device client process P are the same as those shown in FIGS. 17 and 18 and a description thereof is omitted.

(Example of Server Process S Procedure)

Figure 36:
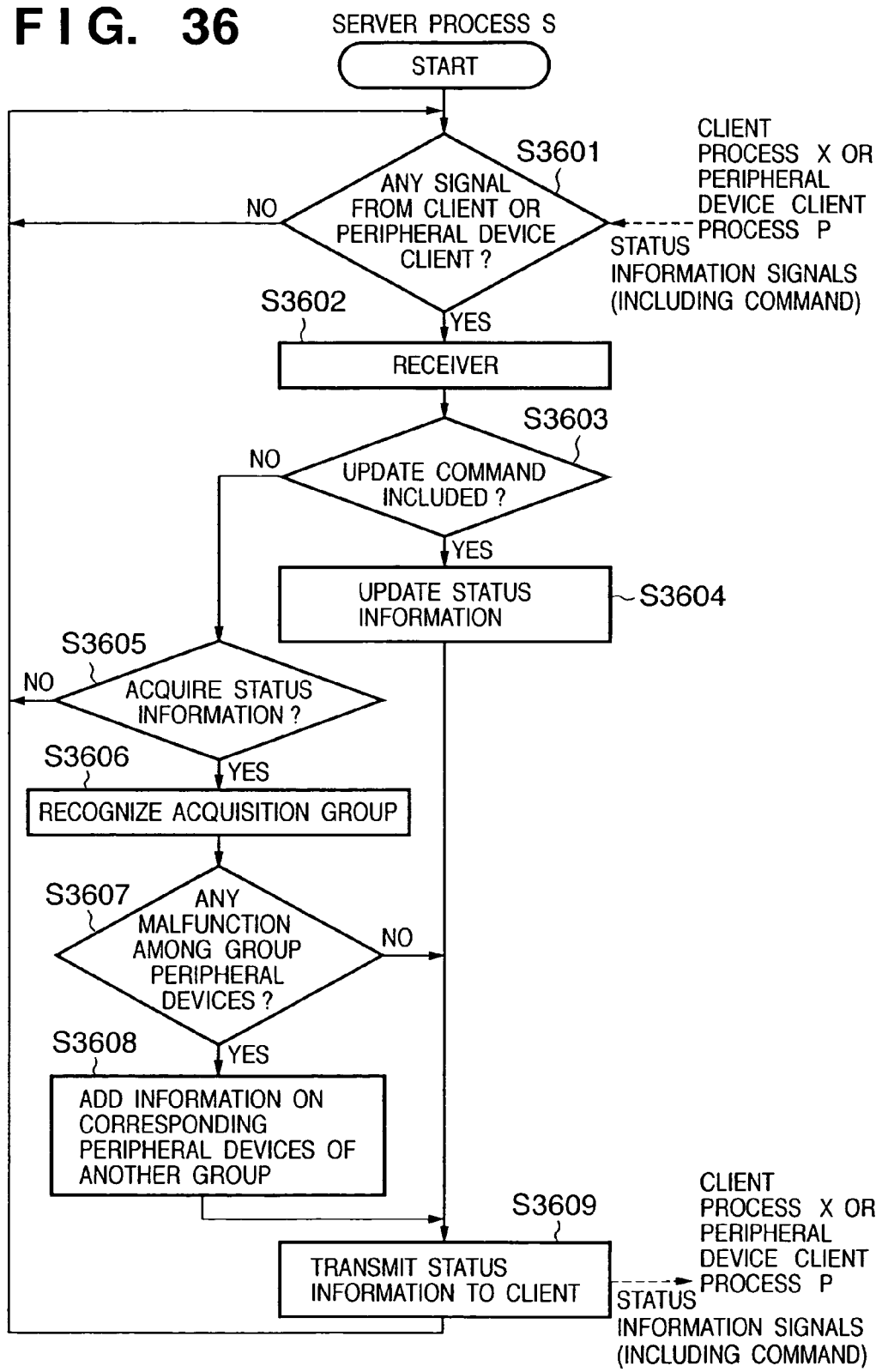
FIG. 36 is a flow chart showing yet another example of the operating procedure of the server process S of the host server device shown in FIG. 1.

FIG. 36 is a flow chart showing an example of the operating procedure of the server process S of the present embodiment.

As shown in FIG. 36, in a step S3601, the server process S first awaits the arrival of status information signals from the client process X or the peripheral device client process P. When the status information signals arrive, processing proceeds to a step S3602 and the status information receiver 1109 receives the status information signals. Processing then proceeds to a step S3603, where the status information update unit 1104 determines whether or not an update command is contained in the received status information signals. When an update command is not included, processing proceeds to a step S3605, where the status information update unit 1104 determines whether or not a status information command is contained in the received status information signals. When a status acquisition command is not included, processing returns to step S3601.

If in step S3603 it is determined that an update command is included in the received status information signals, then processing proceeds to a step S3604, where the status information update unit 1104 updates the information in the status information table 1105 based on the status information included in the received status information signals. Processing then proceeds to a step S3609, where the status information update unit 1104 reads the updated status information out from the status information table 1105 and transmits the information to the designated user terminal stations (the client process X or the peripheral device client process P) through the status information transmitter 1108.

If in step S1605 it is determined that a status information acquisition command is included in the received status information signals, then processing proceeds to step S3606 and the status information update unit 1104 checks the acquisition group (in the present example, "Planning Section 1" group, "Planning Section 2" group, "Planning Department", etc.) contained in the status information acquisition command selected using the user terminal display screen. In the next step, S3607, the status information update unit 1104 determines from the status information of the peripheral devices (copiers, printers, etc.) in the acquisition group whether or not there is a malfunctioning device, and, if there is no malfunctioning device, reads the corresponding status information from the status information table 1105 in accordance with the status information acquisition command and in step S3609 transmits the information to the designated user terminal stations (the client process X or the peripheral device client process P) via the status information transmitter 1108.

By contrast, if in step S3607 it is determined that a peripheral device of the acquisition group is malfunctioning, then in a step S3608 the status information update unit 1104 adds to the acquisition group status information on corresponding peripheral devices of other groups, and in step S3609 transmits the additional information to the designated user terminal station the client process X or the peripheral device client process P) via the status information transmitter 1108. For example, if the copier in Planning Section 1 is malfunctioning, the status information update unit 1104 adds status information on the copier in Planning Section 2 and transmits that additional information to the user terminal station client process X.

It should be noted that, as shown in FIG. 35, when transmitting status information to other groups as well, the transmission is such that information on the user terminal requesting status information with a status information acquisition command can also be displayed on the same screen.

As described above, the server process S status information table 1105 and the client process X status information table 1205 are serially updated so as always to have the same information, with the user status information displayed at the user terminals serially updated. At the same time, when acquiring status information on other groups or when a peripheral device within the group malfunctions, status information on corresponding peripheral devices in other groups can be dynamically ascertained.

-Second Other Example of a Distributed System of the Present Embodiment-

A description is now given of a second other example of a distributed system of the present embodiment. It should be noted that, in the following description, only that which is different from the preceding embodiments is described. It is to be understood that all other configurations, operations and processes are the same as in previous embodiments, and therefore a description thereof is omitted.

<Example of the MFP Configuration in the Present Embodiment>

The internal configuration of the MFP in the present embodiment differs from that of the embodiments described above, as shown in FIG. 37.

A controller 2701, communications interface 2702, scanner engine 2703, printer engine 2704 and user interface 2706 has the same internal configuration as the MFP shown in FIG. 7 in the foregoing embodiments, and therefore a description thereof is omitted.

A video capture board 2705 digitally compresses video signals input from an external video camera or the like and transfers the compressed video signals to the controller 2701, and is controlled by the controller 2701. The video camera or the like may be the same as the video cameras 407 used by the user terminal stations.

Figure 38:
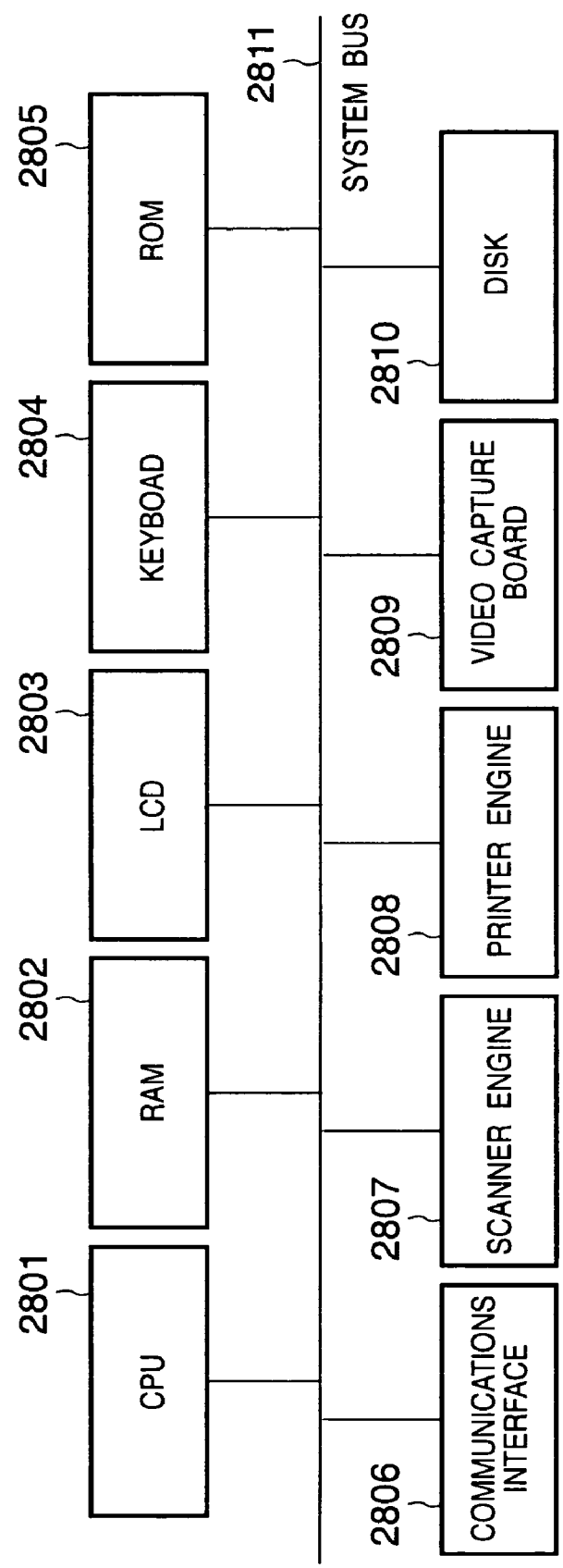
FIG. 38 is a block diagram illustrating a detailed configuration of hardware resources for the controller shown in FIG. 37.

As shown in FIG. 38, the controller 2701 is comprised of a CPU 2801, a RAM 2802, an LCD 2803, a keyboard 2804, a ROM 2805, a communications interface 2806, a scanner engine 2807, a printer engine 2808, a video capture board 2809 and a disk 2810, with each component connected to the others by a system bus 2811. It should be noted that a program for controlling the controller 2701 shown in FIG. 38 is stored in the ROM 2805 or on the disk 2810, and is read to the RAM 2802 as needed and executed by the CPU 2801.

In addition to the control program, attribute information indicating the capabilities and status of the peripheral devices and the jobs processed by the peripheral devices, as well as job data to be output, are stored on the ROM 2805 and the disk 2810. Further, the CPU 2801 displays information via the LCD 2803 and receives instructions from the user through the keyboard 2804. The CPU 2801 communicates externally through the communications interface 2806.

In the present embodiment, unless specifically prohibited, of the peripheral devices in FIG. 38, the CPU 2801 receives user input from the keyboard 2804 through the system bus 2811, and controls the RAM 2802, the LCD 2803, the keyboard 2804, the ROM 2805, the communications interface 2806, the scanner 2807 the printer engine 2808, the video capture board 2809 and the disk 2810 so as to execute a job.

<Example of the Distributed System Operation in the Present Embodiment>

The operations of the server process S and the client process X installed on the user terminal station are the same as those of the preceding embodiments.

(Example of Peripheral Device Client Process P)

A description is now given of the portions of the peripheral device client process P installed on the peripheral devices (MFP 27, LBP 28) that are different from those of the previous embodiments.

Through the operation of the controller 2701, the video capture board 2705 periodically (for example, once every 10 seconds) acquires a photographic image of the vicinity of the peripheral device and stores the resulting compressed photographic images in the status information table 1405. (see FIG. 14). It should be noted that any previously acquired photographic images stored in the status information table 1405 are overwritten with the newly acquired photographic images, thus updating the status information. In addition to photographic images of the vicinity of the peripheral devices, the status information in the status information table 1505 also contains peripheral device job information, job processing status, error information, warning information and the like, as described in the foregoing embodiments. This information is transmitted to the server process S by the status information transmitter 1408 in accordance with instructions from the status information update unit 1404.

The server process S transmits status information containing the compressed photographic information to the user terminals 103-106 and 113-116. In the client process X, in a method that is the same as that used to process images transmitted from other user terminals, the photographic images of the vicinity of the peripheral devices are displayed as peripheral device images (1512, 1518 of FIG. 15) on the display screen of the user terminal station.

As described above, whereas the images displayed on 1512, 1518 shown in FIG. 15 in the previous embodiments are still images, in the present embodiment these images are displayed as moving images showing the actual, latest state of the vicinity of the peripheral devices.

Figure 39:
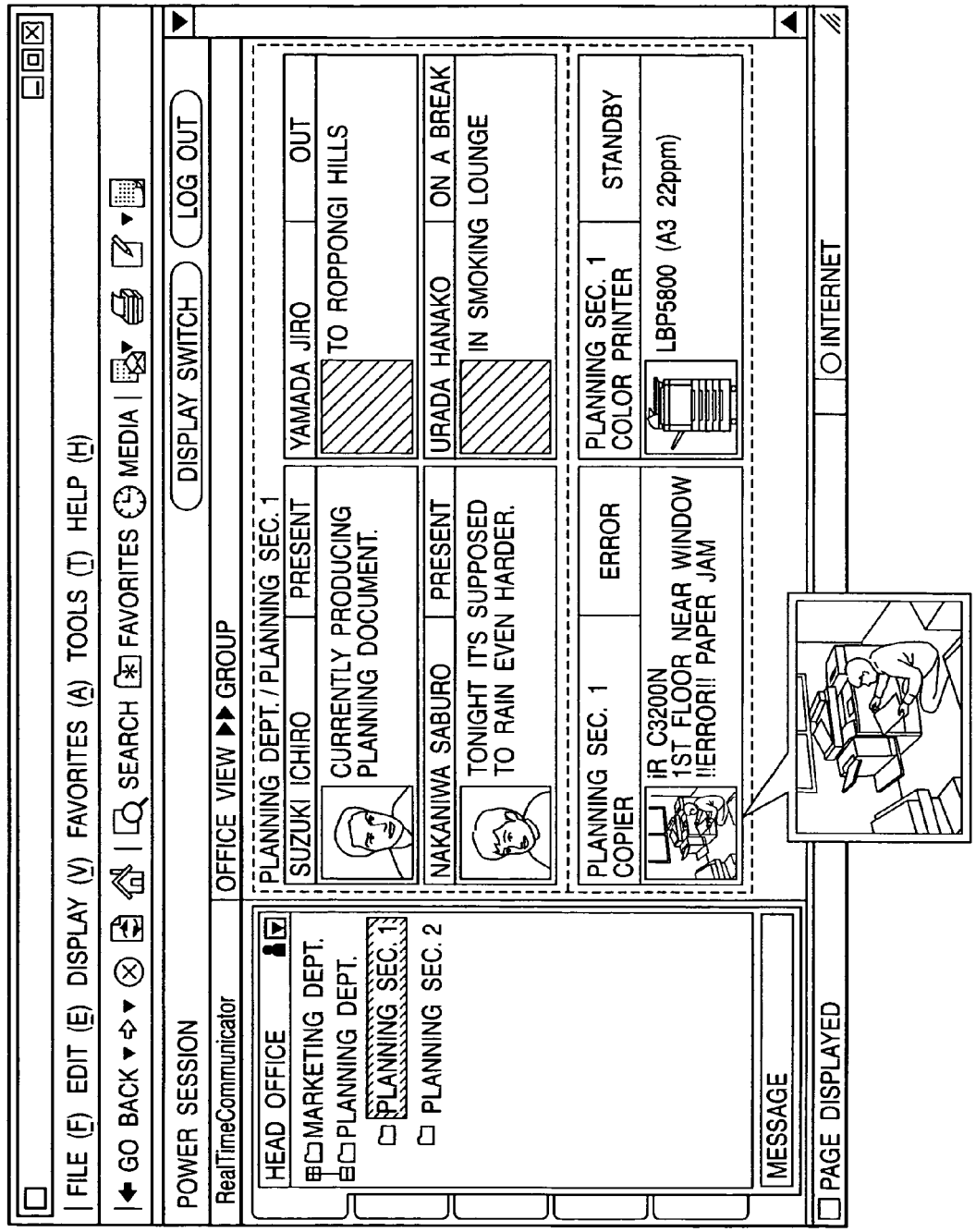
FIG. 39 is a diagram showing a sample screen of a user terminal station according to a layered structure.

Through the operations described above, users of the user terminals can ascertain not only the external appearance of the peripheral devices and the current job, error and warning information, but can also ascertain the actual state of the peripheral devices through images of the vicinity of the peripheral devices. Accordingly, the users can ascertain, for example, not only that a peripheral device is experiencing a paper jam but can also ascertain, for example, that someone is standing in front of that peripheral device and is reading a user's manual, or opening the cover of the peripheral device and looking inside in an effort to remove the paper jam, and therefore can wait in the expectation that the problem will be resolved. (FIG. 39 shows an image of the actual state of a peripheral device and a state in which that image is displayed on the screen of a user terminal.) Moreover, such an arrangement allows the prevention of wasted effort stemming from a situation in which, although the user could just as well have waited for repairs to be completed before issuing an instruction to print, such user goes to the location of the peripheral device in order to ascertain the cause of the malfunction and returns to his or her seat having done nothing (because another user has already begun repairs).

-Third Other Example of a Distributed System of the Present Embodiment-

The preceding embodiments show examples in which moving images showing the latest status of a vicinity of a peripheral device is continuously displayed on the display screen of the user terminal station. In the present embodiment, however, the distributed system may be configured so as to achieve not only the foregoing continuous moving picture display, but also to detect based on information from the peripheral device that the peripheral device is under certain conditions, such as, for example, when an error occurs at the peripheral device, and when detecting error conditions, transmit to a camera a request of changing transmitted information from still images to moving images in order to show the latest status of the vicinity of the error detected peripheral device.

<Example of the Distributed System Operation in the Present Embodiment>

(Example of Peripheral Device Client Process P)

Where implementing the present embodiment, when reading the status information table 1405 the status information update unit 1404 shown in FIG. 14 transmits compressed photographic images to the server process S through the status information transmitter 1408 only if error information or warning information exists in the information so read.

Figure 40:
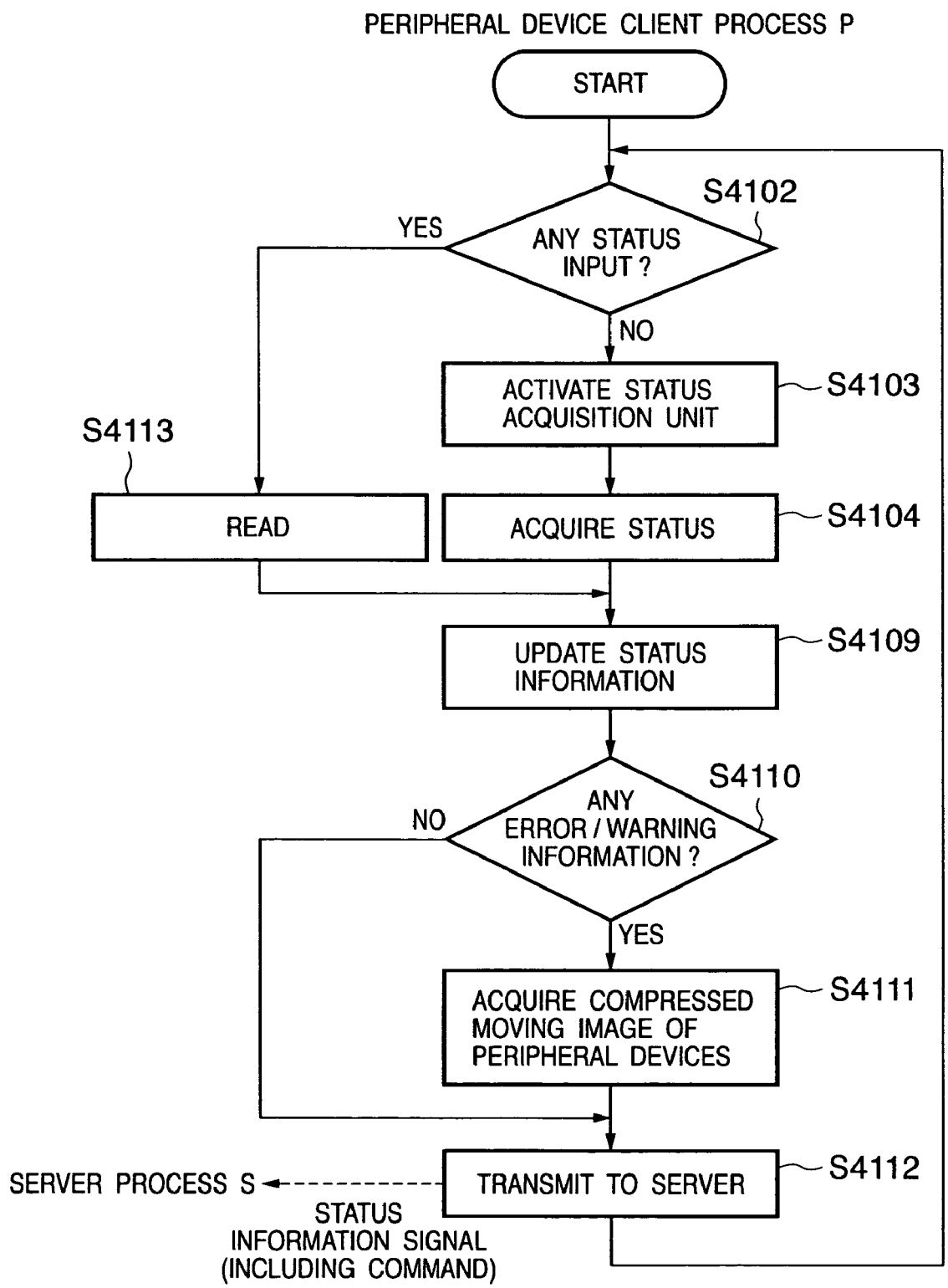
FIG. 40 is a flow chart showing another example of the operating procedures of the peripheral devices client process P of the peripheral devices shown in FIG.

FIG. 40 is a flow chart showing another example of the operating procedures of the peripheral devices client process P.

As shown in FIG. 40, first, in a step S4102, the peripheral device client process P determines whether or not there is input of status information from the user to the status information input unit 1406. If there is input of status information from the user to the status information input unit 1406, processing then proceeds to a step S4113 and the status information generator 1403 reads the status information input from the user and generates status information signals containing a status information acquisition command and the status information from the user. Next, processing proceeds to a step S4109, where the status information update unit 1404 updates the information in the status information table 1405 based on the status information signals thus generated.

In a step S4110, it is determined whether or not there is error or warning information in the status information. If there is error or warning information in the status information, processing proceeds to a step S4111, where information in which moving images of the peripheral devices are photographed and compressed is acquired. Then, proceeding to a step S4112, the status information update unit 1404 reads the updated information from the status information table 1405 and transmits the information to the server process S through the status information transmitter 1408, after which processing returns to step S4102.

If in step S4102 it is determined that there is no input of status information from the user to the status information input unit 1406, then in order periodically to update the peripheral device status information processing proceeds to a step S4103, where the status information generator 1403 acquires peripheral device internal status information. The peripheral device status information is then sent to the status information generator 140. The status information generator 1403 generates status information signals containing the above-described user status information and status information update command.

Next, processing proceeds to step S4109, where the status information update unit 1404 updates the information in the status information table 1405 based on the status information signals thus generated.

With the present embodiment, in a distributed system in which each user can see the status of all other users, it is assumed that the distributed system is permanently stationed at the client computer and the display screen used for long periods of time in a state in which the status can be easily checked thereby, and therefore, since peripheral device information is also similarly displayed on the user status display screen of the distributed system, the state of the peripheral devices can be quickly checked using fewer operations to do so.

Accordingly, users of the user terminal stations can view moving images showing the latest status of the vicinity of the peripheral devices only when an error or other problem occurs at the peripheral devices, in other words, when there is strong possibility that users wish to ascertain the state of the vicinity of the peripheral device. At the same time, since images of the vicinity of the peripheral devices are not transmitted to the host server device or to the user terminal stations from the peripheral devices when there are no errors or other problems, transmission of unneeded images can be prevented and traffic on the network can be reduced.

-Forth Other Example of a Distributed System of the Present Embodiment-

The preceding embodiments show examples in which a camera private to sense images of the area around the location of the peripheral device is prepared. In the present embodiment, the camera 407 used by the user terminal near to the peripheral device may be used to sense images of the area around the location of the peripheral device. In this case, it is necessary to enable the camera to be panned, tilted and zoomed. In this embodiment, when the status is detected from the peripheral device in which the print command is issued to the peripheral device or an error occurs in the peripheral device, the user terminal near to the error detected peripheral device reads preset information already stored in a memory and then controls sensing direction and width of the camera 407 to sense images of the area around the location of the peripheral device. According to the present embodiment, it is possible to remove a camera only for the peripheral device which is not used usually.

-Further Embodiments-

In the foregoing embodiments, a plurality of user terminal stations and peripheral devices, etc., are each connected to a host server device, with data (including status information) being exchanged between the host server device and the user terminal stations as well as between the host server device and the peripheral devices. Such a configuration is known as a client-server model, and in the preceding embodiments the user terminal stations and the peripheral devices correspond to the client and the host server device corresponds to the server, in a star-type connection configuration with the server at the center.

In contrast to and different from the client-server model there is the peer-to-peer model. Embodiments of the present invention may be implemented according to such a peer-to-peer network.

In such a case, the server device may be configured so as to hold information indicating the addresses of a plurality of user terminals and information indicating the addresses of peripheral devices, and transmitting this address information in response to requests from the user terminals, with the user terminals and the peripheral devices serially transmitting information indicating the current status of a user using the user terminal and information indicating the current status of the peripheral devices to other multiple user terminals based on the address information received from the server device, and the server device transmitting layout information for displaying on the same screen the current status of users using other user terminals and the current status of the peripheral devices based on the stored address information in response to requests from the user terminals. Such an arrangement is a variation for the purpose of converting the client-server model into a peer-to-peer model, and since the art for such is well known a detailed description thereof is omitted herein.

As described in the above preferred embodiments, the present invention provides an information processing apparatus for controlling a distributed system in which a plurality of user terminals and peripheral devices are dispersed, comprising reception means for serially receiving information indicating the current status of users using the plurality of user terminals transmitted from the plurality of user terminals and information indicating the current status of the peripheral devices transmitted from the peripheral devices, retention means for retaining the information indicating the current status of the users using the plurality of user terminals and the information indicating the current status of the peripheral devices that is so received, update means for updating the information retained in the retention means in response to changes in status, and response means for replying so as to enable display on the same screen of the current status of other users using user terminals other than one's own and the current status of the peripheral devices in response to requests from each of the plurality of user terminals.

Here, the retention means further retains information indicating a relation between peripheral device and user, with the response means replying so as to enable peripheral devices usable by such user selected based on such information to be displayed on the display screen. The users are grouped into a group and the information indicating the relation between the user and the peripheral devices is set for that group. The group includes a parent group and a child group, the parent group being composed of a plurality of child groups. The peripheral devices and the user belong to a child group, and peripheral devices usable by such user selected based on such information are displayed on the display screen. When the response means receives input indicating that the user has operated the system so as to visit a child group to which that user does not belong, replies so as to enable information indicating the current status of such user, information indicting the current status of users belonging to the child group being visited, and information indicating the current status of peripheral devices belonging to the child group being visited to be displayed on the same display screen. The response means replies so as to enable a corresponding peripheral device belonging to another child group to be displayed on the same display screen when it is determined that a malfunction (that is, an error and/or warning) has occurred at a peripheral device of the selected child group. The information indicating the relation between peripheral device and user includes use restriction information for the peripheral device for such user, with the use restriction information including information indicating whether the peripheral device is usable or unusable, and/or information indicating a resource use upper limit for the peripheral device of such user. Users are grouped into a group and the use restriction information is set for that group. The use restriction information is calculated based on peripheral device monopoly time, electric power consumption, amount of ink consumed, amount of toner consumed and number of sheets of paper consumed.

Moreover, the information indicating the current status of the peripheral devices includes static information and dynamic information, the static information includes the name, model name, location and capabilities of the peripheral device, and the dynamic information includes status information, such as whether or not the peripheral device power is turned on, which of the peripheral device's functions are usable, whether the peripheral device is processing a job or on standby, what type of job the peripheral device is processing, what type of job is queuing in the peripheral device and how many jobs are queuing in the peripheral device, as well as peripheral device error information or warning information. The peripheral devices have a print function and the peripheral device error information or warning information includes status information such as paper jam, no ink, no toner, no paper, no appropriate paper, no hard disk space, ink low, toner low, paper low, hard disk space low, document left, control key not inserted and service call requested (maintenance required). The information processing apparatus further comprises image acquisition means together with the user terminal, wherein the user information includes still images or moving images obtained by the image acquisition means as information indicating the current status of the user. The information processing apparatus further comprises image acquisition means together with the peripheral device, wherein the current status of the peripheral device includes still images or moving images of the area around the location of the peripheral device obtained by the image acquisition means as information indicating the current status of the peripheral device. The information processing apparatus further comprises image acquisition means together with the peripheral device, wherein the current status of the peripheral device includes still images or moving images of the area around the location of the peripheral device obtained by the image acquisition means, with the response means replying so as to enable the still images or moving images of the area around the location of the peripheral device to be displayed on the same display screen when the peripheral device issues error information or warning information.

Moreover, the present invention provides a peripheral device in a distributed system in which a plurality of user terminals and peripheral devices are dispersed, comprising storage means having image sensing means disposed together with the peripheral device, the storage means storing still images or moving images of the location of the peripheral device obtained by the image acquisition means as information indicating the current status of the peripheral device, and transmission means for transmitting to the information processing apparatus controlling such distributed system when the peripheral device issues error information or warning information.

Moreover, the present invention provides an information processing apparatus control method for controlling a distributed system in which a plurality of user terminals and peripheral devices are dispersed, the control method comprising a reception step of serially receiving information indicating the current status of users using the plurality of user terminals transmitted from the plurality of user terminals and information indicating the current status of the peripheral devices transmitted from the peripheral devices, a retention step of retaining the information indicating the current status of the users using the plurality of user terminals and the information indicating the current status of the peripheral devices received in the reception step, an update step of updating the information retained in the retention step in response to changes in status, and a response step of replying so as to enable display on the same screen of the current status of other users using user terminals other than one's own and the current status of the peripheral devices in response to requests from each of the plurality of user terminals.

Here, information indicating a relation between peripheral device and user is further retained in the retention step, with the response means replying so as to enable peripheral devices usable by such user selected based on such information to be displayed on the display screen. Moreover, when the response means receives input indicating that the user has operated the system so as to visit a child group to which that user does not belong, it replies so as to enable information indicating the current status of such user, information indicting the current status of users belonging to the child group being visited, and information indicating the current status of peripheral devices belonging to the child group being visited to be displayed on the same display screen.

Further, the present invention provides a computer-executable control program for controlling a distributed system in which a plurality of user terminals and peripheral devices are dispersed, the control program comprising code for causing a computer to execute the steps of serially receiving information indicating the current status of users using the plurality of user terminals transmitted from the plurality of user terminals and information indicating the current status of the peripheral devices transmitted from the peripheral devices, retaining the information indicating the current status of the users using the plurality of user terminals and the information indicating the current status of the peripheral devices received, updating the information retained in the retention step in response to changes in status, and replying so as to enable display on the same screen of the current status of other users using user terminals other than one's own and the current status of the peripheral devices in response to requests from each of the plurality of user terminals. The step of retaining further retains information indicating a relation between peripheral device and user, with the step of replying enabling peripheral devices usable by such user selected based on such information to be displayed on the display screen. When the code for replying receives input indicating that the user has operated the system so as to visit a child group to which that user does not belong, the program code replies so as to enable information indicating the current status of such user, information indicting the current status of users belonging to the child group being visited, and information indicating the current status of peripheral devices belonging to the child group being visited to be displayed on the same display screen.

Moreover, the present invention provides a program for implementing the information processing apparatus control method described above, and a computer-readable storage medium storing such program.

It should be noted that the present invention can be applied to an apparatus comprising a single device (e.g. copying machine, facsimile machine) as well as to a system or integrated apparatus composed of a plurality of devices (e.g. host computer, interface, scanner, printer, etc.).

Moreover, it is to be understood that the objects of the present invention can be achieved by supplying a storage medium (or a recording medium) storing a software program that implements the functions of the foregoing embodiments, to a system or apparatus, reading the supplied program code with a computer (or CPU or MPU) of the system or apparatus, and then executing the program code. In this case, since the program code read from the storage medium itself implements the functions of the foregoing embodiments, the program code itself and the storage medium storing the program code constitute the invention. Moreover, it is to be understood that not only cases in which the functions of the foregoing embodiments are implemented by a computer executing the read-out program code but also cases in which, based on the instructions of that program code, an operating system (OS) or the like running on the computer performs all or a part of the actual processing, so that the functions of the foregoing embodiments are implemented by this processing, are also included within the scope of the present invention.

Furthermore, it is to be understood that a case in which, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing, is also included within the scope of the present invention.

In adapting the present invention to the above-described storage medium, program code corresponding to the flow charts described above is stored on the storage medium.

As many apparently widely different embodiments of the present invention can be made without departing from the spirit and scope thereof, it is to be understood that the invention is not limited to the specific preferred embodiments described above thereof except as defined in the claims.

CLAIM OF PRIORITY

This application claims priorities from Japanese Patent Application No. 2003-355382 filed on Oct. 15, 2003, and Japanese Patent Application No. 2004-293073 filed on Oct. 5, 2004, the entire contents of which are hereby incorporated by reference herein.

What is claimed is:

1. A method of controlling a distributed system in which a plurality of user terminals and printers are dispersed, comprising the steps of:

storing user information indicating current statuses of users of respective ones of the plurality of user terminals, status of a user including at least information regarding the user's location, including the user's presence at or absence from the user's terminal, and printer information indicating current statuses of the printers, wherein the status of the printer includes at least relation information regarding whether or not the printer is available;

updating the user information and the printer information as the statuses are changing; and for each of the users of respective ones of the plurality of user terminals, displaying current statuses of users of others of the user terminals and the current statuses of the printers on a single display screen of each of the plurality of user terminals, based on the stored and updated user information and printer information, wherein the current statuses of the printers are displayed in a display layout similar to a display layout in which the current statuses of users of the others of the user terminals are displayed, wherein, in said displaying step, the current status of the printer as a device available for an another user selected by a user, is displayed on a common display screen of a user terminal used by the user, and wherein the relation information includes restriction information restricting use of a printer for a user, the restriction information including at least one of availability information indicating whether the printer is available or unavailable for that user, and limit information indicating an upper limit of at least one resource that can be used by the printer for that user.

2. The method according to claim 1, wherein, in the relation information, whether a printer is available or unavailable for a user is set as information indicating whether the printer is available or unavailable for a group to which that user belongs.

3. The method according to claim 2, wherein the group includes parent and child groups, such parent group being composed of a plurality of child groups.

4. The method according to claim 3, wherein
the printers or the users belong to any one of the child groups, and
a printer available for a user selected based on information indicating which child group the printer or the user belongs to is displayed on a common display screen of a user terminal used by that user.

5. The method according to claim 4, wherein
the distributed system is further controlled so that a user can visit a group to which the user does not belong, and
information indicating a current status of such visiting user, information indicating current statuses of users belonging to such visited child group, and information indicating current statuses of printers belonging to the visited child group are displayed on a common display screen when such visit is performed.

6. The method according to claim 4, wherein a corresponding printer belonging to another child group is newly displayed when it is determined that a malfunction including at least one of an error and a warning has occurred at a printer that belongs to the displayed child group.

7. The method according to claim 1, wherein the restriction information is set for each group to which the user belongs.

8. The method according to claim 1, wherein the distributed system further comprises image sensing means together with the plurality of user terminals, and
the information indicating the current statuses of the users includes still images or moving images obtained by the image sensing means.

9. The method according to claim 1, wherein
the distributed system further comprises image sensing means together with the printers, and
the information indicating the current statuses of the printers includes still images or moving images of the area around the location of the printer obtained by the image sensing means.

10. The method according to claim 1, wherein said distributed system further comprises image sensing means together with at least one of the printers,
the information indicating the current statuses of the at least one printer includes still images or moving images of the area around the location of the at least one printer obtained by the image sensing means, and
the moving images of the area around the location of the at least one printer are changed from the still images and output as the information indicating the current statuses of the printers in response to error information or warning information issued by the at least one printer.

11. The method according to claim 1, wherein the distributed system further includes a server device that manages the distributed system,
the plurality of user terminals and printers transmit the user information and the printer information to the server device at every event,
the server device stores the user information and the printer information and updates the information as the statuses are changing, and
the server device, in response to requests from each of the plurality of user terminals, transmits to the requesting user terminal display information including the current statuses of users using other user terminals and the current statuses of the printers which are selected to be displayed on a common display screen based on the stored information.

12. The method according to claim 1, wherein the restriction information is calculated based on printer monopoly time, electric power consumption, amount of ink consumed, amount of toner consumed and number of sheets of paper consumed.

13. The method according to claim 1, wherein the printer information indicating the current statuses of the printers includes static information and dynamic information,
wherein the static information includes the name, model name, location and capabilities of the printer, and
wherein the dynamic information includes status information, such as whether or not the printer power is turned on, which of the printer's functions are usable, whether the printer is processing a job or on standby, what type of job the printer is processing, what type of job is queuing in the printer and how many jobs are queuing in the printer, as well as printer error information or warning information.

14. The method according to claim 13, wherein the printer error information or warning information includes status information such as paper jam, no ink, no toner, no paper, no appropriate paper, no hard disk space, ink low, toner low, paper low, hard disk space low, document left, control key not inserted and service call requested.

15. An information processing apparatus for controlling a distributed system in which a plurality of user terminals and printers are dispersed, comprising:
reception means for receiving at every event user information indicating current statuses of users of respective ones of the plurality of user terminals, status of a user including at least information regarding the user's location, including the user's presence at or absence from the user's terminal, transmitted from the plurality of user terminals, and for receiving printer information indicating current statuses of the printers, wherein the status of the printer includes at least relation information regarding whether or not the printer is available transmitted from the printers;
storing means for storing the received user information indicating current statuses of the users of respective ones of the plurality of user terminals and the received printer information indicating current statuses of the printers;
update means for updating the information stored by said storing means as the statuses are changing; and
response means for replying to requests from each of the user terminals by sending information to enable display of the current statuses of users of others of the user terminals and the current statuses of the printers on a single display screen,
wherein the current statuses of the printers are displayed in a display layout similar to a display layout in which the current statuses of users of the others of the user terminals are displayed,
wherein said response means replies to the requesting user terminal by sending information to enable display of the current status of the printer as a device available for an another user selected by a user, is displayed on a common display screen of a user terminal used by the user, and
wherein the relation information includes restriction information restricting use of a printer for a user, said restriction information including at least one of availability information indicating whether the printer is available or unavailable for that user, and limit information indicating an upper limit of at least one resource that can be used by the printer for that user.

16. The information processing apparatus according to claim 15, wherein, in the relation information, whether a printer is available or unavailable for a user is set as whether the printer is available or unavailable for a group to which that user belongs.

17. The information processing apparatus according to claim 16, wherein the group includes parent and child groups, such parent group being composed of a plurality of child groups.

18. The information processing apparatus according to claim 17, wherein
the printer or the user belong to any one of the child groups, and
said response means sends information to the requesting user terminal information to enable that user terminal to display information indicating a printer which is available for the user of that user terminal, selected based on information indicating to which child group that user belongs, on a common display screen.

19. The information processing apparatus according to claim 17, wherein, when receiving from a user terminal a user's request of visiting a group to which the user does not belong, said response means replies to the requesting user terminal by sending information to enable display of information indicating current status of a visiting user, information indicating current statuses of users belonging to such visited child group, and information indicating current statuses of printers belonging to the visited child group on a common display screen.

20. The information processing apparatus according to claim 17, wherein when determining that a malfunction including at least one of an error and a warning has occurred at a printer which belongs to the displayed child group, said response means replies to the user terminal by sending information to enable that terminal to newly display a corresponding printer belonging to another child group.

21. The information processing apparatus according to claim 15, wherein the restriction information is set for each group to which users belong.

22. The information processing apparatus according to claim 15, further comprising
image sensing means together with the user terminals,
wherein the user information includes still images or moving images obtained by said image sensing means.

23. The information processing apparatus according to claim 15, further comprising
image sensing means together with at least one of the printers,
wherein the printer information includes still images or moving images of the area around the location of the at least one printer obtained by said image sensing means.

24. The information processing apparatus according to claim 15, further comprising
image sensing means together with at least one of the printers,
wherein the printer information includes still images or moving images of the area around the location of the at least one printer obtained by said image sensing means, and
said response means replies requests from each of the user terminals by sending information to enable the still images or moving images of the area around the location of the at least one printer to be displayed on a common display screen in response to error information or warning information issued from the at least one printer.

25. A non-transitory computer-readable storage medium storing, in executable form, a control program for controlling a distributed system in which a plurality of user terminals and printers are dispersed, said control program comprising the steps of:
storing user information indicating current statuses of users of respective ones of the plurality of user terminals, status of a user including at least information regarding the user's location, including the user's presence at or absence from the user's terminal, and printer information indicating current statuses of the printers, wherein the status of the printer includes at least relation information regarding whether or not the printer is available updating the user information and the printer information as the statuses are changing; and
for each of the users of respective ones of the plurality of user terminals, displaying current statuses of users of others of the user terminals and the current statuses of the printers on a single display screen of each of the plurality of user terminals, based on the stored and updated user and printer information,
wherein the current statuses of the printers are displayed in a display layout similar to a display layout in which the current statuses of the users of others of the user terminals are displayed,
wherein, in said displaying step, the current status of the printer as a device available for an another user selected by a user, is displayed on a common display screen of a user terminal used by the user, and
wherein the relation information includes restriction information restricting use of a printer for a user, the restriction information including at least one of availability information indicating whether the printer is available or unavailable for that user, and limit information indicating an upper limit of at least one resource that can be used by the printer for that user.

26. The storage medium according to claim 25, wherein, in said replying step, when receiving from a user terminal a user's request of visiting a group to which the user does not belong, information to enable display of information indicating a current status of such visiting user, information indicating current statuses of users belonging to such visited child group, and information indicating current statuses of printers belonging to the visited child group on a common display screen is sent to the requesting user terminal.

* * * * *